US011790466B2

(12) United States Patent
Rose et al.

(10) Patent No.: US 11,790,466 B2
(45) Date of Patent: Oct. 17, 2023

(54) IDENTIFYING AND VALIDATING RENTAL PROPERTY ADDRESSES

(71) Applicant: DECKARD TECHNOLOGIES, INC., La Jolla, CA (US)

(72) Inventors: Gregory G. Rose, San Diego, CA (US); Nickolas Del Pego, Escondido, CA (US); Craig Brown, Sydney (AU); Anthony Moriarty, Sydney (AU); Weikai Xie, Sydney (AU); Jessica Flanagan, Sydney (AU); Claire Hardgrove, Sydney (AU)

(73) Assignee: Deckard Technologies, Inc., La Jolla, CA (US)

( * ) Notice: Subject to any disclaimer, the term of this patent is extended or adjusted under 35 U.S.C. 154(b) by 397 days.

(21) Appl. No.: 17/062,106

(22) Filed: Oct. 2, 2020

(65) Prior Publication Data

US 2021/0103998 A1 Apr. 8, 2021

Related U.S. Application Data

(60) Provisional application No. 62/910,094, filed on Oct. 3, 2019.

(51) Int. Cl.
*G06Q 50/16* (2012.01)
*G06Q 30/0645* (2023.01)

(52) U.S. Cl.
CPC ....... *G06Q 50/163* (2013.01); *G06Q 30/0645* (2013.01)

(58) Field of Classification Search
CPC .... G06Q 50/163; G06Q 30/0645; G06N 7/01; G06N 20/10; G06N 20/20; G06N 3/08
(Continued)

(56) References Cited

U.S. PATENT DOCUMENTS 8,073,715 B1 * 12/2011 Smith .................... G06Q 30/00 705/36 R
9,076,040 B1 * 7/2015 Jing ...................... G01C 21/20
(Continued)

OTHER PUBLICATIONS

"Digital Tax Maps," by NYC Department of Finance. Accessed via Wayback Machine at https://web.archive.org/web/20190808123654/https://www1.nyc.gov/site/finance/taxes/property-digital-tax-map.page. (Year: 2019).*

(Continued)

*Primary Examiner* — Sarah M Monfeldt
*Assistant Examiner* — John S. Wasaff
(74) *Attorney, Agent, or Firm* — LOZA & LOZA LLP

(57) ABSTRACT

Provided herein are media, systems, and methods that identify the address of a rental property from public sources (e.g., rental listings, maps, and county property records). A data mining task process may be performed, by each of a plurality of first data ingestion interfaces to a unique external property data source, to determine at least one property record depiction, each property record depiction associated with a property record. A first machine learning algorithm may be applied to the at least one rental property depiction and the at least one property record depiction from each data source to identify one or more common property records, wherein each common property record comprises a property record that refers to the rental property. A data mining task process may be performed, by a second data ingestion interface to the one or more common property records to determine the street address of the rental property.

12 Claims, 27 Drawing Sheets

(58) Field of Classification Search
USPC .......................................................... 705/314
See application file for complete search history.

(56) References Cited

U.S. PATENT DOCUMENTS

| | | | | |
|---|---|---|---|---|
| 9,990,639 | B1 * | 6/2018 | Kong | G06Q 50/16 |
| 10,078,679 | B1 * | 9/2018 | Shefferman | G06F 16/273 |
| 10,878,521 | B1 * | 12/2020 | Serio | G06F 16/23 |
| 11,372,900 | B1 * | 6/2022 | Guo | G06F 16/288 |
| 2007/0219819 | A1 * | 9/2007 | Campbell | G06Q 40/00 705/35 |
| 2009/0132316 | A1 * | 5/2009 | Florance | G06Q 30/06 715/810 |
| 2010/0250136 | A1 * | 9/2010 | Chen | G06T 1/0021 709/203 |
| 2012/0059756 | A1 * | 3/2012 | Serio | G06Q 40/03 705/38 |
| 2013/0275281 | A1 * | 10/2013 | Jimenez | G06Q 50/26 705/31 |
| 2014/0058910 | A1 * | 2/2014 | Abeles | G06Q 50/265 705/31 |
| 2015/0074018 | A1 * | 3/2015 | Gill | G06Q 50/16 705/36 T |
| 2015/0178866 | A1 * | 6/2015 | Serio | G06Q 50/163 705/314 |
| 2016/0042478 | A1 * | 2/2016 | Howe | G06F 16/5866 705/26.62 |
| 2020/0294162 | A1 * | 9/2020 | Shah | G06N 3/08 |

OTHER PUBLICATIONS

Baldominos, A., Blanco, I., Moreno, A. J., Iturrarte, R., Bernárdez, Ó., & Afonso, C. (2018). Identifying real estate opportunities using machine learning. Applied sciences, 8(11), 2321. (Year: 2018).*

* cited by examiner

1600

1700

2300

IDENTIFYING AND VALIDATING RENTAL PROPERTY ADDRESSES

CLAIM OF PRIORITY

This application claims priority under 35 U.S.C. § 119 to U.S. Provisional Application No. 62/910,094 entitled, "Identifying And Validating Rental Property Addresses" filed Oct. 3, 2019, and hereby expressly incorporated by reference herein.

BACKGROUND

The noise and traffic cause by short-term vacation rental properties form a burden on neighbors and local hotels. As such, many cities restrict short term rentals and/or levy a Transient Occupancy Tax to prevent overuse of short-term rentals.

SUMMARY

The noise and traffic cause by short-term vacation rental properties form a burden on neighbors and local hotels. As such, while many cities restrict short term rentals and/or levy a Transient Occupancy Tax to prevent overuse of short-term rentals, individual rental property owners and rental property listings often do not list the rental property address to avoid paying such taxes. To ensure that the renter is able to access the property, the actual address is often only revealed once a reservation has been made, or within a certain number of days from the reservation date. Further, the communication of the rental address is often performed outside the structure of the rental listings.

While, for example, the rental management company AirBnB has reached an agreement with Los Angeles to collect and remit the Transmit Occupancy Tax, not all rental listings in all jurisdictions have such agreements in place, nor is the correctness of any remittance assured or auditable. As such, auditing rental listings or individual rental property owners is difficult if not impossible in many locations.

However, as the same property may have been listed for sale, for long term rental, or for short term rental, either at the same time or at different times on multiple platforms, determining a common property listed by both the rental listing and other sale/rent listings enables the collection and analysis of a greater data set to determine the address of the rental property. In the cases, however such additional rental/sale listings do not directly notate the rental property address.

Machine learning is a computer technology for processing and interrelating data, which may employ image processing and natural language processing techniques. A neural network is a framework of machine learning algorithms that work together to classify inputs based on a previous training process. However, current machine learning methods are unable to properly incorporate and analyze the many forms and types of property record depictions to robustly detect property records that refer to a rental property.

As such, provided herein are media, systems, and methods that apply machine learning algorithms to identify the address of a rental property directly or indirectly from multiple public sources such as other rental listings, sale listings, maps, and county property records. In some embodiments, the machine learning algorithms herein may or may not be trained or supervised by a human. Machine algorithms are provided herein for common property detection algorithm and a common property image detection algorithm.

In some embodiments of the common property detection algorithm herein, a machine learning algorithm classifies a property record depiction as either a common property to the rental property or as a non-common property to the rental property based upon a neural network trained on an expanded set of predetermined common property records and predetermined non-common property records. The media, systems, and methods herein employ a combination of machine learning training functions to form a robust machine learning algorithm to determine a common property record that refers to a rental property. In a first function herein, the neural network is trained with the expanded training set. In a second function herein, the neural network is iteratively retrained with an updated training set containing any false positives produced by the machine learning trained using the expanded set of property records. As such, the robust machine learning algorithm whose neural networks are reiterative trained per the methods herein produce less false positives and improved common property detection.

In some embodiments of the common property image detection algorithm herein, a machine learning algorithm classifies a property image as either a common property image to the rental property image or as a non-common property image to the rental property image based upon a neural network trained on a expanded training set of predetermined common property images and predetermined non-common property images. The media, systems, and methods herein employ a combination of machine learning training functions to form a robust machine learning algorithm to determine a common property image that is of the same property as the rental property image. In a first function herein, the neural network is trained with the expanded training set. In a second function herein, the neural network is iteratively retrained with an updated training set containing any false positives produced by the machine learning trained using the expanded set of property images. As such, the robust machine learning algorithm whose neural networks are reiterative trained per the methods herein produce less false positives and improved common property image detection.

One aspect provided herein is a non-transitory computer-readable storage media encoded with a computer program including instructions executable by a processor to create an application to determine a street address of a rental property. The application may comprising: a rental listing module receiving a rental property listing for the rental property and at least one rental property depiction of the rental property listing; a plurality of first data ingestion interfaces, each first data interface connecting to a unique external property data source, wherein each first data interface performs a data mining task process to its property data source to determine at least one property record depiction, each property record depiction associated with a property record; a common property module applying a first machine learning algorithm to the at least one rental property depiction and the at least one property record depiction from each data source to identify one or more common property records, wherein each common property record comprises a property record that refers to the rental property; and/or a second data ingestion interface performing a data mining task process to the one or more common property records to determine the street address of the rental property.

In some embodiments, the first machine learning algorithm is trained by a neural network comprising: a collection module collecting a plurality of predetermined common property records; a first set module creating a first training set comprising the plurality of predetermined common property records and a plurality of predetermined non-common property records, wherein the plurality of predetermined non-common property records comprises two or more property records associated with different properties; and/or a first training module training the neural network using the first training set. In some embodiments, the neural network further comprises: a second set module creating a second training set for second stage training comprising the first training set and the predetermined non-common property records incorrectly detected as common property records by the first training module; and a second training module training the neural network using the second training set. In some embodiments, at least one of the predetermined common property records or the predetermined non-common property records is manually collected. In some embodiments, at least one of the rental property depiction and the property record depiction comprises an image, a video, a map area, an audio file, a text description, or any combination thereof. In some embodiments, one or more of the image, the video, the map area, the audio file, or the text description describe a number of parking spaces, the distance to the known landmark, an amenity, a host name, a realtor name, a location characteristic, a number of bedrooms, a number of bathrooms, a number of stories, a number of parking spaces, a square footage, an amenity, a set of directions to the rental property, or any combination thereof. In some embodiments, the rental property depiction and the property record depiction comprise the image, and wherein the first machine learning algorithm is trained by a neural network comprising: a collection module collecting a plurality of predetermined common property images; a first set module creating a first training set comprising the plurality of predetermined common property images and a plurality of predetermined non-common property images, wherein the plurality of predetermined non-common property images comprises two or more images of different properties; and a first training module training the neural network using the first training set. In some embodiments, the neural network further comprises: a second set module creating a second training set for second stage training comprising the first training set, and the predetermined non-common property images incorrectly detected as common property images by the first training module; and a second training module training the neural network using the second training set. In some embodiments, the rental listing module receiving the at least one rental property depiction of the rental property comprises a third data ingestion interface performing a data mining task process to the rental property listing. In some embodiments, the rental property listing comprises a vacation rental listing, a short-term rental listing, a home swap rental listing, or any combination thereof. In some embodiments, the rental property listing comprises an AirBnB listing, a Craigslist listing, a VRBO listing, a HomeToGo listing, a VacationRentals.com listing, a FlipKey listing, a bookings.com listing, a OneFineStay listing, a 9flats listing, a Wimdu listing, a VayStays listing, a VacayHero listing, a Luxury Retreats listing, or any combination thereof. In some embodiments, the rental property is a house, an apartment, a condominium, a cabin, a mobile home, a land, or any combination thereof. In some embodiments, the external property data source comprises a vacation rental listing site, a short-term rental listing site, a home swap rental listing site, a sale property listing site, a permit database, a county record database, a state record database, a federal record database, a streetview, a map, or any combination thereof. In some embodiments, at least one of the property record and the common property record comprises a vacation rental listing, a short-term rental listing, a home swap rental listing, a sale property listing, a permit, a residency record, a county record, a state record, a federal record, a streetview, a map, or any combination thereof. In some embodiments, the landmark comprises a school, a park, a shop, a monument, a museum, a bus-stop, a train-stop, a school, a place of worship, a beach, a land feature, an office, a government building, or any combination thereof. In some embodiments, the second data ingestion interface performing the data mining task process to the one or more common property records to determine the street address of the rental property comprises: a photographic data mining task process to determine a street name, an address number, or both of the rental property; a lexicographical data mining task process to determine the street name, the address number, or both of the rental property; or both. In some embodiments, the application further comprises a property address module applying a second machine learning algorithm to the at least one rental property depiction, the at least one property record depiction, or both and the street name or the address number, to determine the street address of the rental property. In some embodiments, the second data ingestion interface performing the data mining task process to the one or more common property records to determine the street address of the rental property comprises: a photographic data mining task process to determine a neighboring address number of a property neighboring the rental property; a lexicographical data mining task process to determine a neighboring address number of a property neighboring the rental property; or both. In some embodiments, the application may further comprise a property address module applying a second machine learning algorithm to the at least one rental property depiction, the at least one property record depiction, the neighboring address number, or any combination thereof, to determine the street address of the rental property. In some embodiments, the application further comprises a first validation module that accepts verified data regarding the common property and feeds back the verified data to the common property module to improve its calculations over time. In some embodiments, the application further comprises a second validation module that accepts verified data regarding the street address of the rental property and feeds back the verified data to the application to improve its calculations over time.

Another aspect provided herein is a non-transitory computer-readable storage media encoded with a computer program including instructions executable by a processor to create an application to determine a street address of a rental property, the application comprising: a rental listing module receiving a rental property listing for the rental property and at least one rental property depiction of the rental property listing; a plurality of first data ingestion interfaces, each first data interface connecting to a unique external property data source, wherein each first data interface performs a data mining task process to its property data source to determine at least one property record depiction, each property record depiction associated with a property record; a common property module applying a first machine learning algorithm to the at least one rental property depiction and the at least one property record depiction from each data source to identify one or more common property records, wherein each common property record comprises a property record that refers to the rental property; and a property address module applying a second machine learning algorithm to the at least one rental property depiction, the at least one property record depiction, or both, to determine the street address of the rental property based on a proximity of the street address of the common property to a known landmark.

In some embodiments, the first machine learning algorithm is trained by a neural network comprising: a collection module collecting a plurality of predetermined common property records; a first set module creating a first training set comprising the plurality of predetermined common property records and a plurality of predetermined non-common property records, wherein the plurality of predetermined non-common property records comprises two or more property records associated with different properties; and a first training module training the neural network using the first training set. In some embodiments, the neural network further comprises: a second set module creating a second training set for second stage training comprising the first training set and the predetermined non-common property records incorrectly detected as common property records by the first training module; and/or a second training module training the neural network using the second training set. In some embodiments, at least one of the predetermined common property records or the predetermined non-common property records is manually collected. In some embodiments, at least one of the rental property depiction and the property record depiction comprises an image, a video, a map area, an audio file, a text description, or any combination thereof. In some embodiments, one or more of the image, the video, the map area, the audio file, or the text description describe a number of parking spaces, the distance to the known landmark, an amenity, a host name, a realtor name, a location characteristic, a number of bedrooms, a number of bathrooms, a number of stories, a number of parking spaces, a square footage, an amenity, a set of directions to the rental property, or any combination thereof. In some embodiments, the rental property depiction and the property record depiction comprise the image, and wherein the first machine learning algorithm is trained by a neural network comprising: a collection module collecting a plurality of predetermined common property images; a first set module creating a first training set comprising the plurality of predetermined common property images and a plurality of predetermined non-common property images, wherein the plurality of predetermined non-common property images comprises two or more images of different properties; and a first training module training the neural network using the first training set. In some embodiments, the neural network further comprises: a second set module creating a second training set for second stage training comprising the first training set, and the predetermined non-common property images incorrectly detected as common property images by the first training module; and a second training module training the neural network using the second training set. In some embodiments, the rental listing module receiving the at least one rental property depiction of the rental property comprises a third data ingestion interface performing a data mining task process to the rental property listing. In some embodiments, the rental property listing comprises a vacation rental listing, a short-term rental listing, a home swap rental listing, or any combination thereof. In some embodiments, the rental property listing comprises an AirBnB listing, a Craigslist listing, a VRBO listing, a HomeToGo listing, a VacationRentals.com listing, a FlipKey listing, a bookings.com listing, a OneFineStay listing, a 9flats listing, a Wimdu listing, a VayStays listing, a VacayHero listing, a Luxury Retreats listing, or any combination thereof. In some embodiments, the rental property is a house, an apartment, a condominium, a cabin, a mobile home, a land, or any combination thereof. In some embodiments, the external property data source comprises a vacation rental listing site, a short-term rental listing site, a home swap rental listing site, a sale property listing site, a permit database, a county record database, a state record database, a federal record database, a streetview, a map, or any combination thereof. In some embodiments, at least one of the property record and the common property record comprises a vacation rental listing, a short-term rental listing, a home swap rental listing, a sale property listing, a permit, a residency record, a county record, a state record, a federal record, a streetview, a map, or any combination thereof. In some embodiments, wherein the landmark comprises a school, a park, a shop, a monument, a museum, a bus-stop, a train-stop, a school, a place of worship, a beach, a land feature, an office, a government building, or any combination thereof. In some embodiments, the second data ingestion interface performing the data mining task process to the one or more common property records to determine the street address of the rental property comprises: a photographic data mining task process to determine a street name, an address number, or both of the rental property; a lexicographical data mining task process to determine the street name, the address number, or both of the rental property; or both. In some embodiments, the application further comprises a property address module applying a second machine learning algorithm to the at least one rental property depiction, the at least one property record depiction, or both and the street name or the address number, to determine the street address of the rental property. In some embodiments, the second data ingestion interface performing the data mining task process to the one or more common property records to determine the street address of the rental property comprises: a photographic data mining task process to determine a neighboring address number of a property neighboring the rental property; a lexicographical data mining task process to determine a neighboring address number of a property neighboring the rental property; or both. In some embodiments, the application further comprises a property address module applying a second machine learning algorithm to the at least one rental property depiction, the at least one property record depiction, the neighboring address number, or any combination thereof, to determine the street address of the rental property. In some embodiments, the application further comprises a first validation module that accepts verified data regarding the common property and feeds back the verified data to the common property module to improve its calculations over time. In some embodiments, the application further comprises a second validation module that accepts verified data regarding the street address of the rental property and feeds back the verified data to the application to improve its calculations over time.

Another aspect provided herein is a computer-implemented system comprising: a digital processing device comprising: at least one processor, an operating system configured to perform executable instructions, a memory, and a computer program including instructions executable by the digital processing device to create an application to determine a street address of a rental property, the application comprising: a rental listing module receiving a rental property listing for the rental property and at least one rental property depiction of the rental property listing; a plurality of first data ingestion interfaces, each first data interface connecting to a unique external property data source, wherein each first data interface performs a data mining task process to its property data source to determine at least one property record depiction, each property record depiction associated with a property record; a common property module applying a first machine learning algorithm to the at least one rental property depiction and the at least one property record depiction from each data source to identify one or more common property records, wherein each common property record comprises a property record that refers to the rental property; and a second data ingestion interface performing a data mining task process to the one or more common property records to determine the street address of the rental property.

In some embodiments, the first machine learning algorithm is trained by a neural network comprising: a collection module collecting a plurality of predetermined common property records; a first set module creating a first training set comprising the plurality of predetermined common property records and a plurality of predetermined non-common property records, wherein the plurality of predetermined non-common property records comprises two or more property records associated with different properties; and a first training module training the neural network using the first training set. In some embodiments, the neural network further comprises: a second set module creating a second training set for second stage training comprising the first training set and the predetermined non-common property records incorrectly detected as common property records by the first training module; and a second training module training the neural network using the second training set. In some embodiments, at least one of the predetermined common property records or the predetermined non-common property records is manually collected. In some embodiments, at least one of the rental property depiction and the property record depiction comprises an image, a video, a map area, an audio file, or any combination thereof. In some embodiments, one or more of the image, the video, the map area, the audio file, or the text description describe a text description, a number of parking spaces, the distance to the known landmark, an amenity, a host name, a realtor name, a location characteristic, a number of bedrooms, a number of bathrooms, a number of stories, a number of parking spaces, a square footage, an amenity, a set of directions to the rental property, or any combination thereof. In some embodiments, the rental property depiction and the property record depiction comprise the image, and wherein the first machine learning algorithm is trained by a neural network comprising: a collection module collecting a plurality of predetermined common property images; a first set module creating a first training set comprising the plurality of predetermined common property images and a plurality of predetermined non-common property images, wherein the plurality of predetermined non-common property images comprises two or more images of different properties; and a first training module training the neural network using the first training set. In some embodiments, the neural network further comprises: a second set module creating a second training set for second stage training comprising the first training set, and the predetermined non-common property images incorrectly detected as common property images by the first training module; and a second training module training the neural network using the second training set. In some embodiments, the rental listing module receiving the at least one rental property depiction of the rental property comprises a third data ingestion interface performing a data mining task process to the rental property listing. In some embodiments, the rental property listing comprises a vacation rental listing, a short-term rental listing, a home swap rental listing, or any combination thereof. In some embodiments, the rental property listing comprises an AirBnB listing, a Craigslist listing, a VRBO listing, a HomeToGo listing, a VacationRentals.com listing, a FlipKey listing, a bookings.com listing, a OneFineStay listing, a 9flats listing, a Wimdu listing, a VayStays listing, a VacayHero listing, a Luxury Retreats listing, or any combination thereof. In some embodiments, the rental property is a house, an apartment, a condominium, a cabin, a mobile home, a land, or any combination thereof. In some embodiments, the external property data source comprises a vacation rental listing site, a short-term rental listing site, a home swap rental listing site, a sale property listing site, a permit database, a county record database, a state record database, a federal record database, a streetview, a map, or any combination thereof. In some embodiments, at least one of the property record and the common property record comprises a vacation rental listing, a short-term rental listing, a home swap rental listing, a sale property listing, a permit, a residency record, a county record, a state record, a federal record, a streetview, a map, or any combination thereof. In some embodiments, the landmark comprises a school, a park, a shop, a monument, a museum, a bus-stop, a train-stop, a school, a place of worship, a beach, a land feature, an office, a government building, or any combination thereof. In some embodiments, the second data ingestion interface performing the data mining task process to the one or more common property records to determine the street address of the rental property comprises: a photographic data mining task process to determine a street name, an address number, or both of the rental property; a lexicographical data mining task process to determine the street name, the address number, or both of the rental property; or both. In some embodiments, the application further comprises a property address module applying a second machine learning algorithm to the at least one rental property depiction, the at least one property record depiction, or both and the street name or the address number, to determine the street address of the rental property. In some embodiments, the second data ingestion interface performing the data mining task process to the one or more common property records to determine the street address of the rental property comprises: a photographic data mining task process to determine a neighboring address number of a property neighboring the rental property; a lexicographical data mining task process to determine a neighboring address number of a property neighboring the rental property; or both. In some embodiments, the application further comprises a property address module applying a second machine learning algorithm to the at least one rental property depiction, the at least one property record depiction, the neighboring address number, or any combination thereof, to determine the street address of the rental property. In some embodiments, the application further comprises a first validation module that accepts verified data regarding the common property and feeds back the verified data to the common property module to improve its calculations over time. In some embodiments, the application further comprises a second validation module that accepts verified data regarding the street address of the rental property and feeds back the verified data to the application to improve its calculations over time.

Another aspect provided herein is a computer-implemented system comprising: a digital processing device comprising: at least one processor, an operating system configured to perform executable instructions, a memory, and a computer program including instructions executable by the digital processing device to create an application to determine a street address of a rental property, the application comprising: a rental listing module receiving a rental property listing for the rental property and at least one rental property depiction of the rental property listing; a plurality of first data ingestion interfaces, each first data interface connecting to a unique external property data source, wherein each first data interface performs a data mining task process to its property data source to determine at least one property record depiction, each property record depiction associated with a property record; a common property module applying a first machine learning algorithm to the at least one rental property depiction and the at least one property record depiction from each data source to identify one or more common property records, wherein each common property record comprises a property record that refers to the rental property; and a property address module applying a second machine learning algorithm to the at least one rental property depiction, the at least one property record depiction, or both, to determine the street address of the rental property based on a proximity of the street address of the common property to a known landmark.

In some embodiments, the first machine learning algorithm is trained by a neural network comprising: a collection module collecting a plurality of predetermined common property records; a first set module creating a first training set comprising the plurality of predetermined common property records and a plurality of predetermined non-common property records, wherein the plurality of predetermined non-common property records comprises two or more property records associated with different properties; and a first training module training the neural network using the first training set. In some embodiments, the neural network further comprises: a second set module creating a second training set for second stage training comprising the first training set and the predetermined non-common property records incorrectly detected as common property records by the first training module; and a second training module training the neural network using the second training set. In some embodiments, at least one of the predetermined common property records or the predetermined non-common property records is manually collected. In some embodiments, at least one of the rental property depiction and the property record depiction comprises an image, a video, a map area, an audio file, a text description, or any combination thereof. In some embodiments, one or more of the image, the video, the map area, the audio file, or the text description describe a number of parking spaces, the distance to the known landmark, an amenity, a host name, a realtor name, a location characteristic, a number of bedrooms, a number of bathrooms, a number of stories, a number of parking spaces, a square footage, an amenity, a set of directions to the rental property, or any combination thereof. In some embodiments, the rental property depiction and the property record depiction comprise the image, and wherein the first machine learning algorithm is trained by a neural network comprising: a collection module collecting a plurality of predetermined common property images; a first set module creating a first training set comprising the plurality of predetermined common property images and a plurality of predetermined non-common property images, wherein the plurality of predetermined non-common property images comprises two or more images of different properties; and a first training module training the neural network using the first training set. In some embodiments, the neural network further comprises: a second set module creating a second training set for second stage training comprising the first training set, and the predetermined non-common property images incorrectly detected as common property images by the first training module; and a second training module training the neural network using the second training set. In some embodiments, the rental listing module receiving the at least one rental property depiction of the rental property comprises a third data ingestion interface performing a data mining task process to the rental property listing. In some embodiments, the rental property listing comprises a vacation rental listing, a short-term rental listing, a home swap rental listing, or any combination thereof. In some embodiments, the rental property listing comprises an AirBnB listing, a Craigslist listing, a VRBO listing, a HomeToGo listing, a VacationRentals.com listing, a FlipKey listing, a bookings.com listing, a OneFineStay listing, a 9flats listing, a Wimdu listing, a VayStays listing, a VacayHero listing, a Luxury Retreats listing, or any combination thereof. In some embodiments, the rental property is a house, an apartment, a condominium, a cabin, a mobile home, a land, or any combination thereof. In some embodiments, the external property data source comprises a vacation rental listing site, a short-term rental listing site, a home swap rental listing site, a sale property listing site, a permit database, a county record database, a state record database, a federal record database, a streetview, a map, or any combination thereof. In some embodiments, at least one of the property record and the common property record comprises a vacation rental listing, a short-term rental listing, a home swap rental listing, a sale property listing, a permit, a residency record, a county record, a state record, a federal record, a streetview, a map, or any combination thereof. In some embodiments, the landmark comprises a school, a park, a shop, a monument, a museum, a bus-stop, a train-stop, a school, a place of worship, a beach, a land feature, an office, a government building, or any combination thereof. In some embodiments, the second data ingestion interface performing the data mining task process to the one or more common property records to determine the street address of the rental property comprises: a photographic data mining task process to determine a street name, an address number, or both of the rental property; a lexicographical data mining task process to determine the street name, the address number, or both of the rental property; or both. In some embodiments, the application further comprises a property address module applying a second machine learning algorithm to the at least one rental property depiction, the at least one property record depiction, or both and the street name or the address number, to determine the street address of the rental property. In some embodiments, the second data ingestion interface performing the data mining task process to the one or more common property records to determine the street address of the rental property comprises: a photographic data mining task process to determine a neighboring address number of a property neighboring the rental property; a lexicographical data mining task process to determine a neighboring address number of a property neighboring the rental property; or both. In some embodiments, the application further comprises a property address module applying a second machine learning algorithm to the at least one rental property depiction, the at least one property record depiction, the neighboring address number, or any combination thereof, to determine the street address of the rental property. In some embodiments, the application further comprises a first validation module that accepts verified data regarding the common property and feeds back the verified data to the common property module to improve its calculations over time. In some embodiments, the application further comprises a second validation module that accepts verified data regarding the street address of the rental property and feeds back the verified data to the application to improve its calculations over time.

Another aspect provided herein is a computer-implemented method of determining a street address of a rental property, the method comprising: receiving, by a rental listing module, a rental property listing for the rental property and at least one rental property depiction of the rental property listing; performing a data mining task process, by each of a plurality of first data ingestion interfaces to a unique external property data source, to determine at least one property record depiction, each property record depiction associated with a property record; applying, by a common property module, a first machine learning algorithm to the at least one rental property depiction and the at least one property record depiction from each data source to identify one or more common property records, wherein each common property record comprises a property record that refers to the rental property; and performing a data mining task process, by a second data ingestion interface to the one or more common property records to determine the street address of the rental property.

In some embodiments, the first machine learning algorithm is trained by a neural network comprising: a collection module collecting a plurality of predetermined common property records; a first set module creating a first training set comprising the plurality of predetermined common property records and a plurality of predetermined non-common property records, wherein the plurality of predetermined non-common property records comprises two or more property records associated with different properties; and a first training module training the neural network using the first training set. In some embodiments, the neural network further comprises: a second set module creating a second training set for second stage training comprising the first training set and the predetermined non-common property records incorrectly detected as common property records by the first training module; and a second training module training the neural network using the second training set. In some embodiments, wherein at least one of the predetermined common property records or the predetermined non-common property records is manually collected. In some embodiments, at least one of the rental property depiction and the property record depiction comprises an image, a video, a map area, an audio file, a text description, or any combination thereof. In some embodiments, one or more of the image, the video, the map area, the audio file, or the text description describe a number of parking spaces, the distance to the known landmark, an amenity, a host name, a realtor name, a location characteristic, a number of bedrooms, a number of bathrooms, a number of stories, a number of parking spaces, a square footage, an amenity, a set of directions to the rental property, or any combination thereof. In some embodiments, the rental property depiction and the property record depiction comprise the image, and wherein the first machine learning algorithm is trained by a neural network comprising: a collection module collecting a plurality of predetermined common property images; a first set module creating a first training set comprising the plurality of predetermined common property images and a plurality of predetermined non-common property images, wherein the plurality of predetermined non-common property images comprises two or more images of different properties; and a first training module training the neural network using the first training set. In some embodiments, the neural network further comprises: a second set module creating a second training set for second stage training comprising the first training set, and the predetermined non-common property images incorrectly detected as common property images by the first training module; and a second training module training the neural network using the second training set. The receiving, by the rental listing module, the at least one rental property depiction of the rental property, comprises a third data ingestion interface performing a data mining task process to the rental property listing. The rental property listing comprises a vacation rental listing, a short-term rental listing, a home swap rental listing, or any combination thereof. The rental property listing comprises an AirBnB listing, a Craigslist listing, a VRBO listing, a HomeToGo listing, a VacationRentals.com listing, a FlipKey listing, a bookings.com listing, a OneFineStay listing, a 9flats listing, a Wimdu listing, a VayStays listing, a VacayHero listing, a Luxury Retreats listing, or any combination thereof. In some embodiments, the rental property is a house, an apartment, a condominium, a cabin, a mobile home, a land, or any combination thereof. In some embodiments, the external property data source comprises a vacation rental listing site, a short-term rental listing site, a home swap rental listing site, a sale property listing site, a permit database, a county record database, a state record database, a federal record database, a streetview, a map, or any combination thereof. In some embodiments, at least one of the property record and the common property record comprises a vacation rental listing, a short-term rental listing, a home swap rental listing, a sale property listing, a permit, a residency record, a county record, a state record, a federal record, a streetview, a map, or any combination thereof. In some embodiments, the landmark comprises a school, a park, a shop, a monument, a museum, a bus-stop, a train-stop, a school, a place of worship, a beach, a land feature, an office, a government building, or any combination thereof. In some embodiments, performing the data mining task process by the second data ingestion interface comprises: performing a photographic data mining task process to determine a street name, an address number, or both of the rental property; performing a lexicographical data mining task process to determine the street name, the address number, or both of the rental property; or both. In some embodiments, the method further comprises applying, by a property address module, a second machine learning algorithm to the at least one rental property depiction, the at least one property record depiction, or both and the street name or the address number, to determine the street address of the rental property. In some embodiments, performing the data mining task process, by the second data ingestion interface comprises: performing a photographic data mining task process to determine a neighboring address number of a property neighboring the rental property; performing a lexicographical data mining task process to determine a neighboring address number of a property neighboring the rental property; or both. In some embodiments, the method further comprises applying, by a property address module, a second machine learning algorithm to the at least one rental property depiction, the at least one property record depiction, the neighboring address number, or any combination thereof, to determine the street address of the rental property. In some embodiments, the method further comprises accepting, by a first validation module, verified data regarding the common property and feeding back the verified data to the common property module to improve its calculations over time. In some embodiments, the method further comprises, accepting, by a second validation module, verified data regarding the street address of the rental property and feeding back the verified data to the application to improve its calculations over time.

Another aspect provided herein is a computer-implemented method of determining a street address of a rental property, the method comprising: receiving, by a rental listing module, a rental property listing for the rental property and at least one rental property depiction of the rental property listing; performing a data mining task process, by each of a plurality of first data ingestion interfaces to a unique external property data source, to determine at least one property record depiction, each property record depiction associated with a property record; applying, by a common property module, a first machine learning algorithm to the at least one rental property depiction and the at least one property record depiction from each data source to identify one or more common property records, wherein each common property record comprises a property record that refers to the rental property; and applying, by a property address module, a second machine learning algorithm to the at least one rental property depiction, the at least one property record depiction, or both, to determine the street address of the rental property based on a proximity of the street address of the common property to a known landmark.

In some embodiments, the first machine learning algorithm is trained by a neural network comprising: a collection module collecting a plurality of predetermined common property records; a first set module creating a first training set comprising the plurality of predetermined common property records and a plurality of predetermined non-common property records, wherein the plurality of predetermined non-common property records comprises two or more property records associated with different properties; and a first training module training the neural network using the first training set. In some embodiments, the neural network further comprises: a second set module creating a second training set for second stage training comprising the first training set and the predetermined non-common property records incorrectly detected as common property records by the first training module; and a second training module training the neural network using the second training set. In some embodiments, wherein at least one of the predetermined common property records or the predetermined non-common property records is manually collected. In some embodiments, at least one of the rental property depiction and the property record depiction comprises an image, a video, a map area, an audio file, a text description, or any combination thereof. In some embodiments, one or more of the image, the video, the map area, the audio file, or the text description describe a number of parking spaces, the distance to the known landmark, an amenity, a host name, a realtor name, a location characteristic, a number of bedrooms, a number of bathrooms, a number of stories, a number of parking spaces, a square footage, an amenity, a set of directions to the rental property, or any combination thereof. In some embodiments, the rental property depiction and the property record depiction comprise the image, and wherein the first machine learning algorithm is trained by a neural network comprising: a collection module collecting a plurality of predetermined common property images; a first set module creating a first training set comprising the plurality of predetermined common property images and a plurality of predetermined non-common property images, wherein the plurality of predetermined non-common property images comprises two or more images of different properties; and a first training module training the neural network using the first training set. In some embodiments, the neural network further comprises: a second set module creating a second training set for second stage training comprising the first training set, and the predetermined non-common property images incorrectly detected as common property images by the first training module; and a second training module training the neural network using the second training set. The receiving, by the rental listing module, the at least one rental property depiction of the rental property, comprises a third data ingestion interface performing a data mining task process to the rental property listing. The rental property listing comprises a vacation rental listing, a short-term rental listing, a home swap rental listing, or any combination thereof. The rental property listing comprises an AirBnB listing, a Craigslist listing, a VRBO listing, a HomeToGo listing, a VacationRentals.com listing, a FlipKey listing, a bookings.com listing, a OneFineStay listing, a 9flats listing, a Wimdu listing, a VayStays listing, a VacayHero listing, a Luxury Retreats listing, or any combination thereof. In some embodiments, the rental property is a house, an apartment, a condominium, a cabin, a mobile home, a land, or any combination thereof. In some embodiments, the external property data source comprises a vacation rental listing site, a short-term rental listing site, a home swap rental listing site, a sale property listing site, a permit database, a county record database, a state record database, a federal record database, a streetview, a map, or any combination thereof. In some embodiments, at least one of the property record and the common property record comprises a vacation rental listing, a short-term rental listing, a home swap rental listing, a sale property listing, a permit, a residency record, a county record, a state record, a federal record, a streetview, a map, or any combination thereof. In some embodiments, the landmark comprises a school, a park, a shop, a monument, a museum, a bus-stop, a train-stop, a school, a place of worship, a beach, a land feature, an office, a government building, or any combination thereof. In some embodiments, performing the data mining task process by the second data ingestion interface comprises: performing a photographic data mining task process to determine a street name, an address number, or both of the rental property; performing a lexicographical data mining task process to determine the street name, the address number, or both of the rental property; or both. In some embodiments, the method further comprises applying, by a property address module, a second machine learning algorithm to the at least one rental property depiction, the at least one property record depiction, or both and the street name or the address number, to determine the street address of the rental property. In some embodiments, performing the data mining task process, by the second data ingestion interface comprises: performing a photographic data mining task process to determine a neighboring address number of a property neighboring the rental property; performing a lexicographical data mining task process to determine a neighboring address number of a property neighboring the rental property; or both. In some embodiments, the method further comprises applying, by a property address module, a second machine learning algorithm to the at least one rental property depiction, the at least one property record depiction, the neighboring address number, or any combination thereof, to determine the street address of the rental property. In some embodiments, the method further comprises accepting, by a first validation module, verified data regarding the common property and feeding back the verified data to the common property module to improve its calculations over time. In some embodiments, the method further comprises, accepting, by a second validation module, verified data regarding the street address of the rental property and feeding back the verified data to the application to improve its calculations over time.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

The noise and traffic cause by short-term vacation rental properties form a burden on neighbors and local hotels. As such, while many cities restrict short term rentals and/or levy a Transient Occupancy Tax to prevent overuse of short-term rentals, individual rental property owners and rental property listings often do not list the rental property address to avoid paying such taxes. To ensure that the renter is able to access the property, the actual address is often only revealed once a reservation has been made, or within a certain number of days from the reservation date. Further, the communication of the rental address is often performed outside the structure of the rental listings.

As such, provided herein are media, systems, and methods that identify the address of a rental property directly or indirectly from public sources such as other rental listings, maps, and county property records. In some embodiments, the media, systems, and methods herein employ machine learning, image processing and natural language processing techniques, which may or may not be trained or supervised by a human.

Application to Detect an Unpermitted Renovation Event and Validate the Detected Event Described herein, in certain embodiments, are non-transitory computer-readable storage media encoded with a computer program including instructions executable by a processor to create an application to detect an unpermitted renovation event and validate the detected event.

Figure 1A:
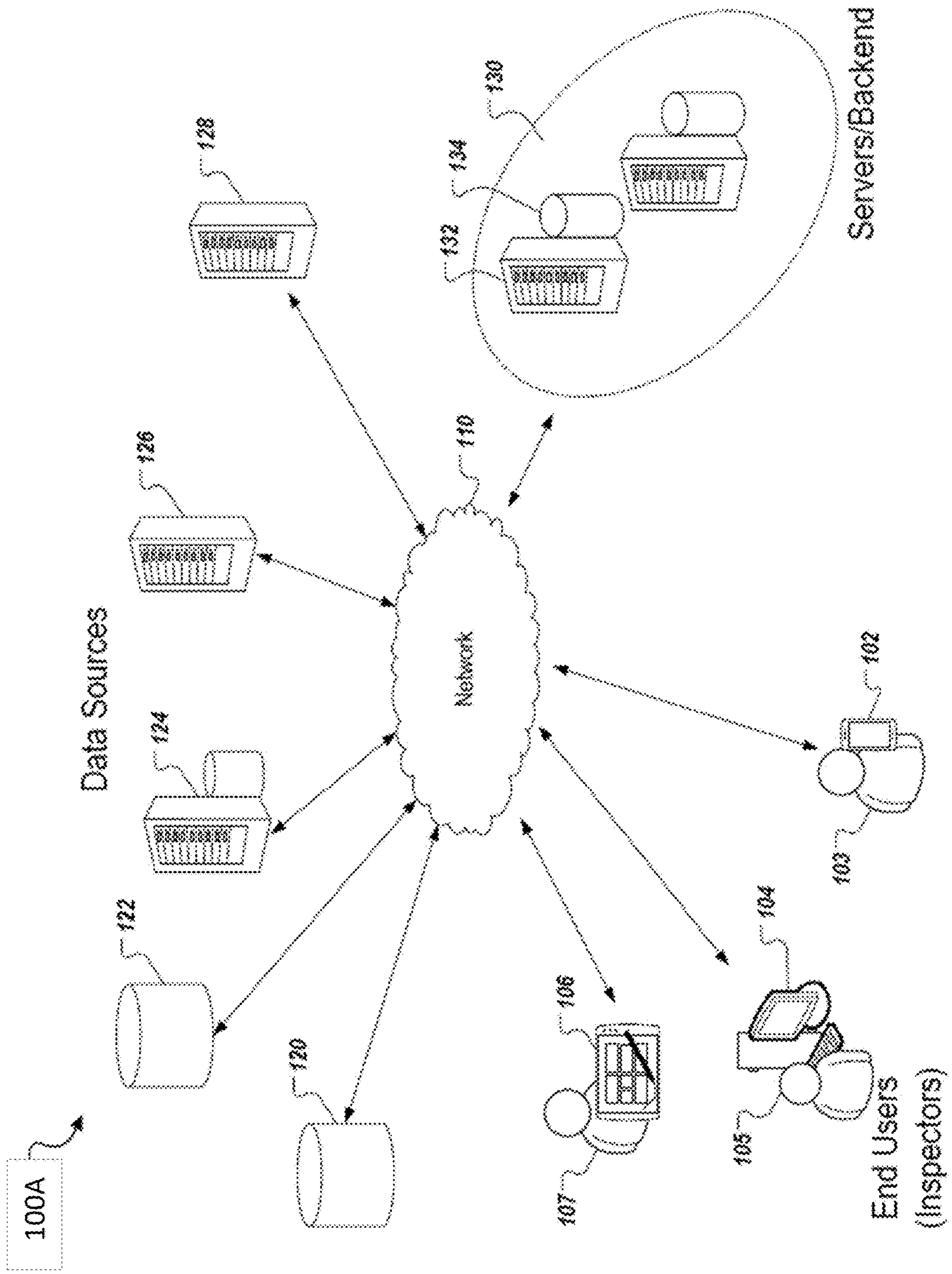
FIG. 1A is a non-limiting example of a schematic diagram; in this case, a first exemplary application to detect an unpermitted renovation event and validate the detected event, in accordance with some embodiments.

FIG. 1A is a non-limiting example of a schematic diagram; in this case, a first exemplary application to detect an unpermitted renovation event and validate the detected event. FIG. 1 depicts an example environment 100A that can be employed to execute embodiments of the present disclosure. The example system 100A includes computing devices 102, 104, 106, 108, a back-end system 130, and a network 110. In some embodiments, the network 110 includes a local area network (LAN), wide area network (WAN), the Internet, or a combination thereof, and connects web sites, devices (e.g., the computing devices 102, 104, 106, 108) and back-end systems (e.g., the back-end system 130). In some embodiments, the network 110 can be accessed over a wired and/or a wireless communications link. For example, mobile computing devices (e.g., the smartphone device 102 and the tablet device 106), can use a cellular network to access the network 110. In some examples, the users 122-126 may be working as agents for one of the participating clients in the consortium, such as described above. In some examples, the users 122-126 may be working as agents for different clients in the consortium.

In the depicted example, the back-end system 130 includes at least one server system 132 and a data store 134. In some embodiments, the at least one server system 132 hosts one or more computer-implemented services employed within the described system, such as XYZ, that users 122-126 can interact with using the respective computing devices 102-106. For example, the computing devices 102-106 may be used by respective users 122-126 XYZ through services hosted by the back-end system 130. In some embodiments, the back-end system 130 provides an application programming interface (API) services with which the server computing device 108 may communicate.

In some embodiments, back-end system 130 may include server-class hardware type devices. In some embodiments, back-end system 130 includes computer systems using clustered computers and components to act as a single pool of seamless resources when accessed through the network 110. For example, such embodiments may be used in data center, cloud computing, storage area network (SAN), and network attached storage (NAS) applications. In some embodiments, back-end system 130 is deployed using a virtual machine(s).

The computing devices 102, 104, 106 may each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the depicted example, the computing device 102 is a smartphone, the computing device 104 is a desktop computing device, and the computing device 106 is a tablet-computing device. The server computing device 108 may include any appropriate type of computing device, such as described above for computing devices 102-106 as well as computing devices with server-class hardware. In some embodiments, the server computing device 108 may include computer systems using clustered computers and components to act as a single pool of seamless resources. It is contemplated, however, that embodiments of the present disclosure can be realized with any of the appropriate computing devices, such as those mentioned previously.

Figure 1B:
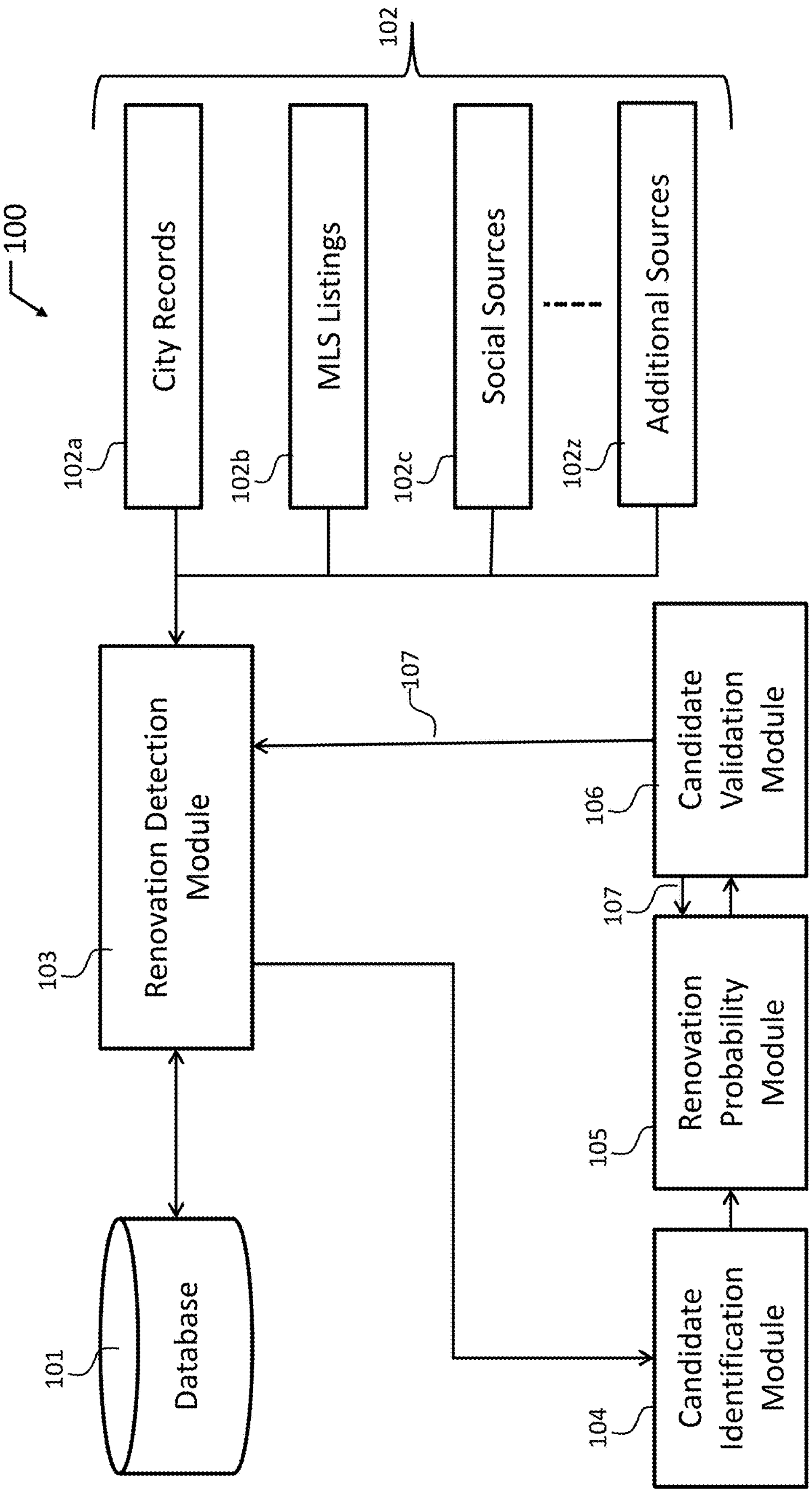
FIG. 1B is a non-limiting example of a schematic diagram; in this case, a second exemplary application to detect an unpermitted renovation event and validate the detected event, in accordance with some embodiments.

FIG. 1B is a schematic diagram; in this case, an exemplary application to detect an unpermitted renovation event and validate the detected event, in accordance with some embodiments. As seen in FIG. 1B, the exemplary schematic diagram of an exemplary application to detect an unpermitted renovation event and validate the detected event 100 comprises: a database 101; an external data source 102 comprising city records 102*a*, MLS listings 102*b*, social listings 102*c*, and additional sources 102*z*; a renovation detection module 103; a candidate identification module 104; a renovation probability module 105; and a candidate validation module 106. Alternatively, the elements of FIG. 1B delineate a schematic diagram of an exemplary system, method, and a platform.

Per FIG. 1, the renovation detection module 103 is configured to receive a data set from the database 101, and to receive data from an external data source 102. Optionally, in some embodiments, the external data source 102 comprises city records 102*a*, MLS listings 102*b*, social listings 102*c*, and additional sources 102*z*. Optionally, in some embodiments, the external data source 102 comprises at least one of city records 102*a*, MLS listings 102*b*, and social listings 102*c*.

Optionally, in some embodiments, the data set from the external data source 102 is defined by at least one of a street address, a parcel, a street, a lot, a zip code, a county, a state, an area drawn on a map, an area within a set radial distance from a location, coordinates set by one or more satellites, an area within a set driving distance of a location, a GPS point, and an area defined by at least three GPS points. Optionally, in some embodiments, the external data source 102 comprises city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, or the Internet. Optionally, in some embodiments, rental listings can include AirBnB or Craigslist.

Optionally, in some embodiments, the renovation detection module 103 comprises a plurality of data ingestion interfaces, each interface connecting to one external data source 102. Optionally, in some embodiments, the renovation detection module 103 comprises a plurality of data ingestion interfaces comprising at least one of a city records data ingestion interface, an MLS listings data ingestion interface, and a social listings data ingestion interface. Optionally, in some embodiments, each interface is configured to perform at least one of a natural language task process and a computer vision task process to its data source. Optionally, in some embodiments, each interface is configured to detect one or more unpermitted renovation event indicia within the data set from the external data source 102. Optionally, in some embodiments, each interface is configured to perform a data mining task process to its data source to detect one or more unpermitted renovation event indicia within the data set. Optionally, in some embodiments, the data mining process comprises a natural language task process, numerical data mining task process, or a photographic data mining task process.

Optionally, in some embodiments, the natural language task process comprises syntax interpretation, semantic interpretation, discourse interpretation, or speech interpretation. Optionally, in some embodiments, the syntax interpretation comprises lemmatization, morphological segmentation, part-of-speech tagging, parsing, sentence boundary disambiguation, stemming, word segmentation, or terminology extraction. Optionally, in some embodiments, the semantic interpretation comprises lexical semantics, machine translation, named entity recognition, natural language generation, natural language understanding, optical character recognition, question answering, recognizing textual entailment, relationship extraction, sentiment analysis, topic segmentation, or word sense disambiguation. Optionally, in some embodiments, the discourse interpretation comprises automatic summarization, coreference resolution, or discourse analysis. Optionally, in some embodiments, the speech interpretation comprises speech recognition, speech segmentation, and text-to-speech. Optionally, in some embodiments, the computer vision task process comprises analysis, object recognition, object identification, object detection, content-based image retrieval, optical character recognition, facial recognition, shape recognition, egomotion, object tracking, optical flow, or any combination thereof. In some embodiments, the natural language task process model employs word-level features, n-gram features, or both. The word-level features can be gleaned from textual descriptions. The textual descriptions can comprise stored property descriptions, headlines, property features, or any combination thereof. In some embodiments, the natural language task process model structures the textual descriptions. In some embodiments, the natural language task process model then presents the structured textual descriptions for model analysis. The model analysis can then rank the importance one or more of the structured textual descriptions by assessing their prevalence in the target data. In some cases, the model analysis ignores one or more textual descriptions. In some cases, the model analysis does not discard any textual descriptions.

Optionally, in some embodiments, the unpermitted renovation event comprises violations of building codes, past unpermitted renovations, present unpermitted renovations, additions to a property, upgrades to a property, or modifications to a property.

Optionally, in some embodiments, the renovation detection module 103 applies a machine learning algorithm to identify an initial candidate property based on the detection indicia within the data set from the external data source 102.

Optionally, in some embodiments, the detection of one or more unpermitted renovation event indicia comprises determining a square footage of a property, a change in the square footage of a property, a bed count of a property, a change in a bed count of a property, a bathroom count of a property, a change in a bathroom count of a property, a valuation of a property, a change in a valuation of the property, ownership of a property, a corporation owning a property, an owner with a history of flipping one or more properties, lenders on a property, a renovation scale, or liens on a property.

Per FIG. 1, the candidate identification module 104 can receive the initial candidate from the renovation detection module 103, identifies a candidate property, and send the candidate property to the renovation probability module 105. Optionally, in some embodiments, the renovation probability module 105 calculates a probability that an unpermitted renovation event has taken or is taking place at the candidate property. If the probability that an unpermitted renovation event has taken or is taking place at the candidate property is above a set threshold, the renovation probability module 105 can send at least one of the candidate and the probability to the candidate validation module 106.

Optionally, in some embodiments, the calculation comprises applying an increased weighted factor that the unpermitted renovation event has taken place if a property is owned by a corporation. Optionally, in some embodiments, the calculation comprises applying an increased weighted factor that the unpermitted renovation event has taken place if one or more corporate officers have previously flipped properties. Optionally, in some embodiments, the calculation comprises applying an increased weighted factor that the unpermitted renovation event has taken place if a property owner's social media displays renovations. Optionally, in some embodiments, the calculation comprises applying an increased weighted factor that the unpermitted renovation event has taken place if a real estate listing displays renovations. Optionally, in some embodiments, the calculation comprises calculating whether a probability threshold has been met.

Optionally, in some embodiments, the candidate validation module 106 receives at least one of the candidate and the probability to the candidate validation module, and a verified data 107 regarding the unpermitted renovation event. Per FIG. 1, the candidate validation module 106 can then feed back the verified data 107 to at least one of the renovation probability calculation module 105 and the renovation detection module 103 to improve its prediction over time. In some embodiments, the renovation detection module stores these calculations to improve predictions in the database 101.

Optionally, in some embodiments, the verified data 107 is acquired by a public official inspecting a candidate property. Optionally, in some embodiments, the verified data 107 is an issued permit for the renovated event at the initial candidate. Optionally, in some embodiments, the media further comprises a secondary screening module, wherein if the renovation probability module 105 calculates a probability in excess of a predetermined threshold, the secondary screening module proceeds to conduct further screening procedures.

Figure 2:
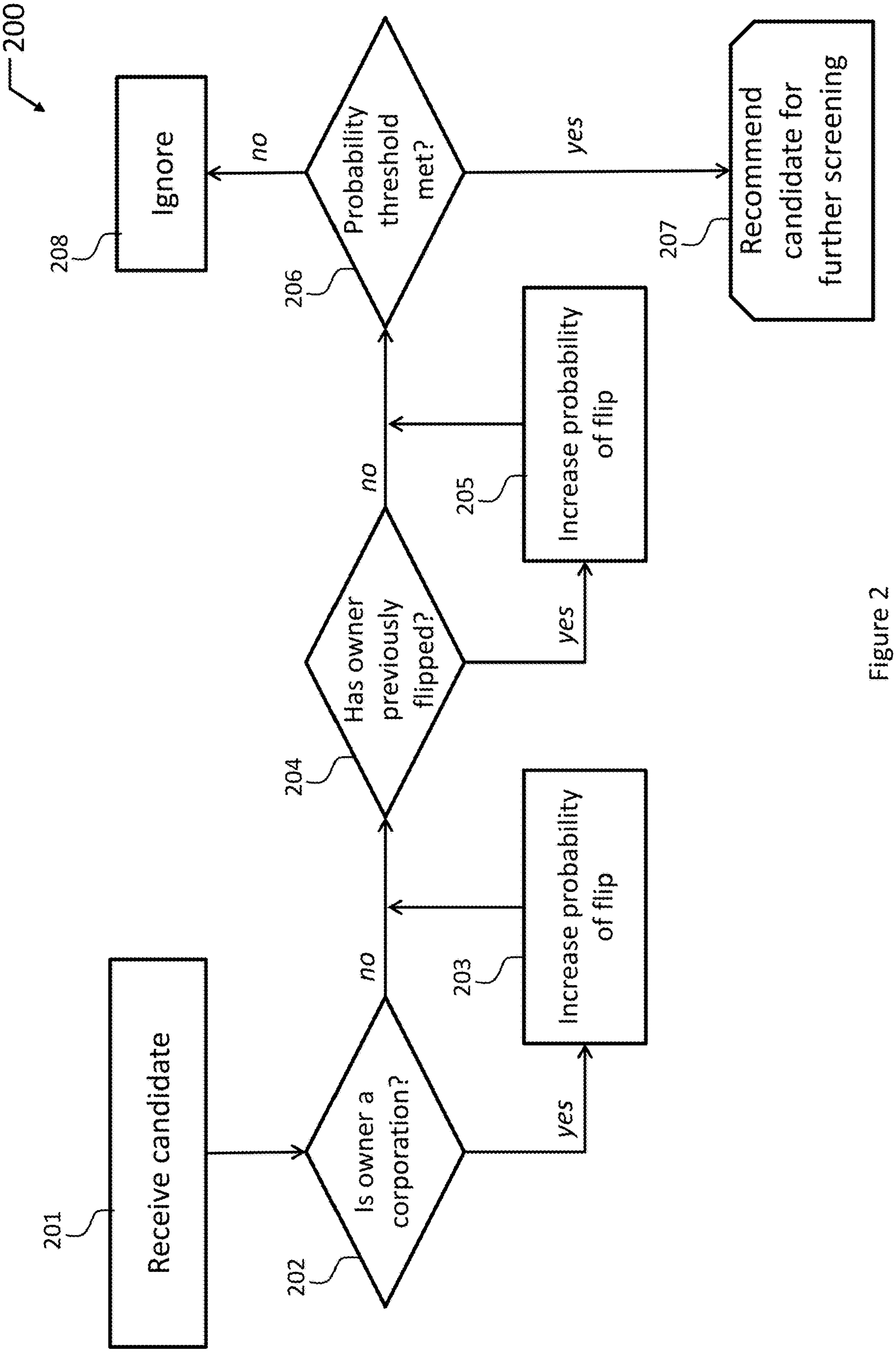
FIG. 2 is a non-limiting example of a schematic diagram; in this case, an exemplary process to identify an initial candidate, in accordance with some embodiments.

FIG. 2 is a schematic diagram; in this case, an exemplary process to identify an initial candidate, in accordance with some embodiments. As seen in FIG. 2, an initial candidate can be identified, wherein the renovation probability module 200 receives an initial candidate 201 from the initial candidate identification module, whereby the renovation probability module 200 determines whether or not the owner of the initial candidate property is a corporation 202. Optionally, in some embodiments, if the owner is a corporation, the probability that the renovation is a flip 203 is increased. Optionally, in some embodiments, if the owner is not a corporation, the probability that the renovation is a flip is not increased.

The renovation probability module 200 can then determine whether or not the owner of the initial candidate property has previously flipped a property 204. Optionally, in some embodiments, if the owner of the initial candidate property has previously flipped a property, the probability that the renovation is a flip is increased 205. Optionally, in some embodiments, if the owner of the initial candidate property has not previously flipped a property, the probability that the renovation is a flip is not increased. In some cases, the probability that the renovation is a flip is increased 203 205 by a set probability value. In some cases, the probability that the renovation is a flip is increased 203 205 by a variable probability value. Optionally, in other embodiments, the renovation probability module determines whether or not the owner of the initial candidate property has previously performed any number of unpermitted renovation act to a property. Optionally, in further embodiments, the renovation probability module performs the aforementioned steps for the unpermitted renovation act.

Per FIG. 2, the renovation probability module 200 can determine if a probability that the renovation is a flip reaches a certain threshold. Optionally, in some embodiments, if the probability threshold is met, the renovation probability module 200 recommends the initial candidate for further screening 207. Alternatively, if the probability threshold is not met, the probability module 200 can recommend that the initial candidate be ignored 208. Optionally, in some embodiments, if the probability threshold is not met, the probability module prioritizes candidates higher than others based on this stage and all properties will be fed into the next module. Optionally, in some embodiments, probability module 200 is configured to send the recommendation that the initial candidate requires further screening 207 to the candidate validation module.

Optionally, in some embodiments, the renovation probability module 200 can be further configured to receive a verified data from the validation module. The verified data can then be used to adjust the set or variable probability value the renovation is a flip is increased 203 205 by to improve its prediction over time. A prediction improvement can ensure that the initial candidates for further screening 207 require further screening, the initial candidate that are ignored 208 should be ignored, or both.

Optionally, in some embodiments, the unpermitted renovation event comprises violations of building codes, past unpermitted renovations, present unpermitted renovations, additions to a property, upgrades to a property, or modifications to a property. Optionally, in some embodiments, the verified data is acquired by a public official inspecting an initial candidate property. Optionally, in some embodiments, the verified data is an issued permit for the renovated event at the initial candidate. Optionally, in some embodiments, the media further comprises a secondary screening module, wherein if the probability calculation module calculates a probability in excess of a predetermined threshold, the secondary screening module proceeds to conduct further screening procedures.

Figure 3:
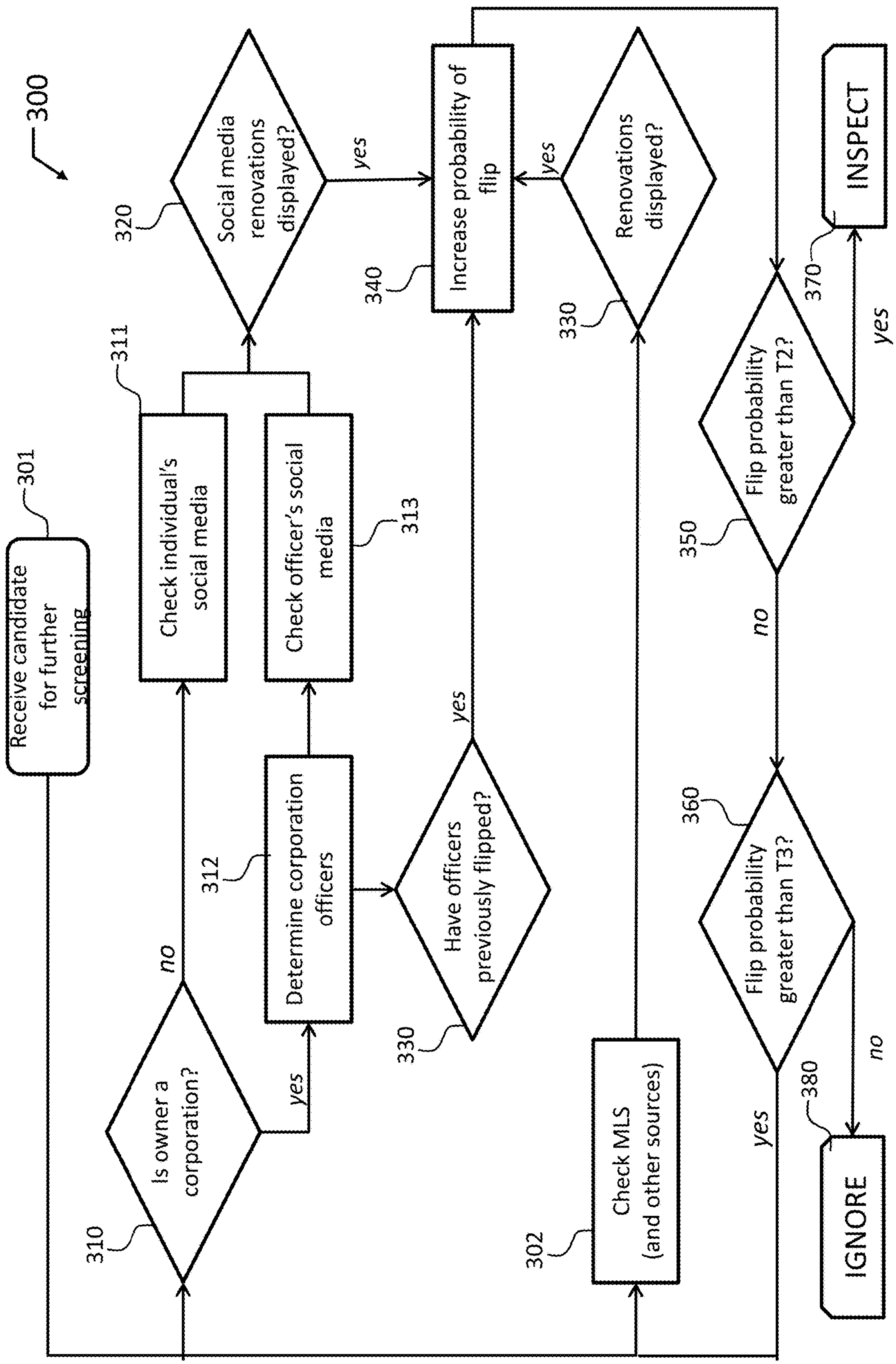
FIG. 3 is a non-limiting example of a schematic diagram; in this case, an exemplary process to calculate a probability that an unpermitted renovation event has taken place.

FIG. 3 is a schematic diagram; in this case, an exemplary process to calculate a probability that an unpermitted renovation event has taken place. As seen in FIG. 3, the renovation probability module 300 can calculate a probability that an unpermitted renovation event has taken place by receiving a candidate for further screening 201 from the renovation probability module, whereby the renovation probability module 300 determines whether or not the owner of the candidate property is a corporation 310. Optionally, in some embodiments, if the owner of the candidate property is not a corporation, or if the owner is an individual, the renovation probability module 300 checks the individual's social media 311. Alternatively, if the owner of the candidate property is a corporation, or is not an individual, the renovation probability module 300 determines the officer or officers of the corporation 312 and checks the officer's or officers' social media 313. Optionally, in some embodiments, if either the individual's social media 311 or the officer social media 313 displays renovations 320, then the probability of a flip is increased 340. Additionally, if the owner of the candidate property is a corporation, or is not an individual, the renovation probability module 300 can determine whether or not the officer of the corporation have previously flipped a property 330 and increase the probability of a flip 340 if such evidence is found.

Additionally, in series or in parallel, the renovation probability module 300 can check MLS listings and other sources 302 to determine whether renovations are displayed 330, whereby the probability of a flip is increased 340 if such evidence is found.

Additionally, the renovation probability module 300 can then determine whether or not the probability of a flip is greater than a T2 threshold 350. Optionally, in some embodiments, the T2 threshold comprises a set threshold or a variable threshold, whereby flip probabilities above the T2 value are highly indicative of a flip, and potential unpermitted renovations associated with the flip. Per FIG. 3, the renovation probability module 300 submits an instruction to inspect the candidate property 370 if the probability of a flip is greater than the T2 threshold. Alternatively, if the probability of a flip is less than the T2 threshold, the renovation probability module 300 determines whether or not the probability of a flip is greater than a T3 threshold 360. Optionally, in some embodiments, the T3 threshold comprises a set threshold or a variable threshold, whereby flip probabilities above the T3 value are moderately indicative of a flip and require further evidence and/or analysis to increase the certainty of a flip before inspection, and whereby T3 represents a lower probability than T2. Per FIG. 3, the renovation probability module 300 submits an instruction to ignore the candidate property 380 if the probability of a flip is less than the T3 threshold. Alternatively, if the probability of a flip is greater than the T3 threshold (and less than the T2 threshold 350) the renovation probability module 300 performs further research and analysis by rechecking the individual's or corporation's social media 311 313 and checking MLS and other sources 302.

Optionally, in some embodiments, the renovation probability module 300 is further configured to feed back the verified data to the renovation probability calculation module to improve its prediction over time.

Figure 7:
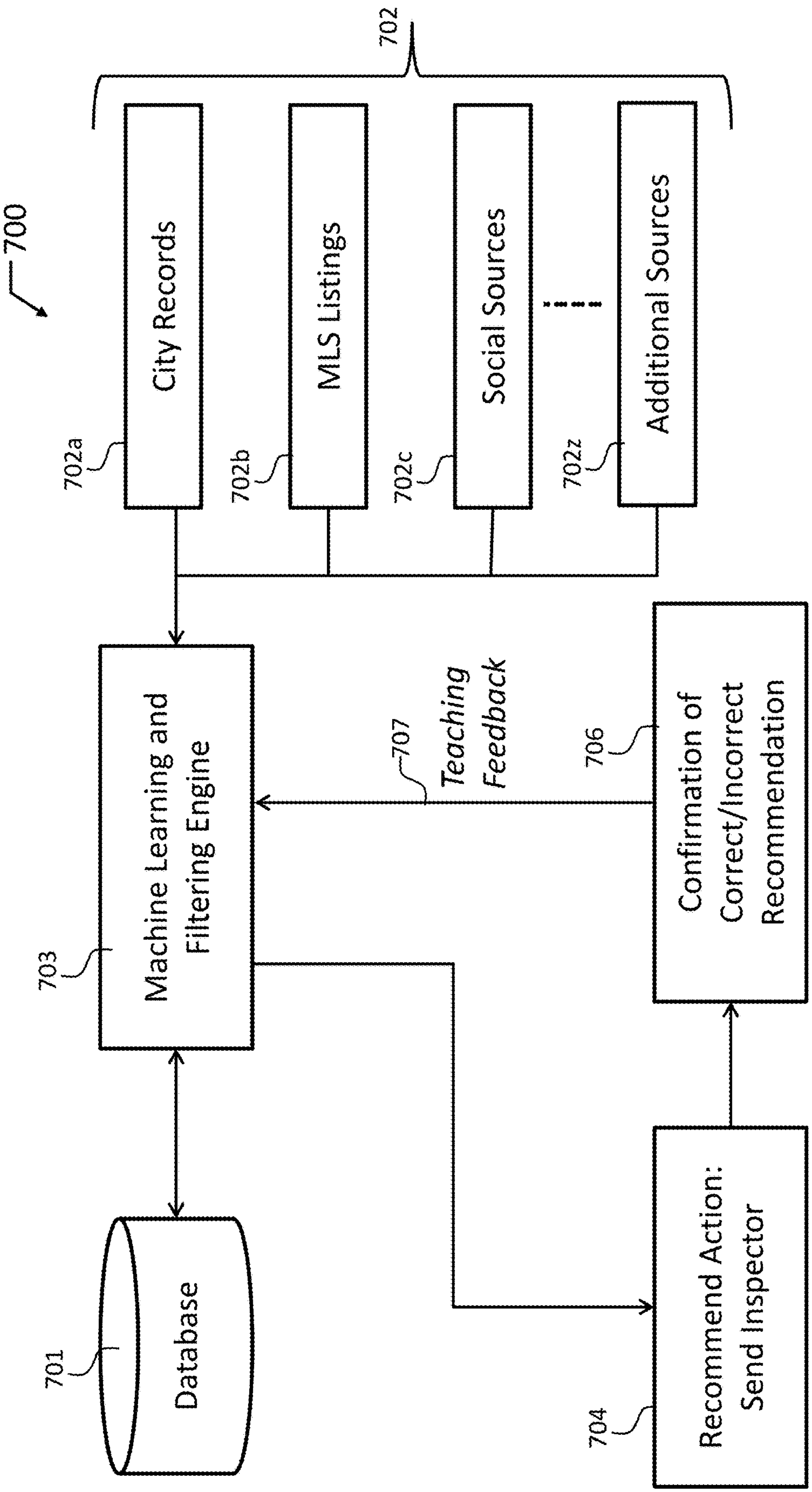
FIG. 7 is a non-limiting example of a schematic diagram; in this case, an exemplary application to detection an unpermitted renovation event and validate the detected event, in accordance with some embodiments.

FIG. 7 is an exemplary schematic diagram of an exemplary application to detect an unpermitted renovation event and validate the detected event, in accordance with some embodiments. As seen in FIG. 7, the exemplary schematic diagram of an exemplary application to detect an unpermitted renovation event and validate the detected event 700 comprises: a database 701; an external data source 702 comprising city records **702*a*, MLS listings 702*b*, social listings 702*c*, and additional sources 702*z*; a machine learning and filtering engine 703; a recommended action to send an inspector 704; and a confirmation of a correct/incorrect recommendation 706**.

Per FIG. 7, the machine learning and filtering engine 703 is configured to receive a data set from the database 701, and to receive data from an external data source 702. Optionally, in some embodiments, the external data source 702 comprises city records 702*a*, MLS listings 702*b*, social listings 702*c*, and additional sources 702*z*. Optionally, in some embodiments, the external data source 702 comprises at least one of city records 702*a*, MLS listings 702*b*, and social listings 702*c*.

Optionally, in some embodiments, the data set from the external data source 702 is defined by at least one of a street address, a parcel, a street, a lot, a zip code, a county, a state, an area drawn on a map, an area within a set radial distance from a location, coordinates set by one or more satellites, an area within a set driving distance of a location, a GPS point, and an area defined by at least three GPS points. Optionally, in some embodiments, the external data source 702 comprises city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, or the Internet. Optionally, in some embodiments, rental listings can include AirBnB or Craigslist.

Optionally, in some embodiments, the machine learning and filtering engine 703 comprises a plurality of data ingestion interfaces, each interface connecting to one external data source 702. Optionally, in some embodiments, the machine learning and filtering engine 703 comprises a plurality of data ingestion interfaces comprising at least one of a city records data ingestion interface, an MLS listings data ingestion interface, and a social listings data ingestion interface. Optionally, in some embodiments, each interface is configured to perform at least one of a natural language task process and a computer vision task process on its data source. Optionally, in some embodiments, each interface is configured to detect one or more unpermitted renovation event indicia within the data set from the external data source 702. Optionally, in some embodiments, each interface is configured to perform a data mining task process to its data source to detect one or more unpermitted renovation event indicia within the data set. Optionally, in some embodiments, the data mining process comprises a natural language task process, numerical data mining task process, or a photographic data mining task process.

Optionally, in some embodiments, the natural language task process comprises syntax interpretation, semantic interpretation, discourse interpretation, or speech interpretation. Optionally, in some embodiments, the syntax interpretation comprises lemmatization, morphological segmentation, part-of-speech tagging, parsing, sentence boundary disambiguation, stemming, word segmentation, or terminology extraction. Optionally, in some embodiments, the semantic interpretation comprises lexical semantics, machine translation, named entity recognition, natural language generation, natural language understanding, optical character recognition, question answering, recognizing textual entailment, relationship extraction, sentiment analysis, topic segmentation, or word sense disambiguation. Optionally, in some embodiments, the discourse interpretation comprises automatic summarization, coreference resolution, or discourse analysis. Optionally, in some embodiments, the speech interpretation comprises speech recognition, speech segmentation, and text-to-speech. Optionally, in some embodiments, the computer vision task process comprises object recognition, object identification, object detection, content-based image retrieval, optical character recognition, facial recognition, shape recognition, egomotion, object tracking, optical flow, or any combination thereof.

Optionally, in some embodiments, the unpermitted renovation event comprises violations of building codes, past unpermitted renovations, present unpermitted renovations, additions to a property, upgrades to a property, or modifications to a property.

Optionally, in some embodiments, the machine learning and filtering engine 703 applies a machine learning algorithm to identify an initial candidate property based on the detection indicia within the data set from the external data source 702.

Optionally, in some embodiments, the detection of one or more unpermitted renovation event indicia comprises determining a square footage of a property, a change in the square footage of a property, a bed count of a property, a change in a bed count of a property, a bathroom count of a property, a change in a bathroom count of a property, a valuation of a property, a change in a valuation of the property, ownership of a property, a corporation owning a property, an owner with a history of flipping one or more properties, lenders on a property, a renovation scale, or liens on a property.

Per FIG. 7, the recommended action to send an inspector 704 can be sent by the machine learning and filtering engine 703, whereby the confirmation of correct/incorrect recommendation 706 is then initiated. Optionally, in some embodiments, the machine learning and filtering engine 703 calculates a probability that an unpermitted renovation event has taken or is taking place at the candidate property. If the probability that an unpermitted renovation event has taken or is taking place at the candidate property is above a set threshold, the machine learning and filtering engine 703 sends an instruction for the confirmation of correct/incorrect recommendation 706.

Optionally, in some embodiments, the calculation comprises applying an increased weighted factor that the unpermitted renovation event has taken place if a property is owned by a corporation. Optionally, in some embodiments, the calculation comprises applying an increased weighted factor that the unpermitted renovation event has taken place if one or more corporate officers have previously flipped properties. Optionally, in some embodiments, the calculation comprises applying an increased weighted factor that the unpermitted renovation event has taken place if a property owner's social media displays renovations. Optionally, in some embodiments, the calculation comprises applying an increased weighted factor that the unpermitted renovation event has taken place if a real estate listing displays renovations. Optionally, in some embodiments, the calculation comprises calculating whether a probability threshold has been met.

Optionally, in some embodiments, the confirmation of a correct/incorrect recommendation 706 is initiated by at least one of the candidate and the probability to the candidate validation module, and a verified data 707 regarding the unpermitted renovation event. Per FIG. 7, the confirmation of a correct/incorrect recommendation 706 can then feed back the verified data 707 to at least one of the renovation probability calculation module 703 and the machine learning and filtering engine 703, based on whether or not the correct or incorrect recommendation is provided, to improve its prediction over time.

Optionally, in some embodiments, the verified data 707 is acquired by a public official inspecting a candidate property. Optionally, in some embodiments, the verified data 707 is an issued permit for the renovated event at the initial candidate. Optionally, in some embodiments, the media further comprises a secondary screening module, wherein if the renovation probability module 705 calculates a probability in excess of a predetermined threshold, the secondary screening module proceeds to conduct further screening procedures.

Another aspect disclosed herein is a computer-implemented method of training a neural network for detection of an unpermitted renovation event, the method comprising: collecting a data from a data source by a plurality of data ingestion interfaces; applying one or more data mining task processes to the data from a data source to determine one or more digital unpermitted renovation event indicia; creating a first training set comprising the collected data from a data source, the digital unpermitted renovation event indicia, and a set of digital permitted renovation event indicia; training the neural network in a first stage using the first training set; creating a second training set for a second stage of training comprising the first training set and digital permitted renovation event indicia that are incorrectly detected as unpermitted renovations after the first stage of training; and training the neural network in a second stage using the second training set.

Another aspect provided herein is a computer-implemented method of training a neural network for detection of an unpermitted renovation event, the method comprising: collecting a data from a data source by a plurality of data ingestion interfaces; applying one or more data mining task processes to the data from a data source to determine one or more digital unpermitted renovation event indicia; determining an initial candidate from the data from a data source based on the digital unpermitted event indicia; determining a probability that an unpermitted renovation event has taken or is taking place at the initial candidate creating a first training set comprising the collected digital unpermitted renovation event indicia, the determined probability that the unpermitted renovation event has taken or is taking place at the initial candidate and a set of digital permitted renovation event indicia; training the neural network in a first stage using the first training set; creating a second training set for a second stage of training comprising the first training set and the digital permitted renovation event indicia that are detected to have a set minimum probability that the unpermitted renovation event has taken or is taking place at the initial candidate, after the first stage of training; and training the neural network in a second stage using the second training set.

Another aspect provided herein is a computer-implemented method of training a neural network for detection of an active unpermitted renovation event, the method comprising: collecting a data from a data source by a plurality of data ingestion interfaces; applying one or more data mining task processes to the data from a data source to determine one or more digital active unpermitted renovation event indicia; determining an initial candidate from the data from a data source based on the digital active unpermitted event indicia; determining a probability that an active unpermitted renovation event has taken or is taking place at the initial candidate creating a first training set comprising the collected digital active unpermitted renovation event indicia, the determined probability that the active unpermitted renovation event has taken or is taking place at the initial candidate and a set of digital permitted renovation event indicia; training the neural network in a first stage using the first training set; creating a second training set for a second stage of training comprising the first training set and the digital permitted renovation event indicia that are detected to have a set minimum probability that the active unpermitted renovation event has taken or is taking place at the initial candidate, after the first stage of training; and training the neural network in a second stage using the second training set.

Another aspect disclosed herein is a computer-implemented method of training a neural network for detection of an improper real estate transfer, the method comprising: collecting a data from a data source by a plurality of data ingestion interfaces; applying one or more data mining task processes to the data from a data source to determine one or more digital improper real estate transfer indicia; creating a first training set comprising the collected data from a data source, the digital improper real estate transfer indicia, and a set of digital proper real estate transfer indicia; training the neural network in a first stage using the first training set; creating a second training set for a second stage of training comprising the first training set and digital proper real estate transfer indicia that are incorrectly detected as improper real estate transfers, after the first stage of training; and training the neural network in a second stage using the second training set.

Another aspect provided herein is a computer-implemented method of training a neural network for detection of an improper real estate transfer, the method comprising: collecting a data from a data source by a plurality of data ingestion interfaces; applying one or more data mining task processes to the data from a data source to determine one or more digital improper real estate transfer indicia; determining an initial candidate from the data from a data source based on the digital improper event indicia; determining a probability that an improper real estate transfer has taken or is taking place at the initial candidate creating a first training set comprising the collected digital improper real estate transfer indicia, the determined probability that the improper real estate transfer has taken or is taking place at the initial candidate and a set of digital proper real estate transfer indicia; training the neural network in a first stage using the first training set; creating a second training set for a second stage of training comprising the first training set and the digital proper real estate transfer indicia that are detected to have a set minimum probability that the improper real estate transfer has taken or is taking place at the initial candidate, after the first stage of training; and training the neural network in a second stage using the second training set.

Another aspect provided herein is a computer-implemented method of training a neural network for detection of an active improper real estate transfer, the method comprising: collecting a data from a data source by a plurality of data ingestion interfaces; applying one or more data mining task processes to the data from a data source to determine one or more digital active improper real estate transfer indicia; determining an initial candidate from the data from a data source based on the digital active improper event indicia; determining a probability that an active improper real estate transfer has taken or is taking place at the initial candidate creating a first training set comprising the collected digital active improper real estate transfer indicia, the determined probability that the active improper real estate transfer has taken or is taking place at the initial candidate and a set of digital proper real estate transfer indicia; training the neural network in a first stage using the first training set; creating a second training set for a second stage of training comprising the first training set and the digital proper real estate transfer indicia that are detected to have a set minimum probability that the active improper real estate transfer has taken or is taking place at the initial candidate, after the first stage of training; and training the neural network in a second stage using the second training set.

Another aspect provided herein is a computer-implemented method of training a neural network for detection of an active unpermitted renovation event, the method comprising: collecting a data from a data source by a plurality of data ingestion interfaces; applying one or more data mining task processes to the data from a data source to determine one or more digital active unpermitted renovation event indicia; determining an initial candidate from the data from a data source based on the digital active unpermitted event indicia; determining an estimated time range that an active unpermitted renovation event has taken or is taking place at the initial candidate creating a first training set comprising the collected digital active unpermitted renovation event indicia, the estimated time range that the active unpermitted renovation event has taken or is taking place at the initial candidate and a set of digital time ranges that an active unpermitted renovation event has taken place; training the neural network in a first stage using the first training set; creating a second training set for a second stage of training comprising the first training set and the digital permitted renovation event indicia that are detected to have a set minimum estimated time range that the active unpermitted renovation event has taken or is taking place at the initial candidate, after the first stage of training; and training the neural network in a second stage using the second training set.

Another aspect disclosed herein is a computer-implemented method of training a neural network for detection of an improper residency status, the method comprising: collecting a data from a data source by a plurality of data ingestion interfaces; applying one or more data mining task processes to the data from a data source to determine one or more digital improper residency status indicia; creating a first training set comprising the collected data from a data source, the digital improper residency status indicia, and a set of digital proper residency status indicia; training the neural network in a first stage using the first training set; creating a second training set for a second stage of training comprising the first training set and digital proper residency status indicia that are incorrectly detected as improper residencies after the first stage of training; and training the neural network in a second stage using the second training set.

Another aspect provided herein is a computer-implemented method of training a neural network for detection of an improper residency status, the method comprising: collecting a data from a data source by a plurality of data ingestion interfaces; applying one or more data mining task processes to the data from a data source to determine one or more digital improper residency status indicia; determining an initial candidate from the data from a data source based on the digital improper event indicia; determining a probability that an improper residency status has taken or is taking place at the initial candidate creating a first training set comprising the collected digital improper residency status indicia, the determined probability that the improper residency status has taken or is taking place at the initial candidate and a set of digital proper residency status indicia; training the neural network in a first stage using the first training set; creating a second training set for a second stage of training comprising the first training set and the digital proper residency status indicia that are detected to have a set minimum probability that the improper residency status has taken or is taking place at the initial candidate, after the first stage of training; and training the neural network in a second stage using the second training set.

Another aspect provided herein is a computer-implemented method of training a neural network for detection of an active improper residency status, the method comprising: collecting a data from a data source by a plurality of data ingestion interfaces; applying one or more data mining task processes to the data from a data source to determine one or more digital active improper residency status indicia; determining an initial candidate from the data from a data source based on the digital active improper event indicia; determining a probability that an active improper residency status has taken or is taking place at the initial candidate creating a first training set comprising the collected digital active improper residency status indicia, the determined probability that the active improper residency status has taken or is taking place at the initial candidate and a set of digital proper residency status indicia; training the neural network in a first stage using the first training set; creating a second training set for a second stage of training comprising the first training set and the digital proper residency status indicia that are detected to have a set minimum probability that the active improper residency status has taken or is taking place at the initial candidate, after the first stage of training; and training the neural network in a second stage using the second training set.

Another aspect disclosed herein is a computer-implemented method of training a neural network for detection of an improper tax status, the method comprising: collecting a data from a data source by a plurality of data ingestion interfaces; applying one or more data mining task processes to the data from a data source to determine one or more digital improper tax status indicia; creating a first training set comprising the collected data from a data source, the digital improper tax status indicia, and a set of digital proper tax status indicia; training the neural network in a first stage using the first training set; creating a second training set for a second stage of training comprising the first training set and digital proper tax status indicia that are incorrectly detected as improper tax status after the first stage of training; and training the neural network in a second stage using the second training set.

Another aspect provided herein is a computer-implemented method of training a neural network for detection of an improper tax status, the method comprising: collecting a data from a data source by a plurality of data ingestion interfaces; applying one or more data mining task processes to the data from a data source to determine one or more digital improper tax status indicia; determining an initial candidate from the data from a data source based on the digital improper event indicia; determining a probability that an improper tax status has taken or is taking place at the initial candidate creating a first training set comprising the collected digital improper tax status indicia, the determined probability that the improper tax status has taken or is taking place at the initial candidate and a set of digital proper tax status indicia; training the neural network in a first stage using the first training set; creating a second training set for a second stage of training comprising the first training set and the digital proper tax status indicia that are detected to have a set minimum probability that the improper tax status has taken or is taking place at the initial candidate, after the first stage of training; and training the neural network in a second stage using the second training set.

Another aspect provided herein is a computer-implemented method of training a neural network for detection of an active improper tax status, the method comprising: collecting a data from a data source by a plurality of data ingestion interfaces; applying one or more data mining task processes to the data from a data source to determine one or more digital active improper tax status indicia; determining an initial candidate from the data from a data source based on the digital active improper event indicia; determining a probability that an active improper tax status has taken or is taking place at the initial candidate creating a first training set comprising the collected digital active improper tax status indicia, the determined probability that the active improper tax status has taken or is taking place at the initial candidate and a set of digital proper tax status indicia; training the neural network in a first stage using the first training set; creating a second training set for a second stage of training comprising the first training set and the digital proper tax status indicia that are detected to have a set minimum probability that the active improper tax status has taken or is taking place at the initial candidate, after the first stage of training; and training the neural network in a second stage using the second training set.

At least one of the first stage of training and the second stage of training can employ a similarity metric to find large datasets which are similar to a small hand-annotated dataset. At least one of the first stage of training and the second stage of training can be refined and re-trained using human feedback. In some embodiments, at least one of the first stage of training and the second stage of training comprises a distant supervision method. The distant supervision method can create a large training set seeded by a small hand-annotated training set. The distant supervision method can comprise positive-unlabeled learning with the training set as the ‘positive’ class. The distant supervision method can employ a logistic regression model, a recurrent neural network, or both. The recurrent neural network can be advantageous for Natural Language Processing (NLP) machine learning. In some embodiments, at least one of the first stage of training and the second stage of training comprises a human annotated method. The human annotated method can employ labels can be provided by a hand-crafted heuristic. For example, the hand-crafted heuristic can comprise examining differences between public and county records. The semi-supervised labels can be determined using a clustering technique to find properties similar to those flagged by previous human annotated labels and previous semi-supervised labels. The semi-supervised labels can employ a XGBoost, a neural network, or both.

Assigning Unpermitted Renovation Visit to Inspectors

Figure 8:
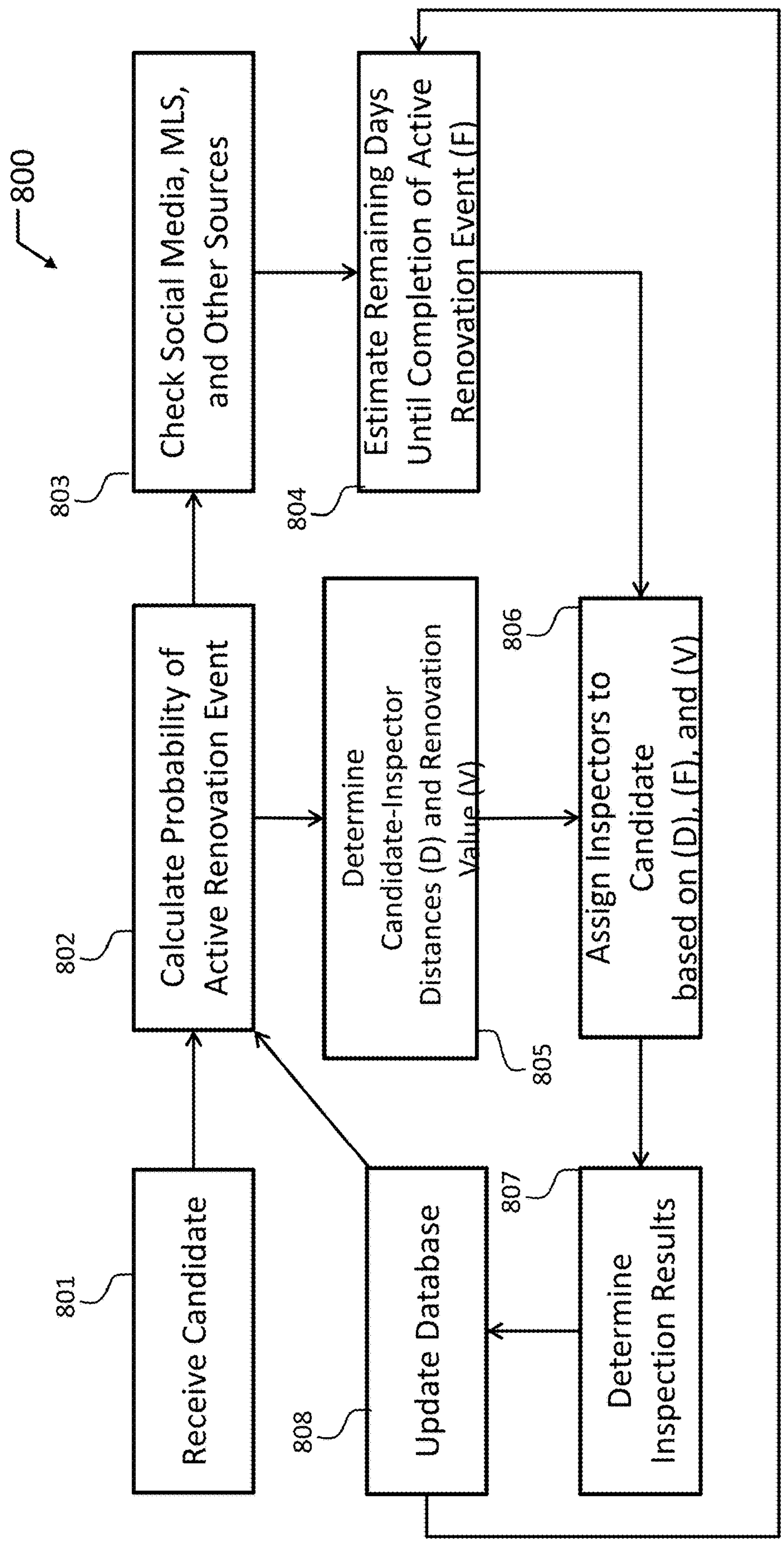
FIG. 8 is a non-limiting example of a schematic diagram; in this case, an exemplary application to assign unpermitted renovation visit to inspectors after receiving a candidate and validating the assignment, in accordance with some embodiments.

FIG. 8 is an exemplary schematic diagram of an exemplary application to assign unpermitted renovation visit to inspectors, in accordance with some embodiments. As seen in FIG. 8, the exemplary application to assign unpermitted renovation visit to inspectors 800 comprises a receiving a candidate 801, calculating a probability of active renovation event 802, checking social media, MLS, and other sources 803, determining remaining days until completion of active renovation event (F) 804, determining candidate-inspector distances 805, assigning inspectors to candidate based on (D) and (F) 806, determining inspection results 807, and updating the database 808. Alternatively, the application to assign unpermitted renovation visit to inspectors 800 comprises a receiving a candidate 801, calculating a probability of active renovation event 802, checking social media, MLS, and other sources 803, and determining remaining days until completion of active renovation event (F) 804. In some embodiments, the application to assign unpermitted renovation visit to inspectors 800 does not comprise determining candidate-inspector distances 805, assigning inspectors to candidate based on (D) and (F) 806, determining inspection results 807, or updating the database 808.

As seen in FIG. 8, the application to detect an unpermitted renovation event at a candidate and validate the detected event can further comprise an application to assign inspectors to the candidate 800. In some instances, the authorities who enforce the various regulations have a limited number of inspectors and other sources. Hence, in some instances, it can occur that the ability to find such properties can exceed the ability of the appropriate authorities to undertake inspection or enforcement action. Accordingly, in some instances, it is beneficial to prioritize the list of properties for the authorities to optimize or maximize the efficiency of inspecting or taking enforcement action depending on the kind of renovation. Optionally, in some embodiments, it is also or alternatively beneficial to prioritize the list of active renovation event by an estimation of the value of the renovation, amount of dollars spent on the renovation, the potential fee and penalties to be collected, or impact on property taxes.

Data mining techniques can be used to identify unpermitted renovations. In many instances, it is easier for the authority to act upon an active renovation than a historical one because the authority can just go to the property to observe the activity as it is going on. It is particularly advantageous to identify those properties while the renovation is still in progress. The inspection assignment applications herein are further configured to properly assign potential unpermitted properties to inspectors, to ensure that a maximum quantity and/or quality of potential evidence can be collected.

Per FIG. 8, in some embodiments, the application to assign unpermitted renovation visit to inspectors 800 comprises receiving a candidate 801, as determined per FIG. 1, 2, or 3. The application calculates the probability of an active renovation event occurring at the candidate 802. Optionally, in some embodiments, the application then checks social media, MLS data, and other sources 803 to determine an estimated remaining number of days until completion of the active renovation event (F) 804. Optionally, in some embodiments, the application can further determine the candidate-inspector distances (D) 805. Optionally, in some embodiments, the application can further determine the location of other scheduled inspections for the candidate-inspector. Optionally, in some embodiments, the application can further determine the infringement type and the appropriate candidate-inspector skill. Optionally, in some embodiments, the application can further determine whether there is the potential to inspect at an Open House (e.g., inspect indoors and easily access other areas in the property not normally easily viewable or accessible from outdoors) if one is scheduled. In further embodiments, the application can assign inspectors to the candidate based on the (D) distance from the property and the one or more candidates and (F) 806. Subsequently, the inspector can determine inspection results 807, and update the database 808 with any garnered information. Optionally, in some embodiments, the application to assign unpermitted renovation visit to inspectors 800 is permitted to run automatically every period of time to schedule and/or reschedule the property-inspector assignments. Optionally, in some embodiments, the period of time is equal to, one minute, thirty minutes, one hour, 12 hours, one day, one week, one month, or one year.

Optionally, in some embodiments, the calculation of the probability of an active renovation event is based on at least one of the recency of the purchase date, the recency of an unpermitted renovation indicia, the flip probability, and the determination that the owner is a corporation. The indicia of active renovations can comprise a current renovation probability factor that the predicted unpermitted renovation at the candidate property comprises an active renovation. Optionally, in some embodiments, checking social media, MLS data, and other sources 803 garners further indicia of active renovations. These further indicia can be used to recalculate the active renovation probability event factor, and/or to increase confidence in the active renovation event probability factor. Further, checking social media, MLS data, and other sources 803 can provide further evidence necessary to determine an estimated number of days remaining in the renovation (F) 804. Optionally, in some embodiments, the calculation of the probability of an active renovation event 802 is further associated with a determination of the number for remaining renovation days (F) 804. Checking social media, MLS data, and other sources 803 can comprise reviewing street or satellite images, determining specific social media indicia such as the terms "stage," "almost done," or "halfway there." Optionally, in some embodiments, the estimation is based on the remaining amount of time until completion of an active renovation event. Optionally, in some embodiments the active renovation event is further prioritized by an estimation of the value of the renovation, since fees and penalties can depend on this value.

Such evidence necessary to determine an estimated number of days or time remaining in the renovation (F) 804 can comprise evidence of the purchase or use of materials, tools, or services associated with early or late stages of construction. Materials associated with early stages of construction can comprise, for example, wood or concrete, whereby materials associated with later stages of construction can comprise, for example, paint, plaster, appliances and fixtures. Tool rentals or purchases associated with early stages of construction can comprise, for example, demolition bins and jack hammers, whereby materials associated with later stages of construction can comprise, for example, paintbrushes, and tile cutters. Services associated with early stages of construction can comprise, for example, waste removal and plumbing, whereby services associated with later stages of construction can comprise, for example, electrical instillation, and appliance delivery.

The determination of a property-inspector distance (D) 805 ensures optimal use of the available inspectors. Optionally, in some embodiments, the property-inspector distance (D) comprises a distance between the address of the property and the inspector's home address, the governmental agency's address, a prior inspection property, or any combination thereof. The (D) value associated with one inspector can be equal to the (D) value of one or more other inspectors. The (D) value associated with one inspector can be unequal to the (D) value of one or more other inspectors. Optionally, in some embodiments, the prior inspection property comprises 2, 3, 4, 5, 6, 7, 8, 9, 10, or more inspection properties.

To ensure high inspector efficiency, and that the most amount of candidate properties is inspected during potential active construction, the inspector is assigned to inspect a property based on D and F 806. Optionally, in some embodiments, the inspector is assigned to inspect a property 806 by assigning properties in order by ascending D values and ascending F values. Optionally, in some embodiments, the inspector is assigned to inspect a property 806 by assigning properties in order by ascending F values and ascending D values. Optionally, in some embodiments, the D and F are used to calculate an inspection efficiency parameter (n), wherein a high n value correlates with inspection urgency and efficacy. Optionally, in some embodiments, the inspection efficiency parameter is calculated as:

$$n = \frac{1}{D + F}$$

In other embodiments, the inspection efficiency parameter is calculated as:

$$n = \frac{1}{aD + bD^2 + cF + eF^2 + gDF + h(DF)^2}$$

where (a), (b), (c), (e), (g), and (h) are set constants. Optionally, in some embodiments, at least one of the (a), (b), (c), (e), (g), and (h) constants are equal to zero. Optionally, in some embodiments, the (a), (b), (c), (e), (g), and (h) constants are determined by a machine learning algorithm. The (n) value can be calculated for each inspector within a plurality of inspectors. Alternatively, the inspection efficiency parameter can be based on the logarithm of F, which becomes more important as it approaches 1. As such, the inspection efficiency parameter is calculated as:

$$n = \frac{1}{D + \log(F - 1)}$$

Additional parameters, beyond (D) and (F) can be used to assign inspectors to properties, such as a parameter associated with the seniority of the inspector, a parameter associated with the specific skills of the inspector, a parameter associated with the inspection history of the inspector, the value of the renovation, or any combination thereof.

Further, the inspector is assigned to inspect a property based on D and F 806 to maximize the (n) value among a plurality of inspectors and the plurality of properties, whereby:

$$\sum_{i}^{K} \sum_{p}^{Q} n(i, p) = \text{Max}$$

where k is the number of inspectors, and wherein Q is the number of properties. In some cases, the inspector is further assigned to a property based on their current availability and schedule. Optionally, in some embodiments, two or more inspectors are assigned to the same number of properties. Optionally, in some embodiments, two or more inspectors are assigned to the different number of properties. Optionally, in some embodiments, the number of inspectors is 2 to about 10,000. Optionally, in some embodiments, the number of inspectors is at least 2.

Once the inspectors are assigned to inspect a property based on D and F 806, the inspection results are determined 807 by the assigned inspector, and the database can be updated 808 with any determined information. Optionally, in some embodiments, updating the database 808 improves the machine learning capabilities in this or other applications disclosed herein.

Figure 9:
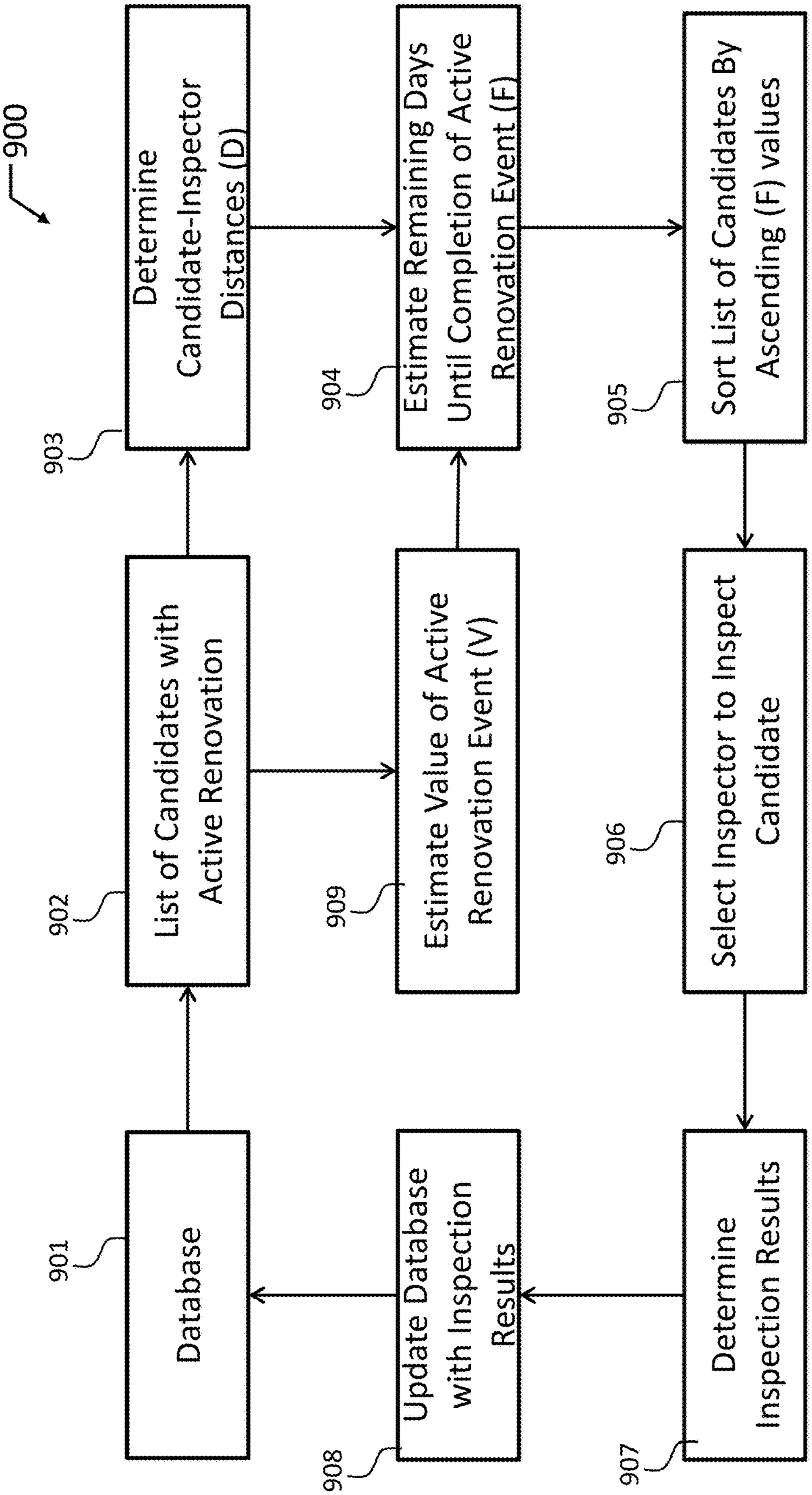
FIG. 9 is a non-limiting example of a schematic diagram; in this case, an exemplary application to prioritize inspection of unpermitted renovation candidates and validate the prioritization, in accordance with some embodiments.

Per FIG. 9, in some embodiments, the application to prioritize inspection of unpermitted renovation candidates and validate the prioritization 900 is provided herein. Optionally, in some embodiments, the application comprises a database 901. A list of candidates with active renovation is provided 902. The application determines the candidate-inspector distances (D) 903 and also estimates the remaining days until completion of active renovation event (F) 904. The application then sorts the list of candidates by ascending (F) values 905. Optionally, in some embodiments, the application additionally or alternatively sorts the list of candidates by an estimation of the value of the renovation. The application continues by selecting an inspector to inspect the candidate 906. Subsequently, the inspector can determine inspection results 907, and update the database 908 with any garnered information. Optionally, in some embodiments, the application to assign unpermitted renovation visit to inspectors 900 is permitted to run automatically every period of time to schedule and/or reschedule the property-inspector assignments. Optionally, in some embodiments, the period of time is equal to, one minute, thirty minutes, one hour, 12 hours, one day, one week, one month, or one year.

Optionally, in some embodiments, the database comprises of information from a plurality of data mining task processes. Optionally, in some embodiments, the data mining task process comprises a natural learning task process, numerical data mining task process, or a photographic data mining task process. Optionally, in some embodiments, the data mining task processes incorporates feeds from sources that are photographic or numerical.

Figure 10:
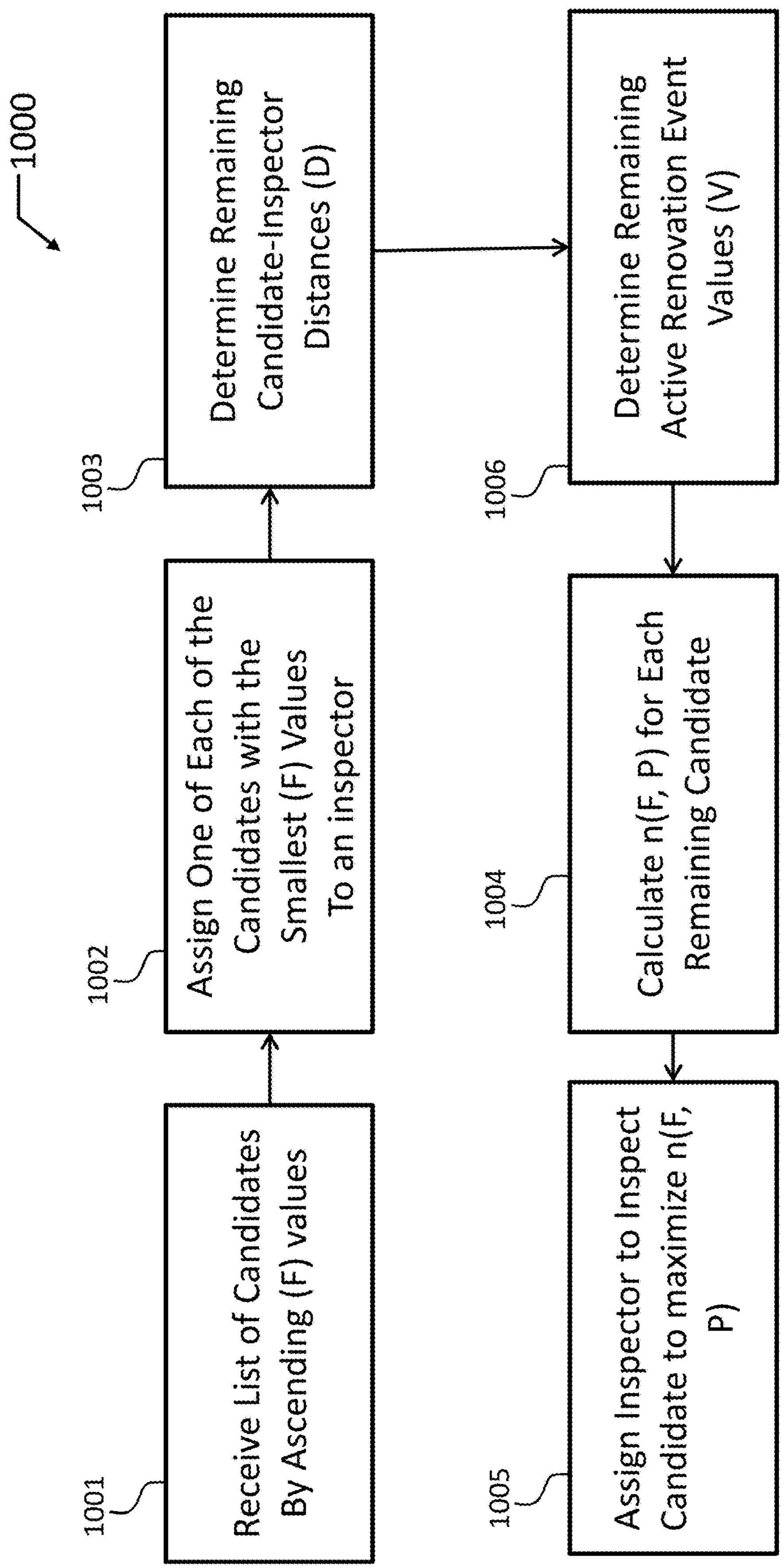
FIG. 10 is a non-limiting example of a schematic diagram; in this case, an exemplary application to prioritize inspection of unpermitted renovation candidates, in accordance with some embodiments.

Per FIG. 10, in some embodiments, the application to prioritize inspection of unpermitted renovation events 1000 is provided herein. Optionally, in some embodiments, the application receives a list of candidates by ascending (F) values 1001. The application then assigns one of each of the candidates with the smallest (F) values to an inspector 1002. The application then determines the remaining candidate-inspector distances (D) 1003. The application then calculates n (F,P) for each remaining candidate 1004. The application then assigns inspectors to inspect a candidate to maximize n (F,P) 1005. Optionally, in some embodiments, the application additionally or alternatively prioritizes the list of candidates by an estimation of the value of the renovation.

Detecting an Improper Real Estate Transfer Event

Additionally, provided herein are methods, systems, and platforms, which employ various data sources and techniques to identify undocumented current and past changes in ownership with missing or fraudulent value re-assessments. Further, detection of the true responsible directors and shareholders involved enables swift and judicious prosecution of any guilty parties.

Figure 11:
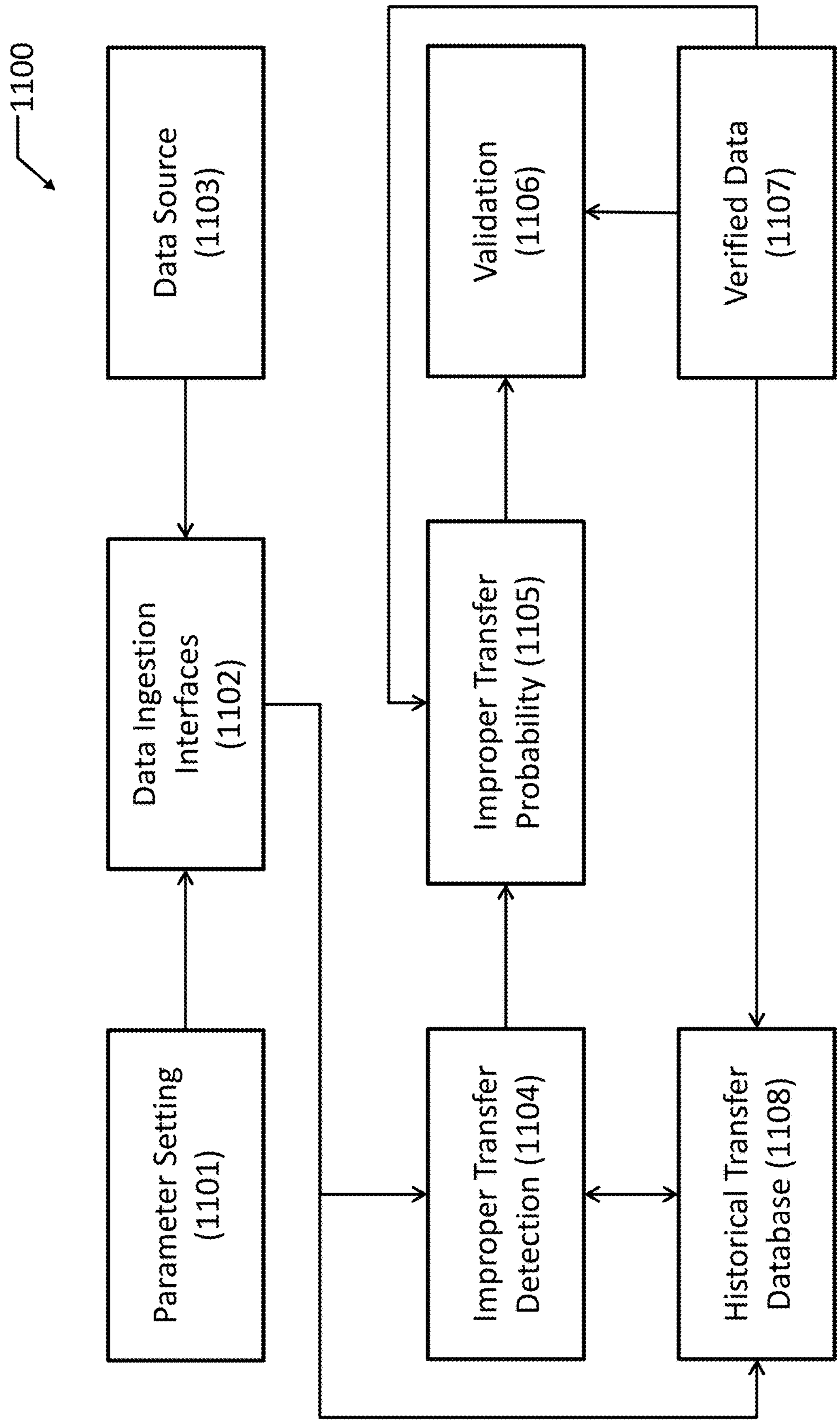
FIG. 11 is a non-limiting example of a schematic diagram; in this case, an exemplary application to detect an improper real estate transfer event, in accordance with some embodiments.

FIG. 11 shows an exemplary non-transitory computer-readable storage media encoded with a computer program including instructions executable by a processor to create an application to detect an improper real estate transfer event 1100. Optionally, in some embodiments, the application 1100 comprises a parameter setting module 1101, a plurality of data ingestion interfaces 1102, an improper transfer detection module 1104, an improper real estate transfer probability calculation module 1105, and a validation module 1106.

Optionally, in some embodiments, the parameter setting module 1101 defines a data set to be evaluated. Optionally, in some embodiments, the data set is defined by at least one of a street address, a parcel, a street, a lot, a zip code, a county, a state, an area drawn on a map, an area within a set radial distance from a location, coordinates set by one or more satellites, an area within a set driving distance of a location, a GPS point, and an area defined by at least three GPS points.

Optionally, in some embodiments, each of the plurality of data ingestion interfaces 1102 is connected to a unique external interface 1103. Each interface can be configured to perform a data mining task process to detect one or more real estate transfer indicia within the data set. Optionally, in some embodiments, the data mining task process comprises a natural language process, numerical data mining process, or a photographic data mining task process. Optionally, in some embodiments, the natural language task process comprises syntax interpretation, semantic interpretation, discourse interpretation, or speech interpretation. Optionally, in some embodiments, the syntax interpretation comprises lemmatization, morphological segmentation, part-of-speech tagging, parsing, sentence boundary disambiguation, stemming, word segmentation, or terminology extraction. Optionally, in some embodiments, the semantic interpretation comprises lexical semantics, machine translation, named entity recognition, natural language generation, natural language understanding, optical character recognition, question answering, recognizing textual entailment, relationship extraction, sentiment analysis, topic segmentation, or word sense disambiguation. Optionally, in some embodiments, the discourse interpretation comprises automatic summarization, coreference resolution, or discourse analysis. Optionally, in some embodiments, the speech interpretation comprises speech recognition, speech segmentation, and text-to-speech. Optionally, in some embodiments, the external interfaces 1103 comprises city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, demolition orders, dumpster orders, portable restroom orders, or the Internet.

Optionally, in some embodiments, the improper transfer detection module 1104 applies a machine learning algorithm to identify an initial candidate based on the real estate transfer indicia within the data set. Optionally, in some embodiments, the real estate indicia comprises a valuation of a property, a change in a valuation of the property, a current ownership of the property, a past ownership of the property, a lender on a property, an ownership percentage of the property, or a liens on a property. Optionally, in some embodiments, the machine learning algorithm identifies an initial candidate if at least one of the current ownership and the past ownership of the initial candidate comprises a corporation. Optionally, in some embodiments, the machine learning algorithm identifies an initial candidate if the corporation comprises a title holding trust. Optionally, in some embodiments, the machine learning algorithm identifies an initial candidate if the ownership percentage of the property changes by more than 49.9%. A title holding trust can comprise a trust by which the real estate is conveyed to a trustee under an arrangement reserving to the beneficiaries the full management and control of the property. The beneficiaries of a title holding trust can be not of public record. Optionally, in some embodiments, the machine learning algorithm further determines the beneficiaries indirectly through public records and media.

The improper real estate transfer probability calculation module 1105 can calculate a probability that the improper real estate transfer event has taken place at the initial candidate. Optionally, in some embodiments, the calculation comprises applying an increased weighted factor that the improper real estate transfer event has taken place if at least one of the current ownership and the past ownership of the initial candidate comprises a corporation. Optionally, in some embodiments, the calculation comprises applying an increased weighted factor that the improper real estate transfer event has taken place if the corporation comprises a title holding trust. Optionally, in some embodiments, the calculation comprises applying an increased weighted factor that the improper real estate transfer event has taken place if the ownership percentage of the property changes by more than 49.9%. Optionally, in some embodiments, the calculation comprises applying an increased weighted factor that the improper real estate transfer event has taken place if the ownership percentage of the property changes without an associated assessment. Optionally, in some embodiments, the calculation further applying an increased weighted factor if the true beneficiaries have previously conducted an improper transfer. Optionally, in some embodiments, the weight factor comprises a parameter defining an importance associated with a particular real estate transfer indicia or value of the real estate transfer indicia.

Optionally, in some embodiments, the calculation comprises calculating whether a probability threshold has been met. Optionally, in some embodiments, the probability threshold can be modified by the validation module based on the verified data. If the corporation is detected to be a trust, the true ownership of the initial candidate can be detected by identifying the beneficial owners through public trust data, MLS data, social media data, or any other public or semi-public source. The improper real estate transfer event can comprise a misreported transaction value, a misreported sales value, a misreported property value, or any combination thereof.

Optionally, in some embodiments, the validation module 1106 accepts verified data 1107 regarding the real estate transfer event and feeds back the verified data 1107 to the improper real estate transfer probability calculation module 1105 to improve its calculation over time. Optionally, in some embodiments, the verified data 1107 is acquired by a public official inspecting the candidate property. The verified data 1107 by one or more inspectors can be received and/or distributed by any methods or systems described herein.

Optionally, in some embodiments, the application further comprises a historical transfer database 1108 receiving and storing a plurality of the real estate transfer indicia from the plurality of data ingestion interfaces. The historical transfer database 1108 can transmit one or more of the plurality of stored real estate transfer indicia to the improper transfer detection module 1104. Optionally, in some embodiments, the stored real estate transfer indicia comprises a sequence of transfers regarding a real estate unit. Optionally, in some embodiments, the historical transfer database 1108 further receives a plurality of the initial candidates from the improper real estate transfer detection module 1104 and appends the each of the initial candidates to at least one of the stored real estate transfer indicia. Optionally, in some embodiments, the historical transfer database 1108 stores verified data 1107. Optionally, in some embodiments, the improper transfer detection module 1104 applies the machine learning algorithm to identify the initial candidate based further on the initial candidates appended to the plurality of stored real estate transfer indicia.

The stored real estate transfer indicia can comprise real estate indicia over a certain period of time. The stored real estate transfer indicia can comprise a consecutive series of real estate indicia over a certain period of time. Storing the real estate transfer indicia can comprise appending the real estate transfer indicia to records associated with the property, the buyer, the seller, the loan officer, the zip code, or any combination thereof. In some embodiments, the historical transfer database remembers a sequence of transfers.

Determining when One or More Unpermitted Renovation Events has Taken Place

Additionally, provided herein are methods, systems, and platforms, which employ various data sources and techniques to determine when one or more unpermitted renovation events has taken place. Further, detection of the time of the unpermitted renovation enables accurate and fair collection of associated renovation taxes.

It is assumed a particular property as having been renovated at some time in the past has been identified, and hence that the current assessment is incorrect and probably undervalued. The appropriate authority would like to appropriately re-assess the property to increase the amount of property tax collected in future.

Federal, state, and county real estate taxes can employ "escape fees" to collect back taxes for misassessed valuations. For example, if the square footage of the property was recorded in error by the government, the property owner can owe four years of escape fees. However, if the misassessment is at the fault of the owners, escape fees can be charged, for instance, for up to eight years. The escape fee can be dependent on the term during which the real estate property was incorrectly valued. As such, knowledge of the start date of such renovations is greatly advantageous towards proper escape fee collection.

Figure 12:
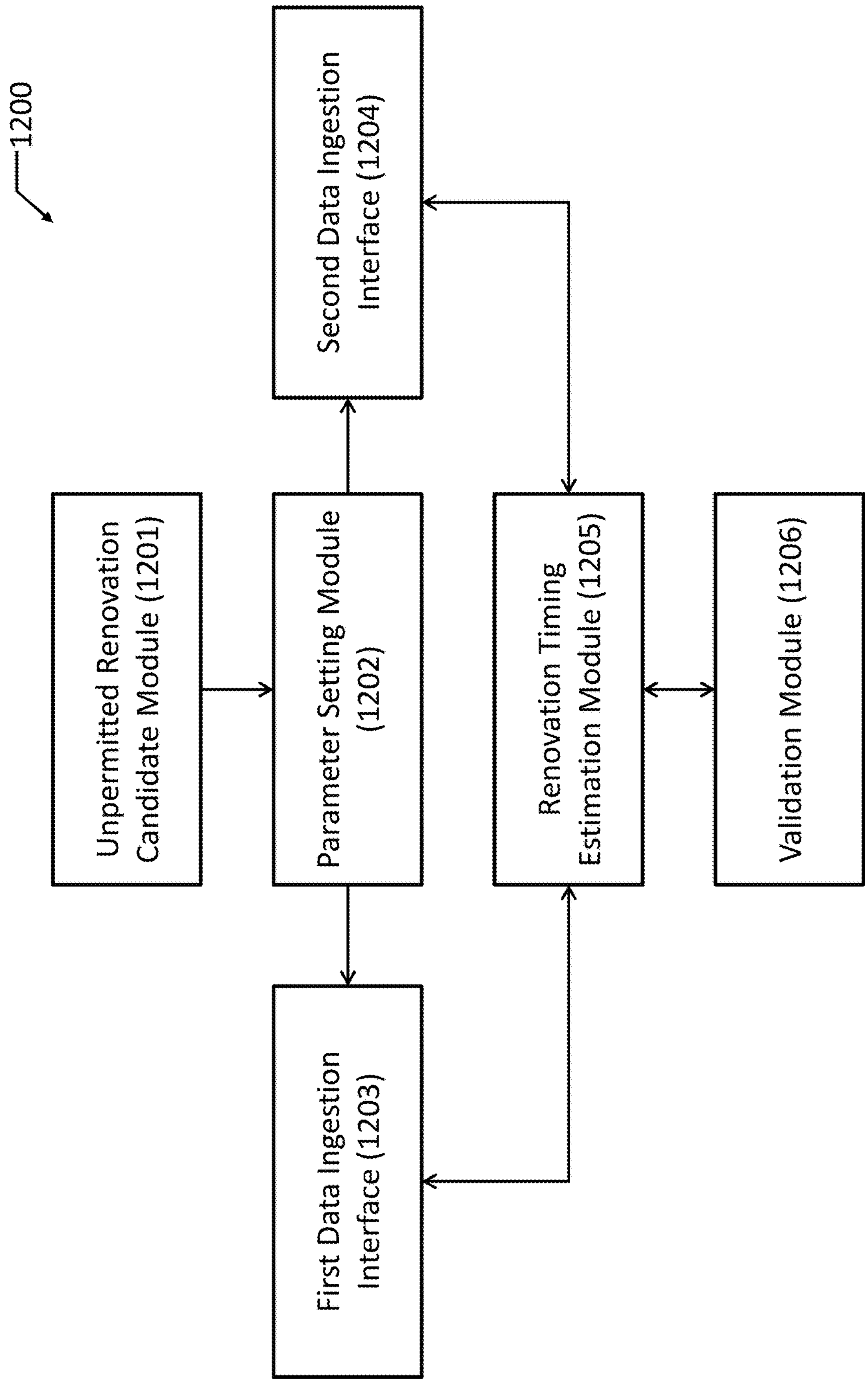
FIG. 12 is a non-limiting example of a schematic diagram; in this case, an exemplary application to determine when one or more unpermitted renovation events has taken place to an unpermitted renovation candidate, in accordance with some embodiments.

FIG. 12 shows an exemplary non-transitory computer-readable storage media encoded with a computer program including instructions executable by a processor to create an application to determine when one or more unpermitted renovation events has taken place to an unpermitted renovation candidate. Optionally, in some embodiments, the application 1200 comprises: an unpermitted renovation candidate module 1201, a parameter setting module 1202, a set of first data ingestion interfaces 1203, a set of second data ingestion interfaces 1204, a renovation timing estimation module 1205, and a validation module 1206. In some embodiments, the application 1200 further comprises a set of third data ingestion interfaces, a fourth set of data ingestion interfaces, or more sets of data ingestion interfaces. In some embodiments, at least one of the set of third data ingestion interfaces, the fourth set of data ingestion interfaces, or more of the sets of data ingestion interfaces can be initiated by a user.

In some embodiments, the application 1200 further comprises a second data source filter module. The second data source filter module can be configured to allow a user to filter the second data mining task process to the second data source.

The unpermitted renovation candidate module 1201 can present an unpermitted renovation candidate. The unpermitted renovation candidate can comprise an address, a GPS coordinate, a land plot indicator, or any combination thereof. The parameter setting module 1202 can define a data set to be evaluated.

Each of the first data ingestion interfaces 1203 can connect to a first data source. Each of the first data ingestion interfaces 1203 can be configured to perform a data mining task process to a first data source. The data mining task process can determine an initial time range within the data set. The initial time range can represent when at least one unpermitted renovation event has taken place at the unpermitted renovation candidate. In some embodiments, the initial time range comprises a time range from a current time to when the unpermitted renovation event was assessed according to the first data source. In some embodiments, the first data source comprises city property records, county property records, city permit records, county permit records, and state business records.

Each of the second set of second data ingestion interfaces 1204 can connect to a second data source. Each second data ingestion interfaces 1204 can be configured to perform a data mining task process to the second data source. The data mining task process can detect one or more unpermitted renovation timing indicia within the data set when the at least one unpermitted renovation event has taken place at the unpermitted renovation candidate. In some embodiments, the second data source comprises public sources, licensed data feeds, sources depicting historical water usage at the unpermitted renovation candidate, sources depicting historical energy usage at the unpermitted renovation candidate, contractor web sites, Yelp, Craigslist, Wayback Machine, financial documents, photographs from aerial surveys, Google Earth, Google Streetview, rental records for dumpsters, rental records for portable restrooms, serial numbers, manufacturer warranty records, Home Owner's Association records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, demolition orders, dumpster orders, portable restroom orders, or the Internet.

In some embodiments, a third data ingestion interfaces can be configured to perform a data mining task process to a third data source. In some embodiments, a fourth data ingestion interfaces can be configured to perform a data mining task process to a fourth data source. The third data source can comprise a data source from the first data source, the second data source, or both. The fourth data source can comprise a data source from the first data source, the second data source, the third data source, or both. The third data source can comprise a data source that is not in the first data source, the second data source, or both. The fourth data source can comprise a data source that is not in the first data source, the second data source, or both.

In some embodiments, at least one of the first data source and the second data source comprises contractor records of renovations, contractor website photos, or contractor website testimonials. In some embodiments, at least one of the first data source and the second data source comprises an online review or an online listing by a contractor. In some embodiments, at least one of the first data source and the second data source comprises publicly available website data that is no longer actively displayed. Such archival data can be associated with a time of publication. Such archival data can be received by such sources as "the Wayback Machine." In some embodiments, at least one of the first data source and the second data source comprises a manufacturer warranty record including a date of installation.

The renovation timing estimation module 1205 can apply a machine learning algorithm to present a refined renovation time range. The renovation timing estimation module 1205 can alternatively or further apply a rule-based algorithm to present the refined renovation time range. In some embodiments, the renovation timing estimation module 1205 feeds input to the first ingestion interface 1203 to allow the first ingestion interface to focus its ingestion. In some embodiments, the renovation timing estimation module 1205 feeds input to the second ingestion interface 1204 to allow the second ingestion interface to focus its ingestion. The renovation timing estimation module 1205 can apply a machine learning algorithm to present a refined renovation time range based on the detected initial time range and the detected unpermitted renovation timing indicia. In some embodiments, the refined renovation time range comprises a narrower time range than the initial time range. In some embodiments, the unpermitted renovation timing indicia comprises increase in water usage, decrease in water usage, increase in energy usage, decrease in energy usage, permanent change in water usage, permanent change in energy usage, records of renovations from Internet sources, documentation reflecting refinanced mortgages, documentation reflecting home equity lines of credit, photographs depicting structural changes, records reflecting renovation work, records reflecting renovation waste, serial numbers reflecting new appliances, windows, or air conditioners, or manufacturer warranty records reflecting dates of installation. The renovation timing estimation module 1205 can further apply a machine learning algorithm to present a further refined renovation time range based on the detected unpermitted renovation indicia generated by the set of third data ingestion interfaces, the fourth set of data ingestion interfaces, or by more sets of data ingestion interfaces. The renovation timing estimation module 1205 can further apply a machine learning algorithm to present a first refined renovation time range, a second renovation time range, or more renovation time ranges based on the detected unpermitted renovation indicia generated by the set of third data ingestion interfaces, the fourth set of data ingestion interfaces, or by more sets of data ingestion interfaces.

An increase or decrease in water usage can indicate an unpermitted renovation event comprising the addition of landscaping features, a swimming pool, a kitchen, a bathroom, a sink, or any combination thereof. An increase or decrease in electricity usage can indicate an unpermitted renovation event comprising the addition of rooms, heating and ventilation equipment, kitchens, or both. A sudden increase in energy use can indicate the use of construction tools during an unpermitted renovation event.

At least one of the second data and the unpermitted renovation timing indicia can comprise aerial surveys, Google Earth, Google Streetview and other images, wherein at least one of the data mining task process and the machine learning algorithm performs a historical comparison of images, 3D data, or both to detect structure changes over time, evidence of construction workers and demolition, presence of dumpsters, bare roofs. At least one of the second data and the unpermitted renovation timing indicia can comprise financial documents such as refinanced mortgages and home equity lines of credit, which can be indicative, via the data mining task process or the machine learning algorithm, of the date of a renovation and the renovation value. At least one of the second data and the unpermitted renovation timing indicia can comprise a manufacturer instillation warrantee, wherein at least one of the data mining task process and the machine learning algorithm associate the date of installation therein can be associated with a candidate real estate property. At least one of the second data and the unpermitted renovation timing indicia can comprise HOA records wherein at least one of the data mining task process and the machine learning algorithm are configured to detect a requested renovation date. Some of the second data and the unpermitted renovation timing indicia can indicate that renovation that work was in progress on particular dates. Combinations of the second data and the unpermitted renovation timing indicia can data items might be used to determine if there were more than one renovation projects for the same candidate property.

The validation module 1206 can accept verified data regarding the timing of the unpermitted renovation event. The validation module 1206 can further feedback the verified data to the renovation timing estimation module 1205 to improve its prediction over time.

Detecting an Improper Residency Status for a Real Estate Property

Additionally, provided herein are methods, systems, and platforms, which employ various data sources and techniques to detect an improper residency status for a real estate property. Further, detection of improper residency status for a real estate property enables accurate and fair collection of associated residency taxes. The residency status can comprise a primary residence status and a vacation residence status. Primary residence status can be defined at a real estate property at which the owner or owners resides for more than half of the year. Vacation residence status can be defined at a real estate property at which the owner or owners resides for less than half of the year. Ownership of a primary residence is often associated with different tax laws and requirements than ownership of a vacation residence. Mortgage interest are only be deducted on properties that are used exclusively as a residence. Such improper residency status can comprise claiming a real estate property as a primary residence when it is a vacation residence status. Further, residency status can be used to determine which school or school district a child can attend.

Figure 13:
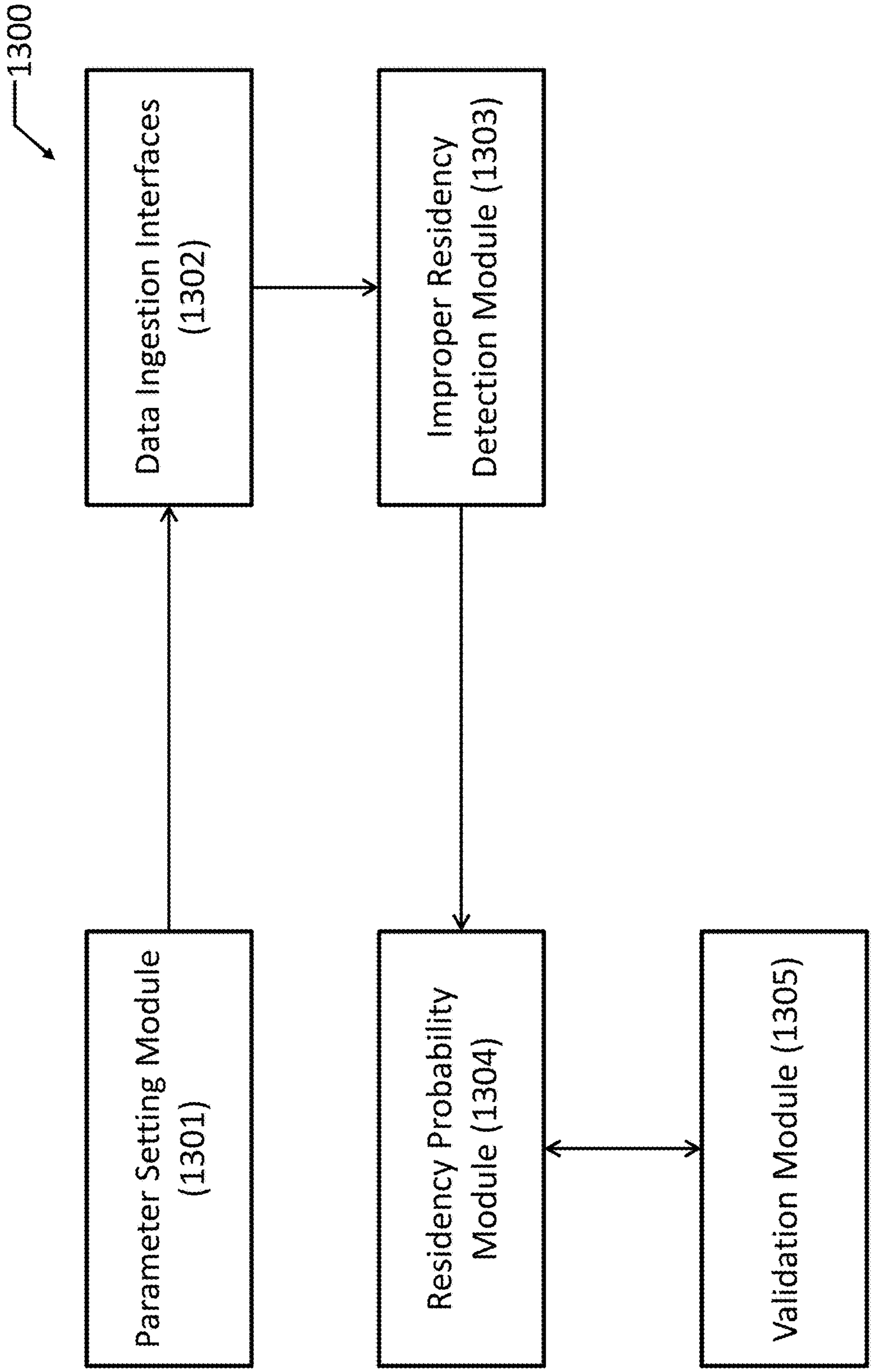
FIG. 13 is a non-limiting example of a schematic diagram; in this case, an exemplary application to detect an improper residency status for a real estate property, in accordance with some embodiments.

FIG. 13 shows an exemplary non-transitory computer-readable storage media encoded with a computer program including instructions executable by a processor to create an application to detect an improper residency status for a real estate property. Optionally, in some embodiments, the application 1300 comprises a parameter setting module 1301, a plurality of data ingestion interfaces 1302, an improper residency detection module 1303, a residency probability calculation module 1304, and a validation module 1305.

The parameter setting module 1301 can define a data set to be evaluated. In some embodiments, the data set is defined by at least one of a street address, a parcel, a street, a lot, a zip code, a county, a state, an area drawn on a map, an area within a set radial distance from a location, coordinates set by one or more satellites, an area within a set driving distance of a location, a GPS point, and an area defined by at least three GPS points.

Each data ingestion interface 1302 can connect to a unique external data source. Each data ingestion interface 1302 can be configured to perform a data mining task process to its data source. The data mining task process can detect one or more improper residency indicia within the data set.

In some embodiments, the data mining task process comprises a natural language process, numerical data mining process, a photographic data mining task process, or any combination thereof. In some embodiments, the natural language task process comprises syntax interpretation, semantic interpretation, discourse interpretation, speech interpretation, or any combination thereof. In some embodiments, the syntax interpretation comprises lemmatization, morphological segmentation, part-of-speech tagging, parsing, sentence boundary disambiguation, stemming, word segmentation, terminology extraction, or any combination thereof. In some embodiments, the semantic interpretation comprises lexical semantics, machine translation, named entity recognition, natural language generation, natural language understanding, optical character recognition, question answering, recognizing textual entailment, relationship extraction, sentiment analysis, topic segmentation, word sense disambiguation, or any combination thereof. In some embodiments, the discourse interpretation comprises automatic summarization, coreference resolution, discourse analysis, or any combination thereof. In some embodiments, the speech interpretation comprises speech recognition, speech segmentation, text-to-speech, or both.

In some embodiments, the external data source comprises city property records, county property records, city permit records, county permit records, post office address database, state business records, historical real estate listings, rental listings, demolition orders, dumpster orders, portable restroom orders, customer account information from third party companies, social media, phone records, phone location records, cellphone location, address records, historical credit card history purchase records, satellite images, tax records, street views, online photographs, online videos, signs outside a property, demolition orders, dumpster orders, portable restroom orders, the Internet, or any combination thereof.

In some embodiments, the detection of one or more improper residency indicia comprises water usage change, electricity usage change, gas usage change, street parking occupancy change, driveway parking occupancy change, package delivery frequency change, window adjustment frequency change, visible room light frequency change, a street-side trash can placement frequency change, a mailbox flag status frequency change, a garage door status frequency change a frequency of phone calls, a frequency of credit card purchases, or any combination thereof. Each improper residency indicia can be associated with a weight based on the correlation between that indicia and the probability of the improper residency status.

An increase in at least one of the water, electricity and gas usage can provide an improper residency indicia that a property listed as a vacation residence can actually comprise a primary residence. A decrease in water usage can provide an improper residency indicia that a property listed as a primary residence can actually comprise a vacation residence. Increased surrounding street parking occupancy, driveway parking occupancy, or both at a real estate property can provide an improper residency indicia that a property listed as a vacation residence can actually comprise a primary residence. Decreased surrounding street parking occupancy, driveway parking occupancy, or both at a real estate property can provide an improper residency indicia that a property listed as a primary residence can actually comprise a vacation residence. An increase in the frequency of package deliveries, window adjustment, visible room light changes, street-side trash can placement, mailbox flag status, garage door opening and closing, phone calls, credit card purchases, or any combination thereof can provide an improper residency indicia that a property listed as a vacation residence can actually comprise a primary residence. A decrease in the frequency of package deliveries, window adjustment, visible room light changes, street-side trash can placement, mailbox flag status frequency, garage door opening and closing, phone calls, cellphone location, credit card purchases, or any combination thereof can provide an improper residency indicia that a property listed as a primary residence can actually comprise a vacation residence.

The package delivery frequency can comprise a number of packages delivered to the address within a set period. The window adjustment can comprise a frequency at which a window is opened, a window is closed, a window shade is opened, a window shade is closed, or any combination thereof. The visible room light frequency can comprise a frequency at which an interior or exterior light is turned on and off. The street-side trash can placement frequency can comprise a frequency at which trash is deposited on the street for pickup. The mailbox flag status frequency can comprise a frequency at which the mailbox flag which signals outgoing mail is raised. The garage door opening and closing frequency can comprise a frequency at which the garage door is opened or closed. The phone calls can be associated with the candidate property. The frequency of credit card purchases can be associated with an account that lists the candidate property The improper residency detection module 1303 can apply a machine learning algorithm to identify an initial candidate. The improper residency detection module 1303 can apply a machine learning algorithm to identify an initial candidate based on the improper residency indicia within the data set. The improper residency detection module 1303 can alternatively or additionally apply a rule-based algorithm to identify an initial candidate.

The residency probability calculation module 1304 can calculate a probability that the initial candidate has an improper residency status.

The validation module 1305 can accept verified data regarding the residency status. The validation module 1305 can further feed back the verified data to the improper residency probability calculation module 1304. The feed back the verified data to the improper residency probability calculation module 1304 can improve the calculations of the improper residency probability calculation module 1304 over time.

Detect an Improper Occupancy Tax Status for a Real Estate Property

Additionally, provided herein are methods, systems, and platforms, which employ various data sources and techniques to detect an improper occupancy tax status for a real estate property. Further, detection of improper occupancy tax status for a real estate property enables accurate and fair collection of associated occupancy taxes. In some embodiments, the methods, systems, and platforms can detect improper occupancy tax status for a plurality of properties.

Figure 14:
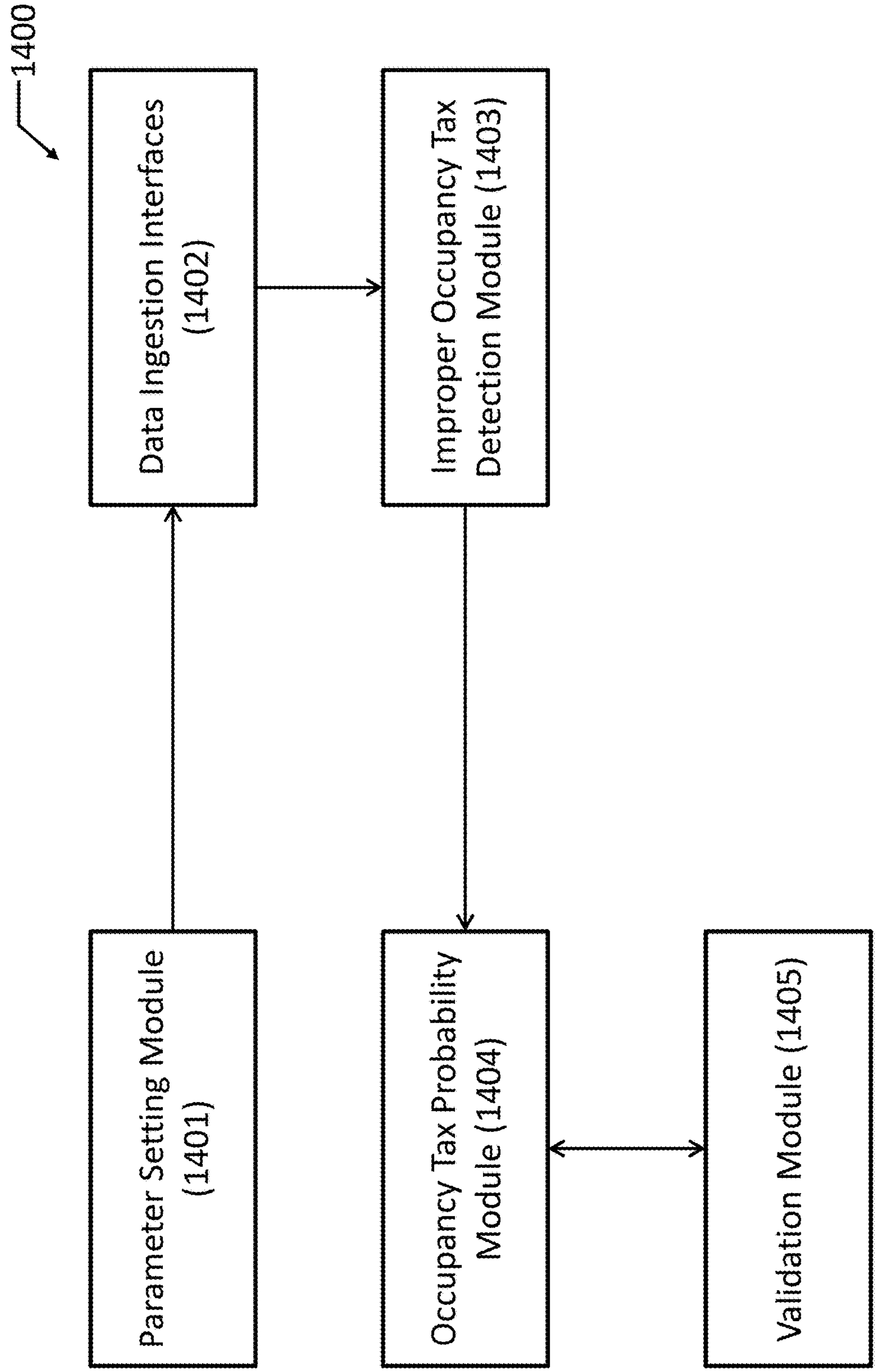
FIG. 14 is a non-limiting example of a schematic diagram; in this case, an exemplary application to detect an improper occupancy tax status for a real estate property, in accordance with some embodiments.

FIG. 14 shows an exemplary non-transitory computer-readable storage media encoded with a computer program including instructions executable by a processor to create an application to detect an improper residency status for a real estate property. Optionally, in some embodiments, the application 1400 comprises a parameter setting module 1401, a plurality of data ingestion interfaces 1402, an improper occupancy tax detection module 1403, an occupancy tax probability calculation module 1404, and a validation module 1405.

The parameter setting module 1401 can define a data set to be evaluated. In some embodiments, the data set is defined by at least one of a street address, a parcel, a street, a lot, a zip code, a county, a state, an area drawn on a map, an area within a set radial distance from a location, coordinates set by one or more satellites, an area within a set driving distance of a location, a GPS point, and an area defined by at least three GPS points.

Each of the plurality of data ingestion interfaces 1402 can connect to a unique external data source. Each interface can be configured to perform a data mining task process to its data source. Each interface can be configured to perform a data mining task process to its data source to detect one or more improper occupancy tax indicia within the data set.

The improper occupancy tax detection module 1403 can apply a machine learning algorithm to identify an initial candidate. The improper occupancy tax detection module 1403 can apply a machine learning algorithm to identify an initial candidate based on the improper occupancy tax indicia within the data set. The improper occupancy tax detection module 1403 can further or alternatively apply a rule-based algorithm to identify an initial candidate. In some embodiments, the data mining task process comprises a natural language process, numerical data mining process, a photographic data mining task process, or any combination thereof. In some embodiments, the natural language task process comprises syntax interpretation, semantic interpretation, discourse interpretation, speech interpretation, or any combination thereof. In some embodiments, the syntax interpretation comprises lemmatization, morphological segmentation, part-of-speech tagging, parsing, sentence boundary disambiguation, stemming, word segmentation, terminology extraction, or any combination thereof. In some embodiments, the semantic interpretation comprises lexical semantics, machine translation, named entity recognition, natural language generation, natural language understanding, optical character recognition, question answering, recognizing textual entailment, relationship extraction, sentiment analysis, topic segmentation, word sense disambiguation, or any combination thereof. In some embodiments, the discourse interpretation comprises automatic summarization, coreference resolution, discourse analysis, or any combination thereof. In some embodiments, the speech interpretation comprises speech recognition, speech segmentation, and text-to-speech, or any combination thereof. In some embodiments, the external data source comprises AirBnB, VRBO, city property records, county property records, city permit records, county permit records, post office address database, state business records, historical real estate listings, rental listings, demolition orders, dumpster orders, portable restroom orders, customer account information from third party companies, social media, phone records, address records, historical credit card history purchase records, satellite images, tax records, street views, online photographs, online videos, signs outside a property, demolition orders, dumpster orders, portable restroom orders, the Internet, or any combination thereof.

In some embodiments, the detection of one or more improper occupancy tax indicia comprises water usage change, electricity usage change, gas usage change, street parking occupancy change, driveway parking occupancy change, package delivery frequency change, window adjustment frequency change, visible room light frequency change, a street-side trash can placement frequency change, a mailbox flag status frequency change, a garage door status frequency change, or any combination thereof. Each improper occupancy tax indicia can be associated with a weight based on the correlation between that indicia and the probability of the improper occupancy tax status.

An increase in at least one of the water, electricity, and gas usage can provide an improper occupancy tax indicia that a residency number can be underreported. A decrease in water usage can provide an improper occupancy tax indicia that a residency number can be overreported. Increased surrounding street parking occupancy, driveway parking occupancy, or both at a real estate property can provide an improper occupancy tax indicia that a residency number can be underreported. Decreased surrounding street parking occupancy, driveway parking occupancy, or both at a real estate property can provide an improper occupancy tax indicia that a residency number can be overreported. An increase in the frequency of package deliveries, window adjustment, visible room light changes, street-side trash can placement, mailbox flag status, garage door opening and closing, phone calls, credit card purchases, or any combination thereof can provide an improper occupancy tax indicia that a residency number can be underreported. A decrease in the frequency of package deliveries, window adjustment, visible room light changes, street-side trash can placement, mailbox flag status frequency, garage door opening and closing, phone calls, credit card purchases, or any combination thereof can provide an improper occupancy tax indicia that a residency number can be overreported.

The package delivery frequency can comprise a number of packages delivered to the address within a set period. The window adjustment can comprise a frequency at which a window is opened, a window is closed, a window shade is opened, a window shade is closed, or any combination thereof. The visible room light frequency can comprise a frequency at which an interior or exterior light is turned on and off. The street-side trash can placement frequency can comprise a frequency at which trash is deposited on the street for pickup. The mailbox flag status frequency can comprise a frequency at which the mailbox flag which signals outgoing mail is raised. The garage door opening and closing frequency can comprise a frequency at which the garage door is opened or closed. The phone calls can be associated with the candidate property. The frequency of credit card purchases can be associated with an account that lists the candidate property The occupancy tax probability calculation module 1404 can calculate a probability that the initial candidate has an improper occupancy tax status;

The validation module 1405 can accept verified data regarding the occupancy tax status. The validation module 1405 can further feed back the verified data to the improper occupancy tax probability calculation module 1404 to improve its calculation over time.

Figure 25:
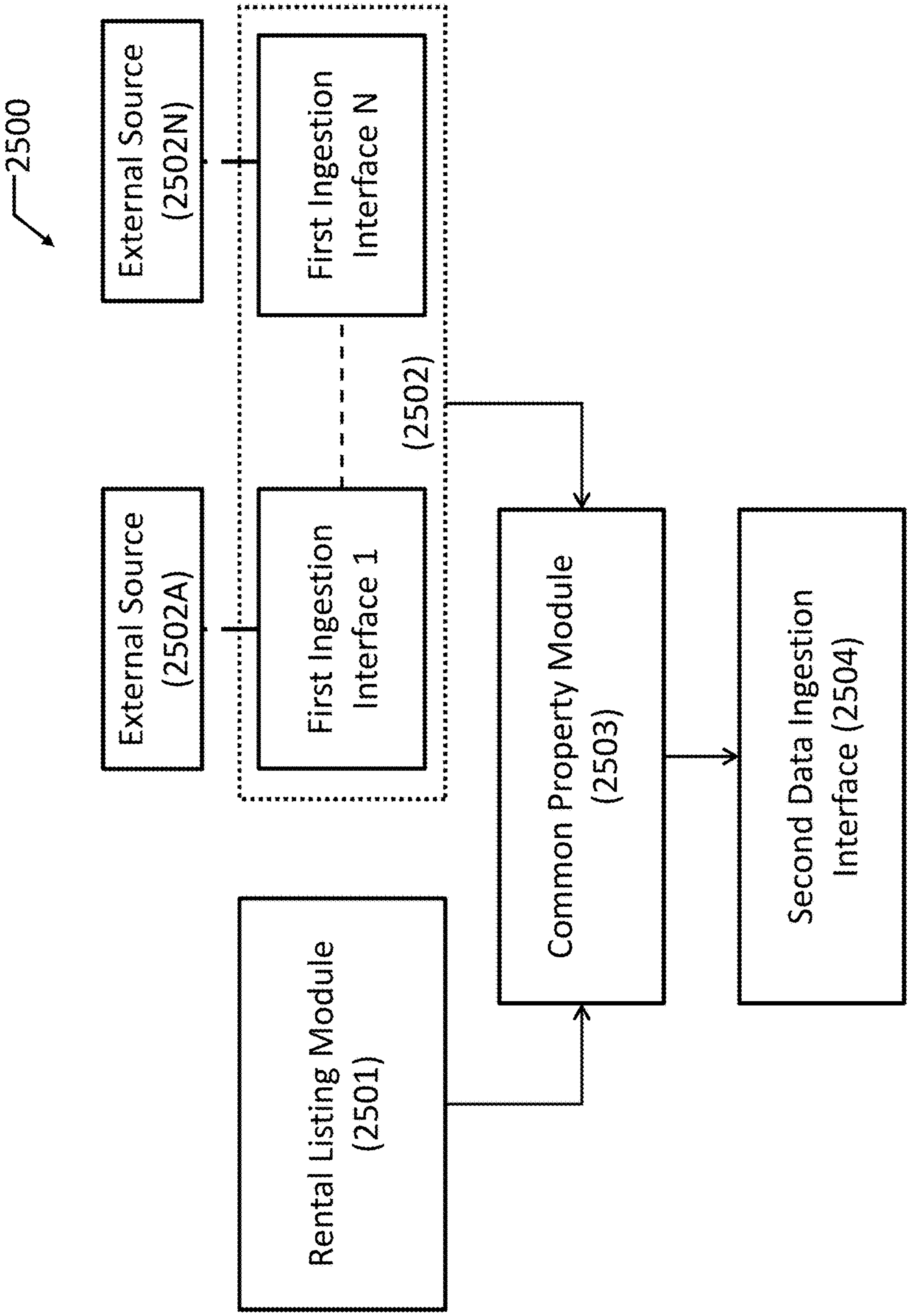
FIG. 25 is a non-limiting example of a first application; in this case, a first application to determine a street address of a rental property.
Figure 26:
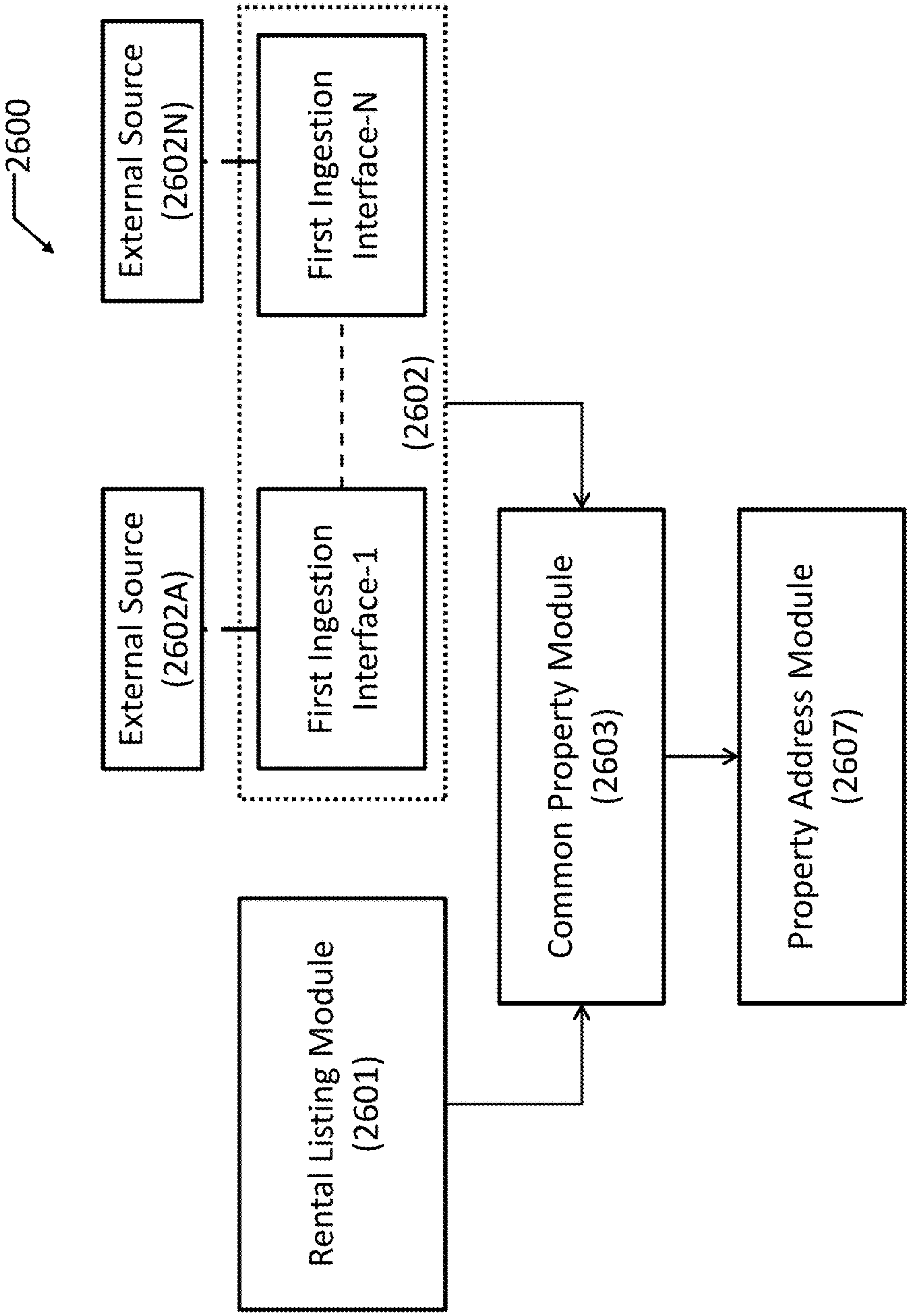
FIG. 26 is a non-limiting example of a second application; in this case, a second application to determine a street address of a rental property.

Media, Systems, and Methods for Determining a Street Address of a Rental Property Provided herein, per FIGS. 25 and 26, are non-transitory computer-readable storage media encoded with a computer program including instructions executable by a processor to create an application 2500 and 2600 to determine a street address of a rental property. Further provided herein are computer-implemented systems comprising a digital processing device comprising: at least one processor, an operating system configured to perform executable instructions, a memory, and a computer program including instructions executable by the digital processing device to create the application 2500 and 2600 to determine a street address of a rental property. Also provided herein is a computer-implemented method of determining a street address of a rental property.

FIG. 25 displays a first application 2500 to determine a street address of a rental property. As shown, the first application 2500 comprises a rental listing module 2501, a plurality of first data ingestion interfaces 2502, a common property module 2503. and a second data ingestion interface 2504. FIG. 26 illustrates a second application 2600 to determine a street address of a rental property. As shown, the second application 2600 comprises a rental listing module 2601, a plurality of first data ingestion interfaces 2602, a common property module 2603, and a property address module 2607.

In some embodiments, the second application 2600 is employed to determine the street address of the rental property when the second data ingestion interface 2504 of the first application 2500 is not able to determine the street address of the rental property directly from the one or more common property records. In some embodiments, the first application 2500 further comprises the property address module 2607. Also, provided herein is a third application comprising the first application 2500 and the second application 2600 to determine a street address of a rental property.

In some embodiments, the rental listing module 2501 or 2601 receives a rental property listing for the rental property and at least one rental property depiction of the rental property listing. In some embodiments, the rental listing module 2501 or 2601 receiving the at least one rental property depiction of the rental property comprises a third data ingestion interface performing a data mining task process to the rental property listing. In some embodiments, the rental property listing comprises a vacation rental listing, a short-term rental listing, a home swap rental listing, or any combination thereof. In some embodiments, the rental property listing comprises an AirBnB listing, a Craigslist listing, a VRBO listing, a HomeToGo listing, a VacationRentals.com listing, a FlipKey listing, a bookings.com listing, a OneFineStay listing, a 9flats listing, a Wimdu listing, a VayStays listing, a VacayHero listing, a Luxury Retreats listing, or any combination thereof. In some embodiments, the rental property is a house, an apartment, a condominium, a cabin, a mobile home, a land, or any combination thereof.

In some embodiments, each first data interface of the plurality of first data ingestion interfaces 2502 or 2602 connects to a unique external property data source 2503A, 2503N or 2603A, 2603N. In some embodiments, the external property data source 2503A, 2503N or 2603A, 2603N comprises a vacation rental listing site, a short-term rental listing site, a home swap rental listing site, a sale property listing site, a permit database, a county record database, a state record database, a federal record database, a streetview, a map, or any combination thereof. In some embodiments, at least one of the property record and the common property record comprises a vacation rental listing, a short-term rental listing, a home swap rental listing, a sale property listing, a permit, a residency record, a county record, a state record, a federal record, a streetview, a map, or any combination thereof. In some embodiments, each first data interface performs a data mining task process to its property data source 2603A, 2603N. In some embodiments, the data mining task process determines at least one property record depiction. In some embodiments, each property record depiction is associated with a property record. In some embodiments, at least one of the rental property depiction and the property record depiction comprises an image, a video, a map area, an audio file, a text description, or any combination thereof. In some embodiments, one or more of the image, the video, the map area, the audio file, or the text description describe a number of parking spaces, the distance to the known landmark, an amenity, a host name, a realtor name, a location characteristic, a number of bedrooms, a number of bathrooms, a number of stories, a number of parking spaces, a square footage, an amenity, a set of directions to the rental property, or any combination thereof. In one example, the host name can be found in a review of the rental property listing, the property record, or both. Some non-limiting examples of a location characteristic found in a rental property listing or a property record includes that the property adjoins a landmark, faces in a certain direction, a number of trees, a size of a tree, a type of a tree, and a geographic or landscaping feature. Some non-limiting examples of directions to property include an instruction to enter from a named street, a parking location, and a relative location to a landmark. Some non-limiting examples of amenities include a renovated kitchen, a pool, a jacuzzi, a trampoline, an air conditioning, a heating, a tennis courts, a putting green, a solar panel, a driveway, or a patio. In some embodiments, the distance to the known landmark is further determined, confirmed, or both from a satellite image, a streetview image, a public map, or any combination thereof.

Features of the property such as number of bedrooms/bathrooms, area (house and/or land), number of parking spaces, air conditioning, number of stories, style of construction, renovations or residence statuses can be matched with County records.

In some embodiments, the common property module 2503 or 2603 applies a first machine learning algorithm to the at least one rental property depiction and the at least one property record depiction from each data source 2503A, 2503N or 2603A, 2603N. In some embodiments, the first machine learning algorithm identifies one or more common property records. In some embodiments, each common property record comprises a property record that refers to the rental property.

In some embodiments, the first machine learning algorithm identifies one or more common property records by comparing the center of the map area of the rental property depiction and the property record depiction. In some embodiments, the first machine learning algorithm identifies one or more common property records by identifying a rental property depiction image and a property record depiction image that are the same image. In some embodiments, the first machine learning algorithm ignores rental property depiction images and property record depiction images that are the same image as a stock image. In some embodiments, the first machine learning algorithm identifies one or more common property records by hashing the rental property depiction image and the property record depiction image and comparing the hash values. In some embodiments, the first machine learning algorithm identifies one or more common property records by scaling, cropping, de-watermarking, reencoding, changing the resolution, adjusting a brightness, adjusting a lighting, adjusting a perspective, or any combination thereof of the rental property depiction image and the property record depiction image and comparing the hash values.

In some embodiments, the second data ingestion interface 2504 performs a data mining task process to the one or more common property records to determine the street address of the rental property. In some embodiments, the second data ingestion interface 2504 performing the data mining task process to the one or more common property records to determine the street address of the rental property comprises: a photographic data mining task process to determine a street name, an address number, or both of the rental property; a lexicographical data mining task process to determine the street name, the address number, or both of the rental property; or both. Alternatively, in some embodiments, the second data ingestion interface 2504 performing the data mining task process to the one or more common property records to determine the street address of the rental property comprises: a photographic data mining task process to determine a neighboring address number of a property neighboring the rental property; a lexicographical data mining task process to determine a neighboring address number of a property neighboring the rental property; or both. In some embodiments, the property address module 2607 applies a second machine learning algorithm to the at least one rental property depiction, the at least one property record depiction, or both. In some embodiments, the second machine learning algorithm determines the street address of the rental property based on a proximity of the street address of the common property to a known landmark. In some embodiments, wherein the landmark comprises a school, a park, a shop, a monument, a museum, a bus-stop, a train-stop, a school, a place of worship, a beach, a land feature, an office, a government building, or any combination thereof.

In some embodiments, at least one of the first application 2500 and the second application 2600 further comprise a property address module 2607 applying a second machine learning algorithm to the at least one rental property depiction, the at least one property record depiction, or both and the street name or the address number, to determine the street address of the rental property.

In some embodiments, at least one of the first application 2500 and the second application 2600 further comprise a property address module 2607 applying a second machine learning algorithm to the at least one rental property depiction, the at least one property record depiction, the neighboring address number, or any combination thereof, to determine the street address of the rental property.

In some embodiments, at least one of the first application 2500 and the second application 2700 further comprise a first validation module that accepts verified data regarding the common property and feeds back the verified data to the common property module 2503 or 2603 to improve its calculations over time. In some embodiments, the application further comprises a second validation module that accepts verified data regarding the street address of the rental property and feeds back the verified data to the application to improve its calculations over time. In some embodiments, at least one of the first application 2500 and the second application 2600 further comprise a third validation module that accepts verified data regarding the street address of the rental property and feeds back the verified data to the property address module 2607 to improve its calculations over time. In some embodiments, at least one of the first application 2500 and the second application 2600 further comprise a rental property owner module that determines an owner of the rental property from the address of the rental property.

Machine Learning

In some embodiments, machine learning algorithms are utilized to aid in determining a consumer's preferred design elements. In some embodiments, the machine learning algorithm is used to determine a street address of a rental property.

In some embodiments, machine learning algorithms are utilized by the data ingestion interfaces to perform the data mining task, to determine a street address of a rental property. In some embodiments, machine learning algorithms are utilized by the common property module to identify a common property based on the at least one rental property depiction and the at least one property record depiction from each data source. In some embodiments, the machine learning algorithms utilized by the common property module employ one or more forms of labels including but not limited to human annotated labels and semi-supervised labels. In some embodiments, machine learning algorithms are utilized by the property address module to determine the street address of the rental property based on a proximity of the street address of the common property to a known landmark from each data source. In some embodiments, the machine learning algorithms utilized by the property address module that employs one or more forms of labels including but not limited to human annotated labels and semi-supervised labels.

In some embodiments, the machine learning algorithm utilizes regression modeling, wherein relationships between predictor variables and dependent variables are determined and weighted. In one embodiment, for example, the common property record is a dependent variable and is derived from the at least one rental property depiction, the at least one property record depiction from each data source, or both. In another embodiment, the common property record is a dependent variable derived from the unique external data source. In another embodiment, for example, the common street address of the rental property is a dependent variable and is derived from the at least one rental property depiction, the at least one property record depiction from each data source, or both. In another embodiment, the street address of the rental property is a dependent variable derived from the unique external data source.

The human annotated labels can be provided by a hand-crafted heuristic. For example, the hand-crafted heuristic can comprise examining differences between public and county records. The semi-supervised labels can be determined using a clustering technique to find properties similar to those flagged by previous human annotated labels and previous semi-supervised labels. The semi-supervised labels can employ a XGBoost, a neural network, or both.

In some embodiments, the common property module identifies one or more common property records using a distant supervision method. The distant supervision method can create a large training set seeded by a small hand-annotated training set. The distant supervision method can comprise positive-unlabeled learning with the training set as the 'positive' class. The distant supervision method can employ a logistic regression model, a recurrent neural network, or both. The recurrent neural network can be advantageous for Natural Language Processing (NLP) machine learning.

Examples of machine learning algorithms can include a support vector machine (SVM), a naïve Bayes classification, a random forest, a neural network, deep learning, or other supervised learning algorithm or unsupervised learning algorithm for classification and regression. The machine learning algorithms can be trained using one or more training datasets.

In some embodiments, a machine learning algorithm is used to select catalogue images and recommend project scope. A non-limiting example of a multi-variate linear regression model algorithm is seen below: probability=$A_0$+$A_1(X_1)$+$A_2(X_2)$+$A_3(X_3)$+$A_4(X_4)$+$A_5(X_5)$+$A_6(X_6)$+$A_7(X_7)$ . . . wherein $A_i$ ($A_1$, $A_2$, $A_3$, $A_4$, $A_5$, $A_6$, $A_7$, . . . ) are "weights" or coefficients found during the regression modeling; and $X_i$ ($X_1$, $X_2$, $X_3$, $X_4$, $X_5$, $X_6$, $X_7$, . . . ) are data collected from the User. Any number of $A_i$ and $X_i$ variable can be included in the model. For example, in a non-limiting example wherein there are 7 $X_i$ terms, $X_1$ is the number of property record depictions, $X_2$ is the number of initial candidates, and $X_3$ is the probability that the common property record comprises a property record that refers to the rental property. In some embodiments, the programming language "R" is used to run the model.

Training of Machine Learning Algorithms

In some embodiments, the first machine learning algorithm identifies one or more common property records that refers to the rental property by implementing the at least one rental property depiction and the at least one property record depiction from each data source.

In some embodiments, the first machine learning algorithm is trained by a neural network comprising a collection module, a first set module, and a first training module. In some embodiments, the collection module collects a plurality of predetermined common property records. In some embodiments, the first set module creates a first training set. In some embodiments, the first training set comprises the plurality of predetermined common property records and a plurality of predetermined non-common property records. The plurality of predetermined non-common property records, in some embodiments, comprises two or more property records associated with different properties. In some embodiments, the first training module trains the neural network using the first training set.

In some embodiments, the neural network further comprises a second set module and a second training module. In some embodiments, the second set module creates a second training set for second stage training. In some embodiments, the second training set comprises the first training set and the predetermined non-common property records incorrectly detected as common property records by the first training module. In some embodiments, the second training module trains the neural network using the second training set. In some embodiments, at least one of the predetermined common property records or the predetermined non-common property records is manually collected.

In one embodiment, the rental property depiction and the property record depiction comprise the image. In such an embodiment, the collection module collects a plurality of predetermined common property images. Further, in such embodiments, the first training set comprises the plurality of predetermined common property images and a plurality of predetermined non-common property images. In some embodiments, the plurality of predetermined non-common property images comprises two or more images of different properties. Additionally, in such embodiments, the second training set for second stage training comprising the first training set, and the predetermined non-common property images incorrectly detected as common property images by the first training module.

Alternatively, in some embodiments, training the first machine learning algorithm comprises multiple steps. In a first step, an initial model is constructed by assigning probability weights to predictor variables. In a second step, the initial model is used to "recommend" common property records. In a third step, the validation module accepts verified data regarding the common property record and feeds back the verified data to the common property module. At least one of the first step, the second step, and the third step can repeat one or more times continuously or at set intervals.

In some embodiments, training the second machine learning algorithm comprises multiple steps. In a first step, an initial model is constructed by assigning probability weights to predictor variables. In a second step, the initial model is used to "recommend" street address of the rental property. In a third step, the validation module accepts verified data regarding the street address of the rental property and feeds back the verified data to the common property module. At least one of the first step, the second step, and the third step can repeat one or more times continuously or at set intervals.

Digital Processing Device

Optionally, in some embodiments, the platforms, systems, media, and methods described herein include a digital processing device, or use of the same. In further embodiments, the digital processing device includes one or more hardware central processing units (CPUs) or general purpose graphics processing units (GPGPUs) that carry oust the device's functions. In still further embodiments, the digital processing device further comprises an operating system configured to perform executable instructions. Optionally, in some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, and media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

Optionally, in some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. Optionally, in some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

Optionally, in some embodiments, the device includes a storage and/or memory device. The storage and/or memory device is one or more physical apparatuses used to store data or programs on a temporary or permanent basis. Optionally, in some embodiments, the device is volatile memory and requires power to maintain stored information. Optionally, in some embodiments, the device is non-volatile memory and retains stored information when the digital processing device is not powered. In further embodiments, the non-volatile memory comprises flash memory. Optionally, in some embodiments, the non-volatile memory comprises dynamic random-access memory (DRAM). Optionally, in some embodiments, the non-volatile memory comprises ferroelectric random access memory (FRAM). Optionally, in some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

Optionally, in some embodiments, the digital processing device includes a display to send visual information to a user. Optionally, in some embodiments, the display is a liquid crystal display (LCD). In further embodiments, the display is a thin film transistor liquid crystal display (TFT-LCD). Optionally, in some embodiments, the display is an organic light emitting diode (OLED) display. In various further embodiments, on OLED display is a passive-matrix OLED (PMOLED) or active-matrix OLED (AMOLED) display. Optionally, in some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

Optionally, in some embodiments, the digital processing device includes an input device to receive information from a user. Optionally, in some embodiments, the input device is a keyboard. Optionally, in some embodiments, the input device is a pointing device including, by way of non-limiting examples, a mouse, trackball, track pad, joystick, game controller, or stylus. Optionally, in some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 4:
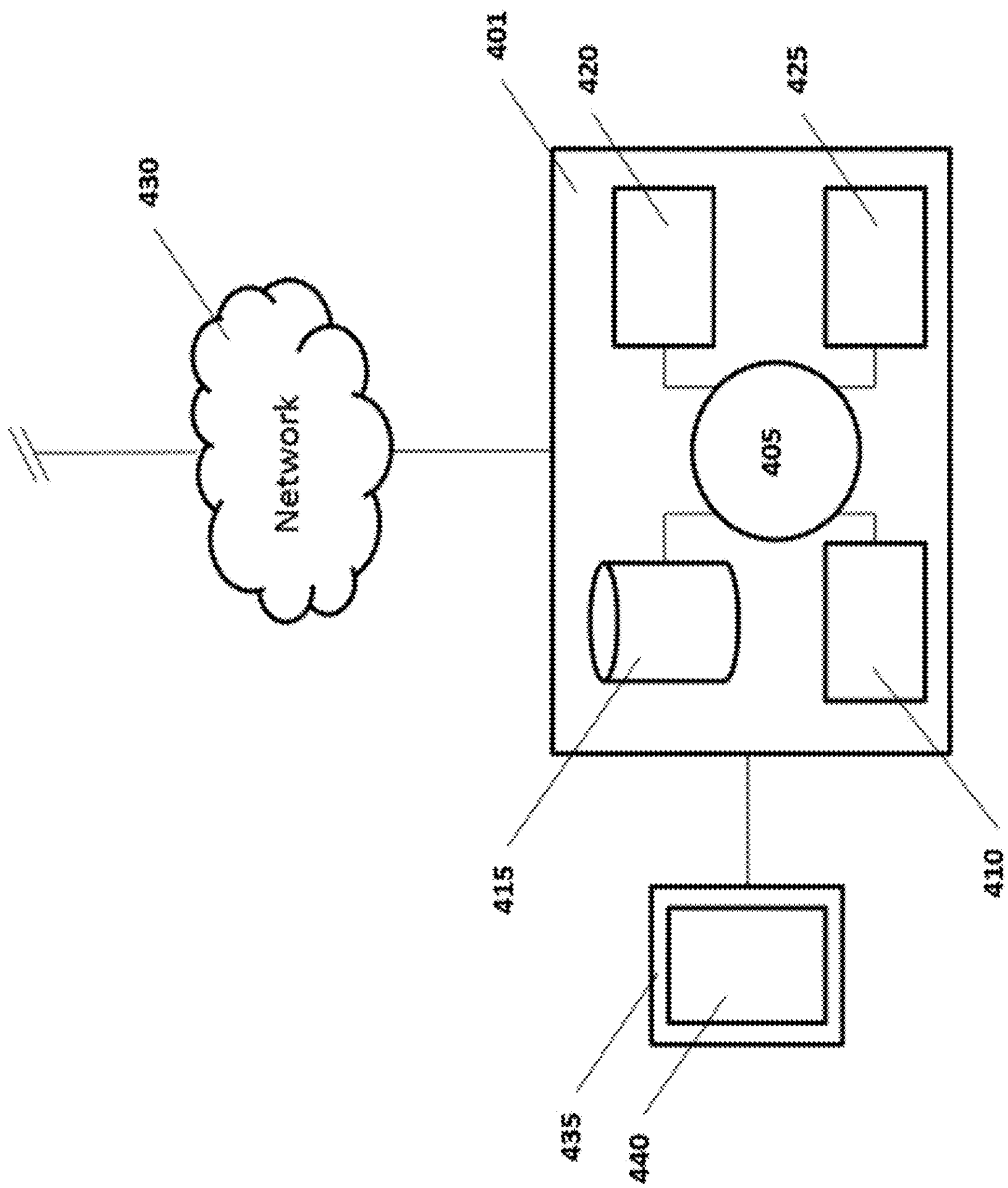
FIG. 4 shows a non-limiting example of a schematic diagram of a digital processing device; in this case, a device with one or more CPUs, a memory, a communication interface, and a display, in accordance with some embodiments.

FIG. 4 shows a schematic diagram of a digital processing device; in this case, a device with one or more CPUs, a memory, a communication interface, and a display, in accordance with some embodiments. Referring to FIG. 4, in a particular embodiment, a digital processing device 401 is programmed or otherwise configured to create an application to detect an unpermitted renovation event and validate the detected event. The non-transitory computer-readable storage media 401 is programmed or otherwise configured to create an application to detect an unpermitted renovation event and validate the detected event. In this embodiment, the digital processing device 401 includes a central processing unit (CPU, also "processor" and "computer processor" herein) 405, which is optionally a single core, a multi core processor, or a plurality of processors for parallel processing. The digital processing device 401 also includes memory or memory location 410 (e.g., random-access memory, read-only memory, flash memory), electronic storage unit 415

(e.g., hard disk), communication interface 420 (e.g., network adapter) for communicating with one or more other systems, and peripheral devices 425, such as cache, other memory, data storage and/or electronic display adapters. The memory 410, storage unit 415, interface 420 and peripheral devices 425 are in communication with the CPU 405 through a communication bus (solid lines), such as a motherboard. The storage unit 415 comprises a data storage unit (or data repository) for storing data. The digital processing device 401 is optionally operatively coupled to a computer network ("network") 430 with the aid of the communication interface 420. The network 430, in various cases, is the internet, an internet, and/or extranet, or an intranet and/or extranet that is in communication with the internet. The network 430, in some cases, is a telecommunication and/or data network. The network 430 optionally includes one or more computer servers, which enable distributed computing, such as cloud computing. The network 430, in some cases, with the aid of the device 401, implements a peer-to-peer network, which enables devices coupled to the device 401 to behave as a client or a server.

Continuing to refer to FIG. 4, the CPU 405 is configured to execute a sequence of machine-readable instructions, embodied in a program, application, and/or software. The instructions are optionally stored in a memory location, such as the memory 410. The instructions are directed to the CPU 105, which subsequently program or otherwise configure the CPU 405 to implement methods of the present disclosure. Examples of operations performed by the CPU 405 include fetch, decode, execute, and write back. The CPU 405 is, in some cases, part of a circuit, such as an integrated circuit. One or more other components of the device 401 are optionally included in the circuit. In some cases, the circuit is an application specific integrated circuit (ASIC) or a field programmable gate array (FPGA).

Continuing to refer to FIG. 4, the storage unit 415 optionally stores files, such as drivers, libraries and saved programs. The storage unit 415 optionally stores user data, e.g., user preferences and user programs. The digital processing device 401, in some cases, includes one or more additional data storage units that are external, such as located on a remote server that is in communication through an intranet or the internet.

Continuing to refer to FIG. 4, the digital processing device 401 optionally communicates with one or more remote computer systems through the network 430. For instance, the device 401 optionally communicates with a remote computer system of a user. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants.

Methods as described herein are optionally implemented by way of machine (e.g., computer processor) executable code stored on an electronic storage location of the digital processing device 401, such as, for example, on the memory 410 or electronic storage unit 415. The machine executable or machine readable code is optionally provided in the form of software. During use, the code is executed by the processor 405. In some cases, the code is retrieved from the storage unit 415 and stored on the memory 410 for ready access by the processor 405. In some situations, the electronic storage unit 415 is precluded, and machine-executable instructions are stored on the memory 410.

Non-Transitory Computer Readable Storage Medium

Optionally, in some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. Optionally, in some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

Optionally, in some embodiments, the platforms, systems, media, and methods disclosed herein include at least one computer program, or use of the same. A computer program includes a sequence of instructions, executable in the digital processing device's CPU, written to perform a specified task. Computer readable instructions can be implemented as program modules, such as functions, objects, Application Programming Interfaces (APIs), data structures, and the like, that perform particular tasks or implement particular abstract data types. In light of the disclosure provided herein, those of skill in the art will recognize that a computer program can be written in various versions of various languages.

The functionality of the computer readable instructions can be combined or distributed as desired in various environments. Optionally, in some embodiments, a computer program comprises one sequence of instructions. Optionally, in some embodiments, a computer program comprises a plurality of sequences of instructions. Optionally, in some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

Optionally, in some embodiments, a computer program includes a web application. In light of the disclosure provided herein, those of skill in the art will recognize that a web application, in various embodiments, utilizes one or more software frameworks and one or more database systems. Optionally, in some embodiments, a web application is created upon a software framework such as Microsoft®.NET or Ruby on Rails (RoR). Optionally, in some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application can be written in one or more markup languages, presentation definition languages, client-side scripting languages, server-side coding languages, database query languages, or combinations thereof. Optionally, in some embodiments, a web application is written to some extent in a markup language such as Hypertext Markup Language (HTML), Extensible Hypertext Markup Language (XHTML), or eXtensible Markup Language (XML). Optionally, in some embodiments, a web application is written to some extent in a presentation definition language such as Cascading Style Sheets (CSS). Optionally, in some embodiments, a web application is written to some extent in a client-side scripting language such as Asynchronous JavaScript and XML (AJAX), Flash® ActionScript, JavaScript, or Silverlight®. Optionally, in some embodiments, a web application is written to some extent in a server-side coding language such as Active Server Pages (ASP), ColdFusion®, Perl, Java™, Java Server Pages (JSP), Hypertext Preprocessor (PHP), Python™ Ruby, Tcl, Smalltalk, WebDNA®, or Groovy. Optionally, in some embodiments, a web application is written to some extent in a database query language such as Structured Query Language (SQL). Optionally, in some embodiments, a web application integrates enterprise server products such as IBM® Lotus Domino®. Optionally, in some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 5:
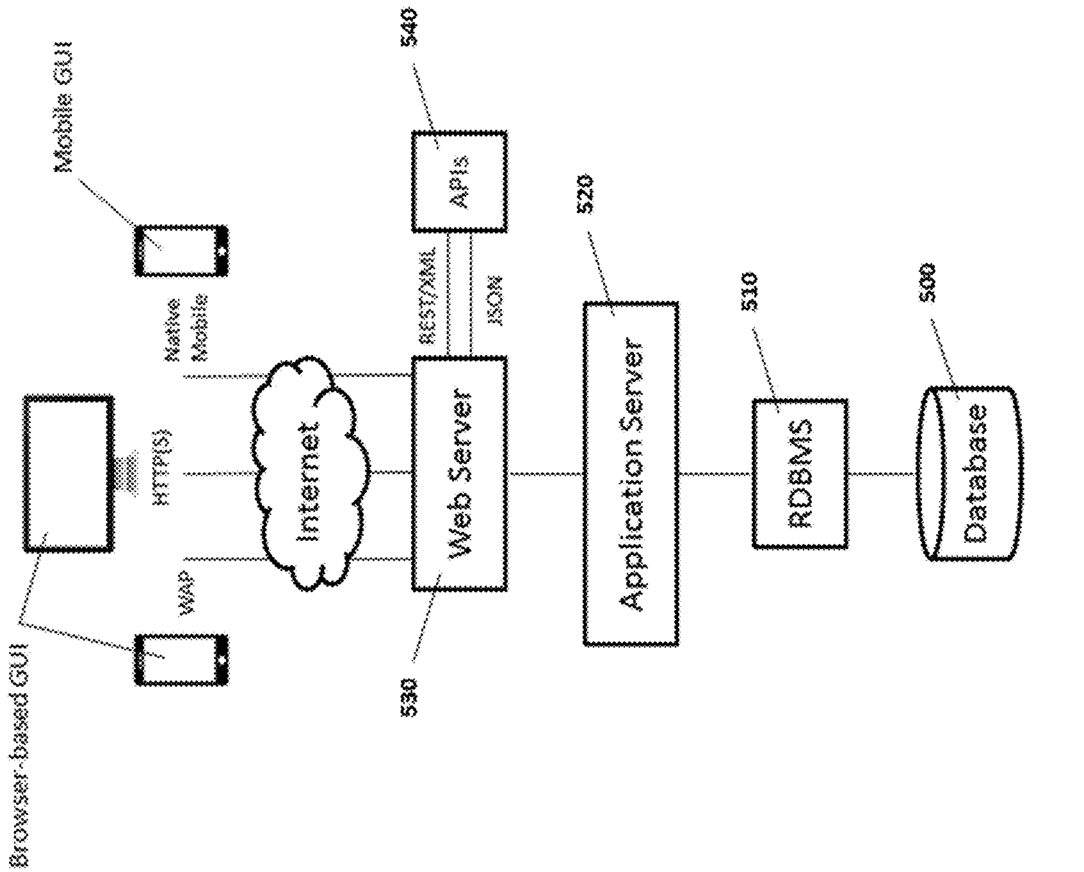
FIG. 5 shows a non-limiting example of a schematic diagram of a web/mobile application provision system; in this case, a system providing browser-based and/or native mobile user interfaces, in accordance with some embodiments.

Referring to FIG. 5, in a particular embodiment, an application provision system comprises one or more databases 500 accessed by a relational database management system (RDBMS) 510. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 520 (such as Java servers, .NET servers, PHP servers, and the like) and one or more web servers 530 (such as Apache, IIS, GWS and the like). The web server(s) optionally expose one or more web services via app application programming interfaces (APIs) 540. Via a network, such as the internet, the system provides browser-based and/or mobile native user interfaces.

Figure 6:
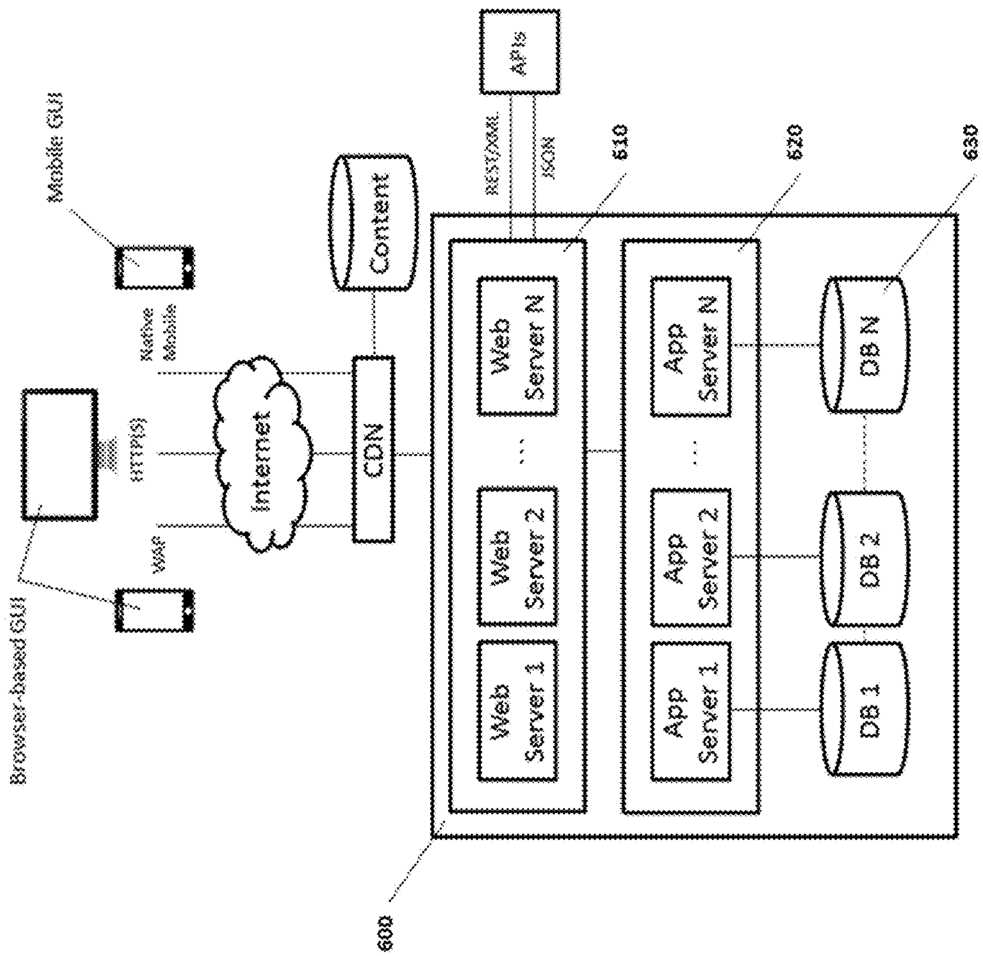
FIG. 6 shows a non-limiting example of a schematic diagram of a cloud-based web/mobile application provision system; in this case, a system comprising an elastically load balanced, auto-scaling web server and application server resources as well synchronously replicated databases, in accordance with some embodiments.

Referring to FIG. 6, in a particular embodiment, an application provision system alternatively has a distributed, cloud-based architecture 600 and comprises elastically load balanced, auto-scaling web server resources 610, and application server resources 620 as well synchronously replicated databases 630.

Mobile Application

Optionally, in some embodiments, a computer program includes a mobile application provided to a mobile digital processing device. Optionally, in some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

Optionally, in some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. Optionally, in some embodiments, a computer program includes one or more executable complied applications.

Web Browser Plug-in

Optionally, in some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. Optionally, in some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

Optionally, in some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. Optionally, in some embodiments, software modules are in one computer program or application. In other embodiments, software modules are in more than one computer program or application. Optionally, in some embodiments, software modules are hosted on one machine. In other embodiments, software modules are hosted on more than one machine. In further embodiments, software modules are hosted on cloud computing platforms. Optionally, in some embodiments, software modules are hosted on one or more machines in one location. In other embodiments, software modules are hosted on one or more machines in more than one location.

Databases

Optionally, in some embodiments, the platforms, systems, media, and methods disclosed herein include one or more databases, or use of the same. In view of the disclosure provided herein, those of skill in the art will recognize that many databases are suitable for storing data from one or more sources related to a data set and/or a property. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. Optionally, in some embodiments, a database is internet-based. In further embodiments, a database is web-based. In still further embodiments, a database is cloud computing-based. In other embodiments, a database is based on one or more local computer storage devices.

Graphic User Interfaces

Optionally, in some embodiments, the platforms, systems, media, and methods disclosed herein are presented through one or more graphic user interfaces.

Figure 15:
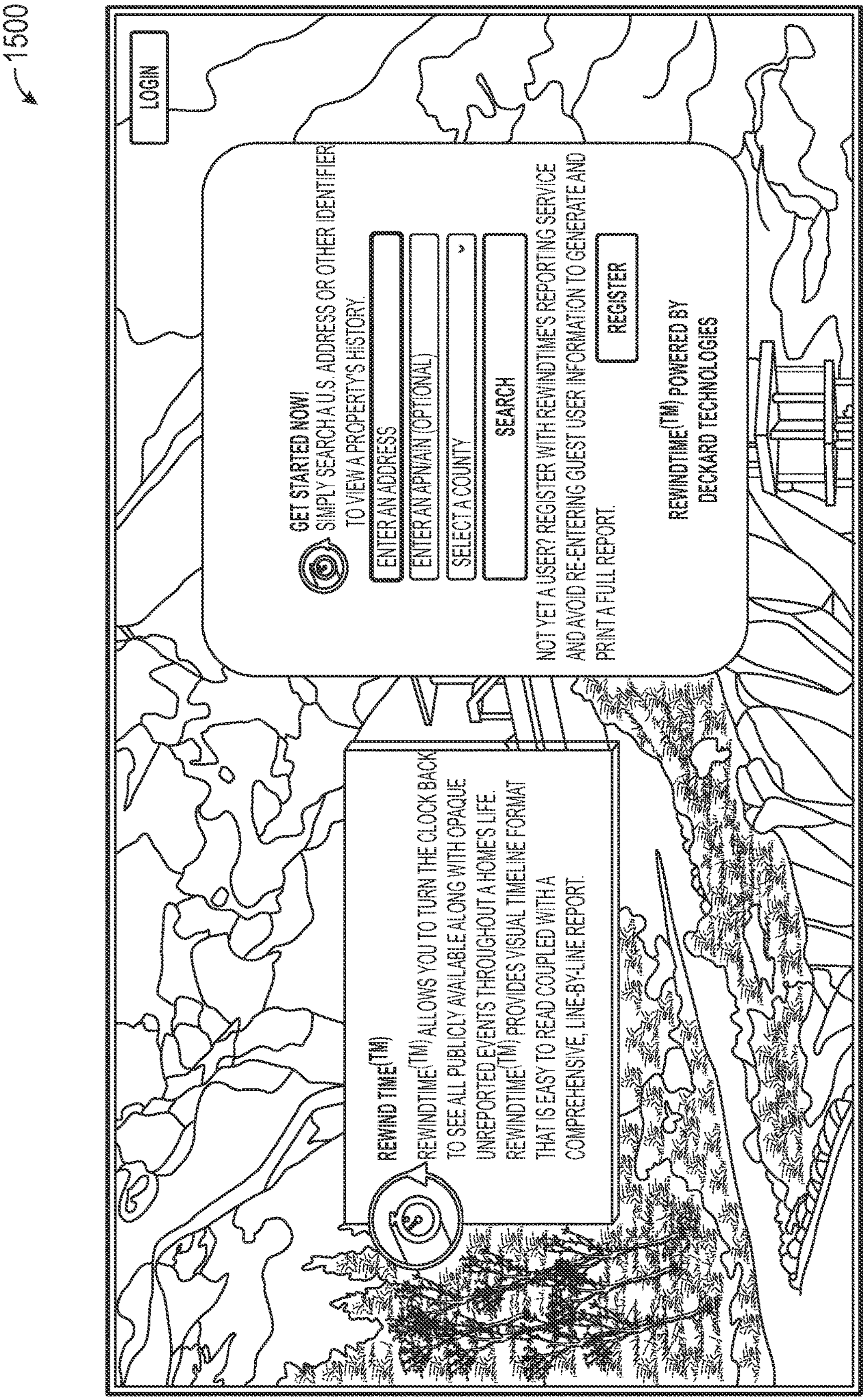
FIG. 15 is a non-limiting example of a graphic user interface; in this case, an interface for viewing publicly available along with opaque unreported events throughout a property's existence.
Figure 16:
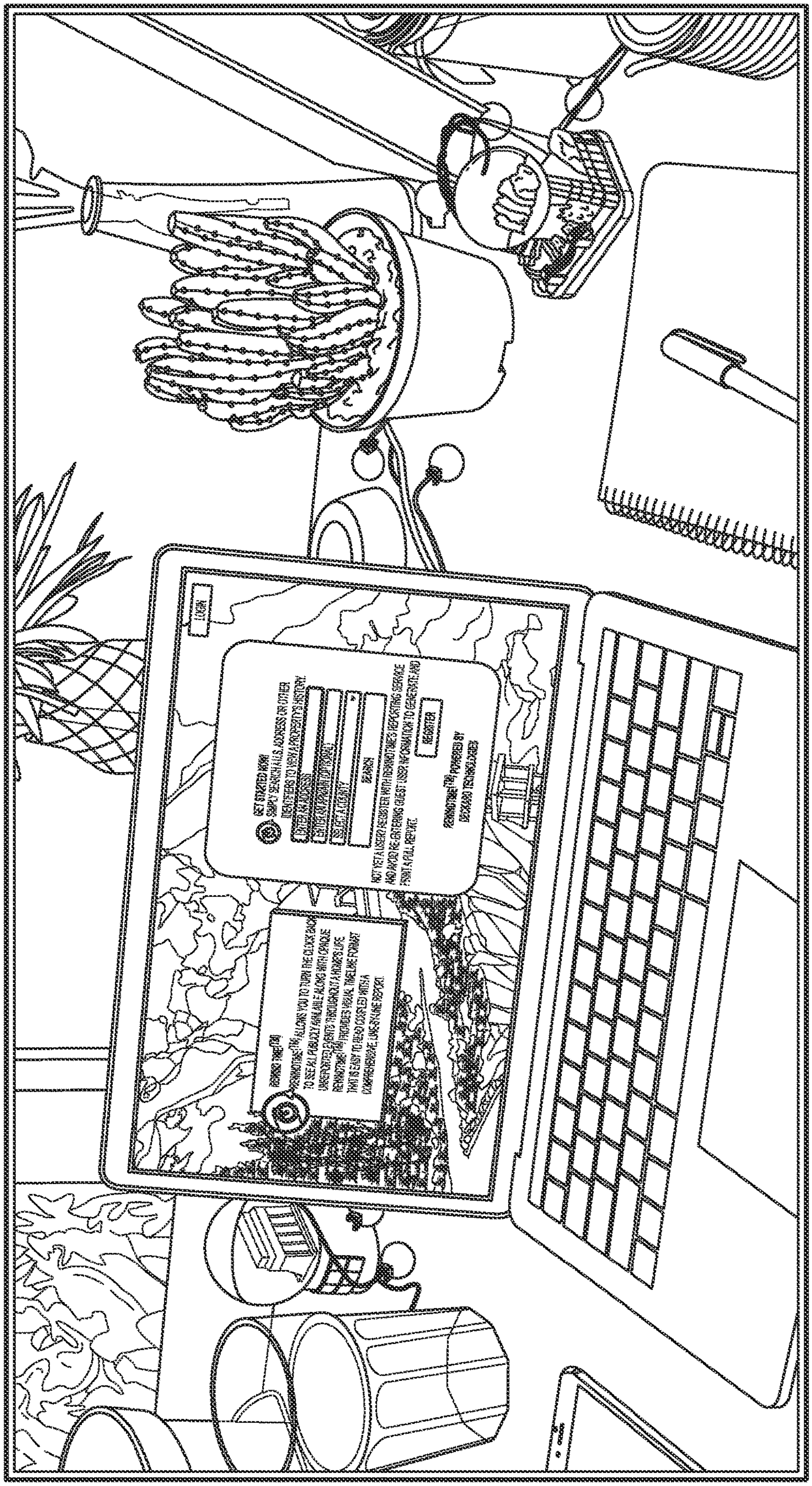
FIG. 16 is a non-limiting example of a graphic user interface on a laptop; in this case, an interface for viewing publicly available along with opaque unreported events throughout a property's existence.
Figure 17:
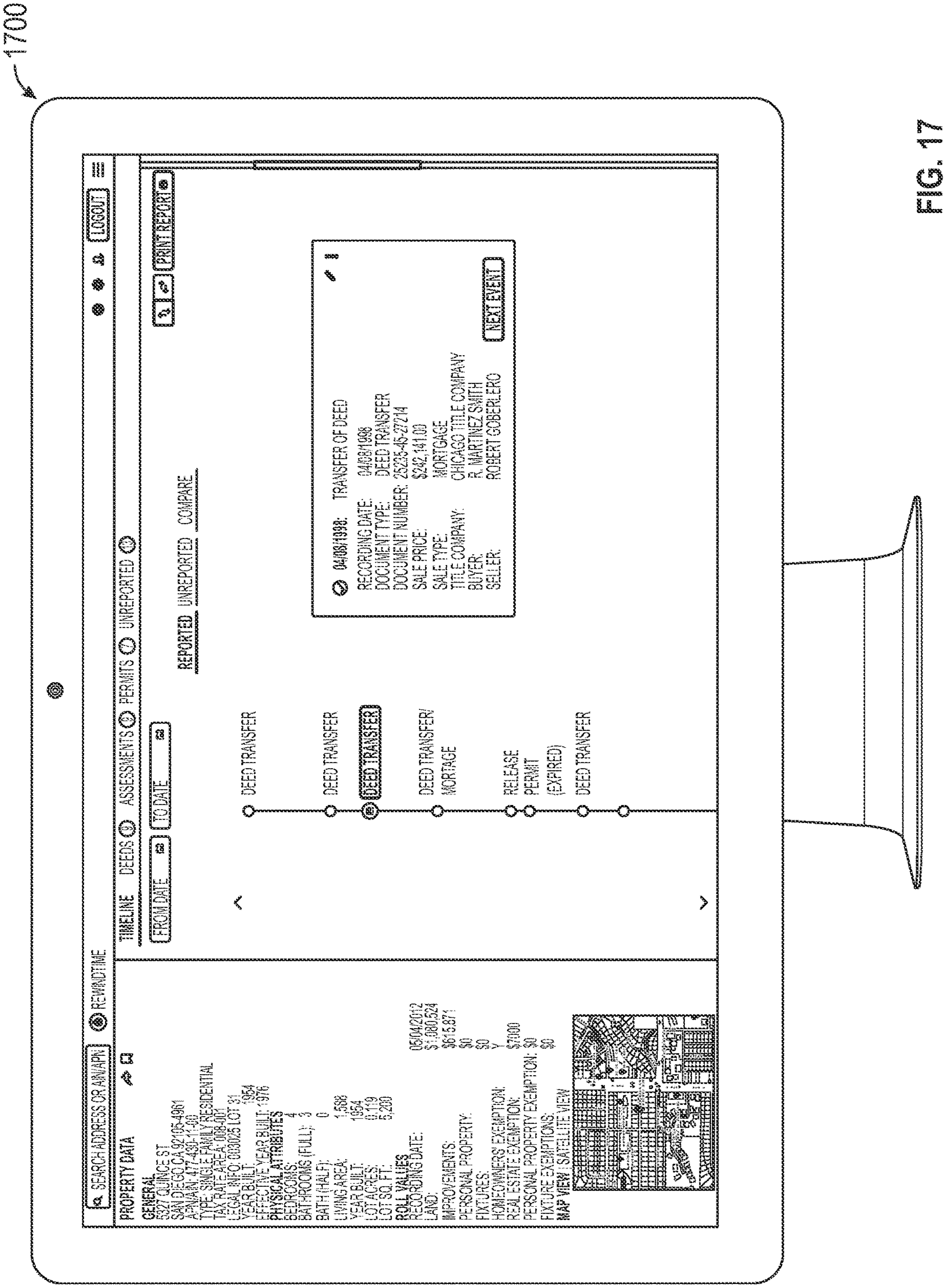
FIG. 17 is a non-limiting example of a graphic user interface on a desktop; in this case, an interface for viewing a timeline and overview of publicly available events throughout a property's existence.

FIG. 15 is a non-limiting example of a graphic user interface 1500. In some embodiments, the graphic user interface offers an application for viewing publicly available along with opaque unreported events throughout a property's existence. In some embodiments, the application provides a visual timeline format that is easy to read coupled with a comprehensive, line-by-line report. FIG. 16 is a non-limiting example of the graphic user interface depicted in FIG. 15 on a laptop 1600. FIG. 17 is a non-limiting example of a graphic user interface on a desktop 1700. In other embodiments, the graphic user interface for viewing publicly available along with opaque unreported events can be displayed in any transitory storage medium.

Figure 18:
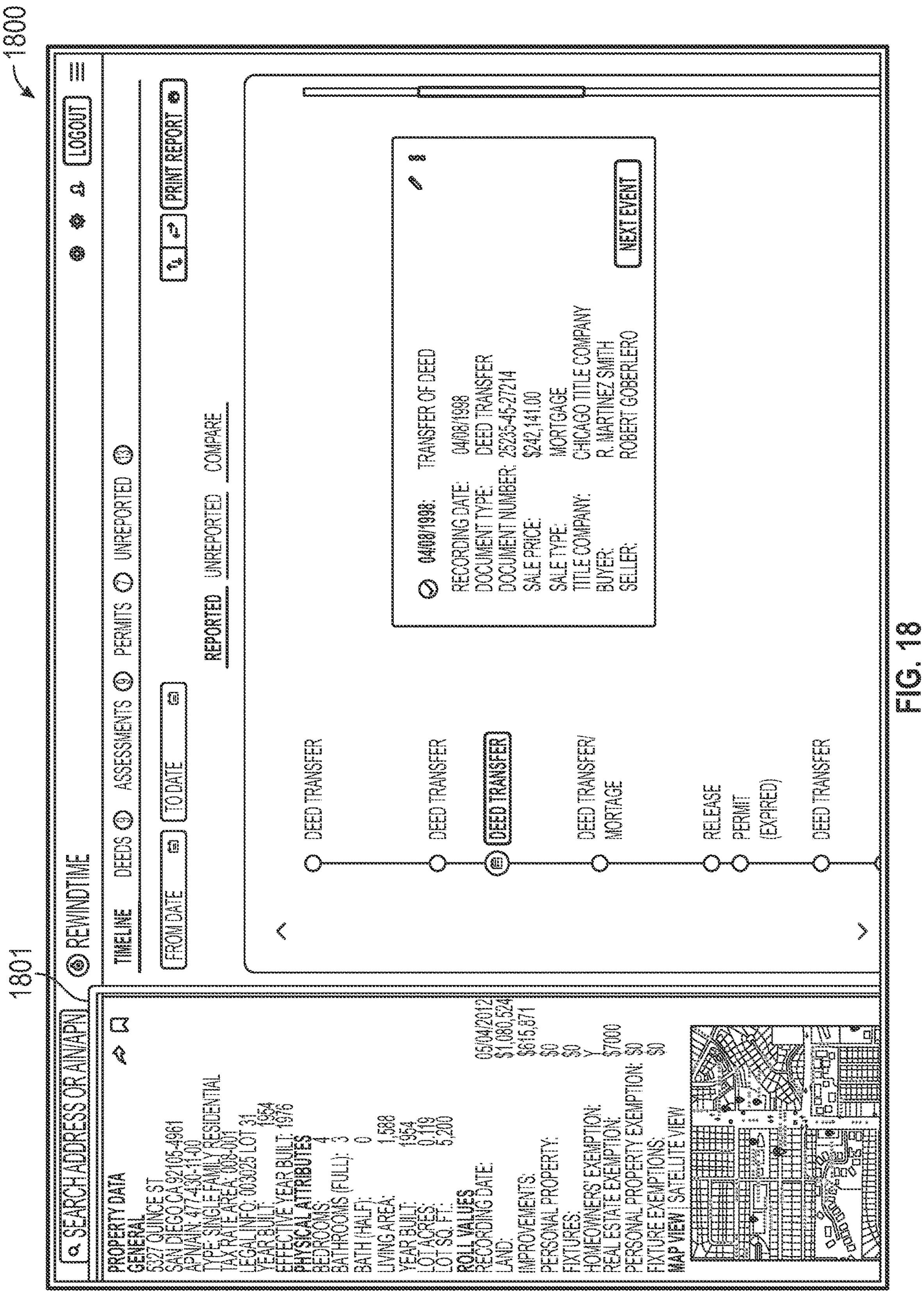
FIG. 18 is a non-limiting example of a graphic user interface; in this case, an interface for viewing a timeline and overview of publicly available events throughout a property's existence.

FIG. 18 is a non-limiting example of a graphic user interface; in this case, an interface for viewing a timeline and overview of publicly available events throughout a property's existence 1800. In some embodiments, the graphic user interface provides a side panel 1801 that provides an overview of a property's details. In some embodiments, the property details include the property address, APN/AIN number, type of property (e.g., single family residential, condo, townhome, multi-unit, etc.), tax rate area, legal info, year built, effective year built, physical attributes (e.g., number of bedroom, bathrooms, and baths; square footage, lot acreage; lot square footage), and roll values (e.g., recording data, fair market value of land and improvements, personal property, fixtures, homeowners' exemption, real estate exemption, personal property exemption, and fixture exemptions), and a map of the property.

Figure 19:
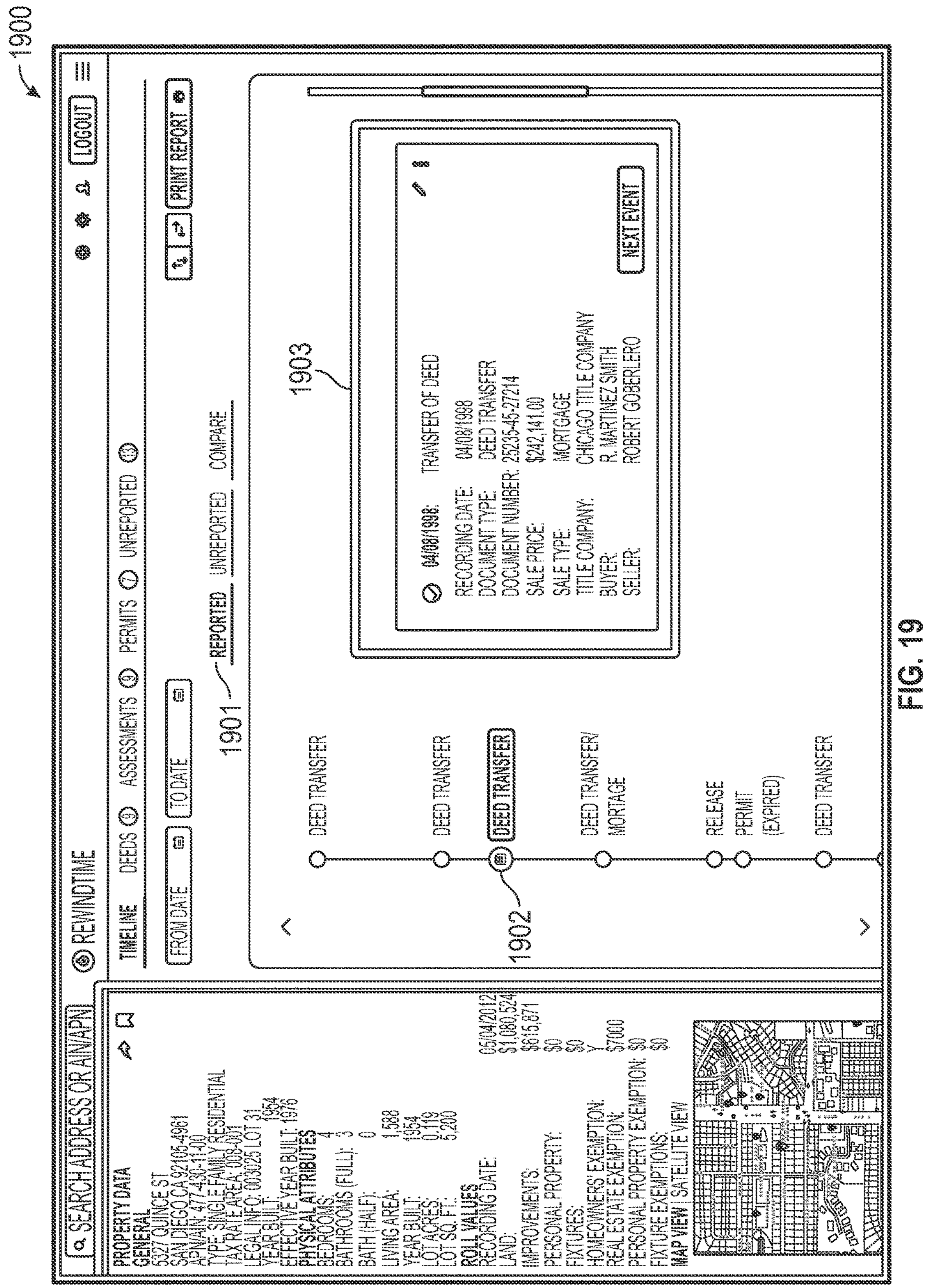
FIG. 19 is a non-limiting example of a graphic user interface; in this case, an interface for viewing a timeline and overview of publicly available events throughout a property's existence.

FIG. 19 is a non-limiting example of a graphic user interface; in this case, an interface for viewing a timeline and overview of publicly available events throughout a property's existence 1900. In some embodiments, the graphic user interface offers a REPORTED mode 1901, wherein a user can select a node 1902 on a timeline of reported events for a property of interest. In some embodiments, selecting a node 1902 will display information about the reported event 1903. By way of example, a reported event can comprise a transfer of deed. In such an example, additional information about the reported event can include the recorded data of the deed, document number, sale price, sale type, title company, buyer, and seller.

Figure 20:
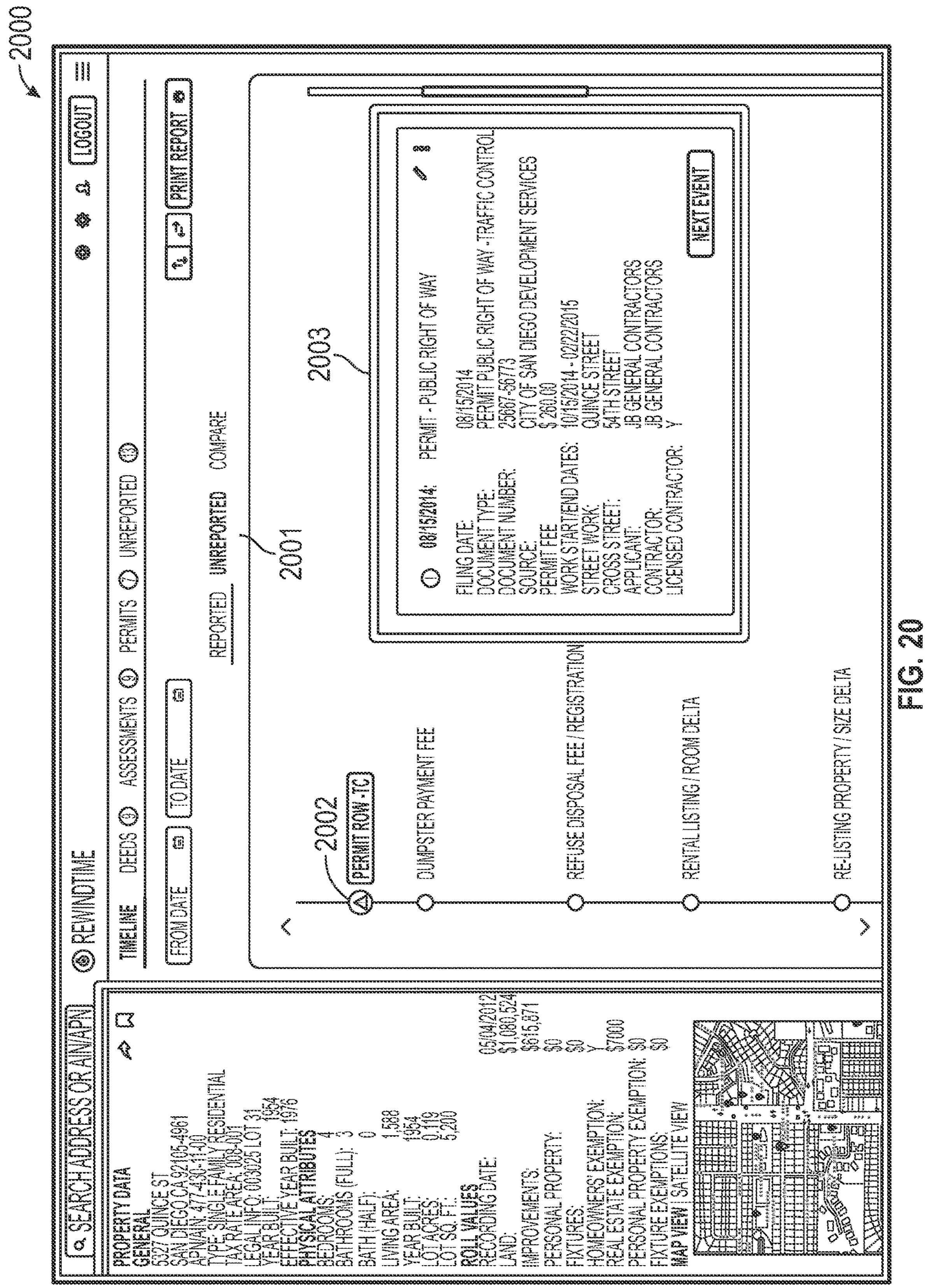
FIG. 20 is a non-limiting example of a graphic user interface; in this case, an interface for viewing a timeline and overview of opaque unreported events throughout a property's existence.

FIG. 20 is a non-limiting example of a graphic user interface; in this case, an interface for viewing a timeline and overview of opaque unreported events throughout a property's existence 2000. In some embodiments, the graphic user interface offers an UNREPORTED mode 2001, wherein a user can select a node 2002 on a timeline of unreported events for a property of interest. In some embodiments, selecting a node 2002 will display additional information about the unreported event 2003. By way of example, an unreported event can comprise of a permit—public right of way. In such an example, additional information about the unreported can include the filing date, document type, document number, source, permit fee, work start and work end dates, street work, cross street, applicant name, contractor name, and whether the contractor was licensed. In some embodiments, the unreported event comprises the unpermitted renovation events, improper real estate transfer event, or any combination thereof.

Figure 21:
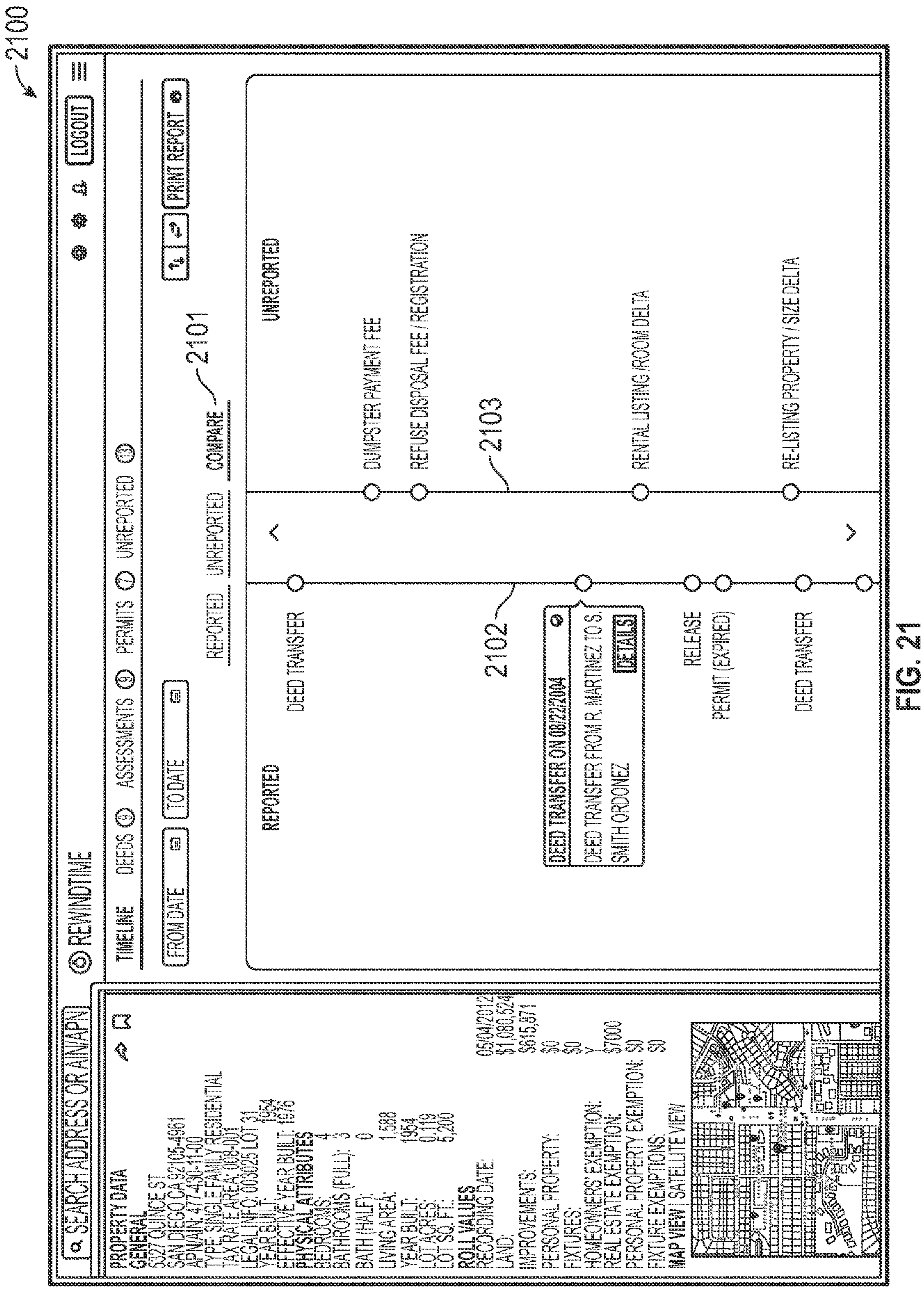
FIG. 21 is a non-limiting example of a graphic user interface; in this case, an interface for simultaneously viewing a timeline of publicly available along with opaque unreported events throughout a property's existence.

FIG. 21 is a non-limiting example of a graphic user interface; in this case, an interface for simultaneously viewing a timeline of publicly available along with opaque unreported events throughout a property's existence 2100. In some embodiments, the graphic user interface offers a COMPARE mode 2101, wherein a user can simultaneously view and compare a timeline of publicly available events throughout a property's existence 2102 and a timeline of opaque unreported events throughout the same property's existence 2103. In some embodiments, the timelines are linked so that a user scrolling up and down the interface will result in both timelines being scrolled through simultaneously. In some embodiments, the timeline of publicly available events throughout a property's existence 2102 comprises information known about a home. In some embodiments, the timeline of opaque unreported events throughout the same property's existence 2103 comprises unreported information relevant to identify when a home has been altered, potentially without proper permits. In some embodiments, events that span a time period rather than a specific date is portrayed through long bubbles rather than a single node. In some embodiments, events that span a time period of a specific data comprises events where suspected alterations were made to a home and not reported through a standard permit process. Optionally, in some embodiments, a plurality of timelines is provided and compared. Optionally, in some embodiments, a third timeline of unreported events with hard documentary evidence (e.g., construction) can be provided. In some embodiments, all the plurality of timelines is linked so that a user scrolling up and down the interface will result in all timelines being scrolled through simultaneously.

Figure 22:
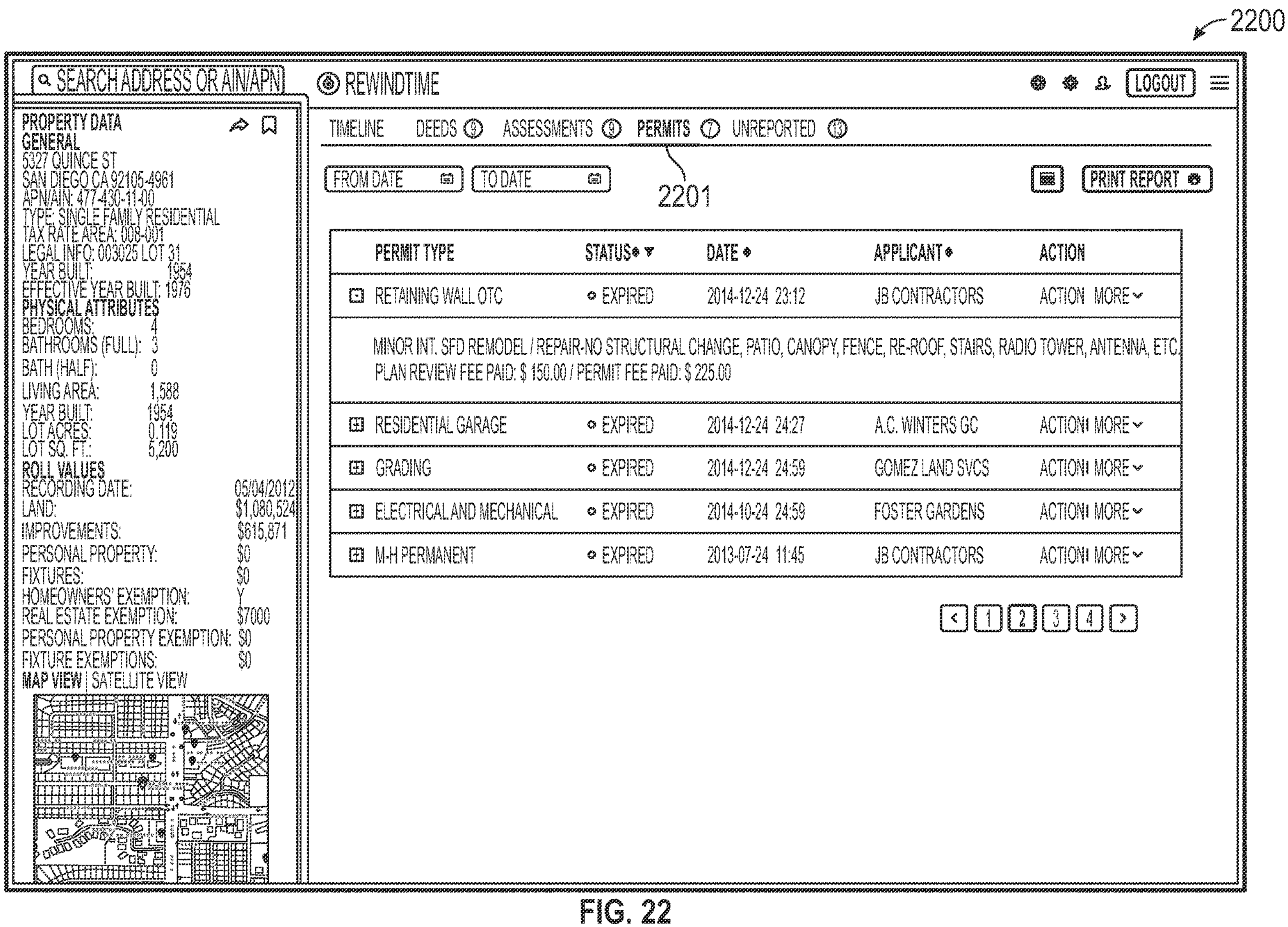
FIG. 22 is a non-limiting example of a graphic user interface; in this case, an interface for viewing and sorting records associated with a property of interest.

FIG. 22 is a non-limiting example of a graphic user interface; in this case, an interface for viewing and sorting records associated with a property of interest 2200. In some embodiments, a user can select a PERMIT module 2201. In some embodiments, line-by-line records can be viewed, sorted, and modified on the data grid 2202.

Figure 23:
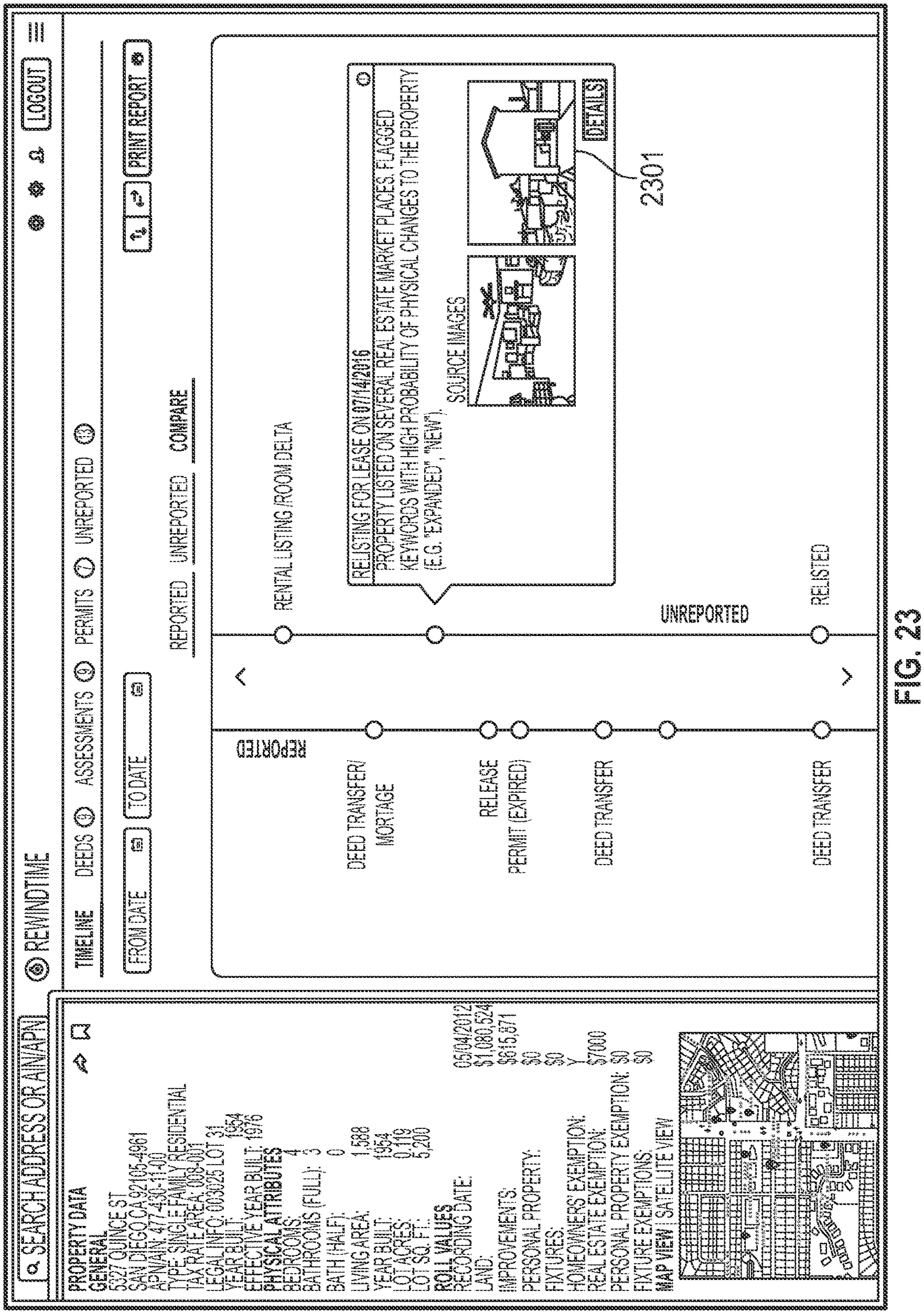
FIG. 23 is a non-limiting example of a graphic user interface; in this case, an interface for viewing images of the property interest.

FIG. 23 is a non-limiting example of a graphic user interface; in this case, an interface for viewing images of the property interest 2300. In some embodiments, unreported items can store the latest images of a property's listing 2301.

Figure 24:
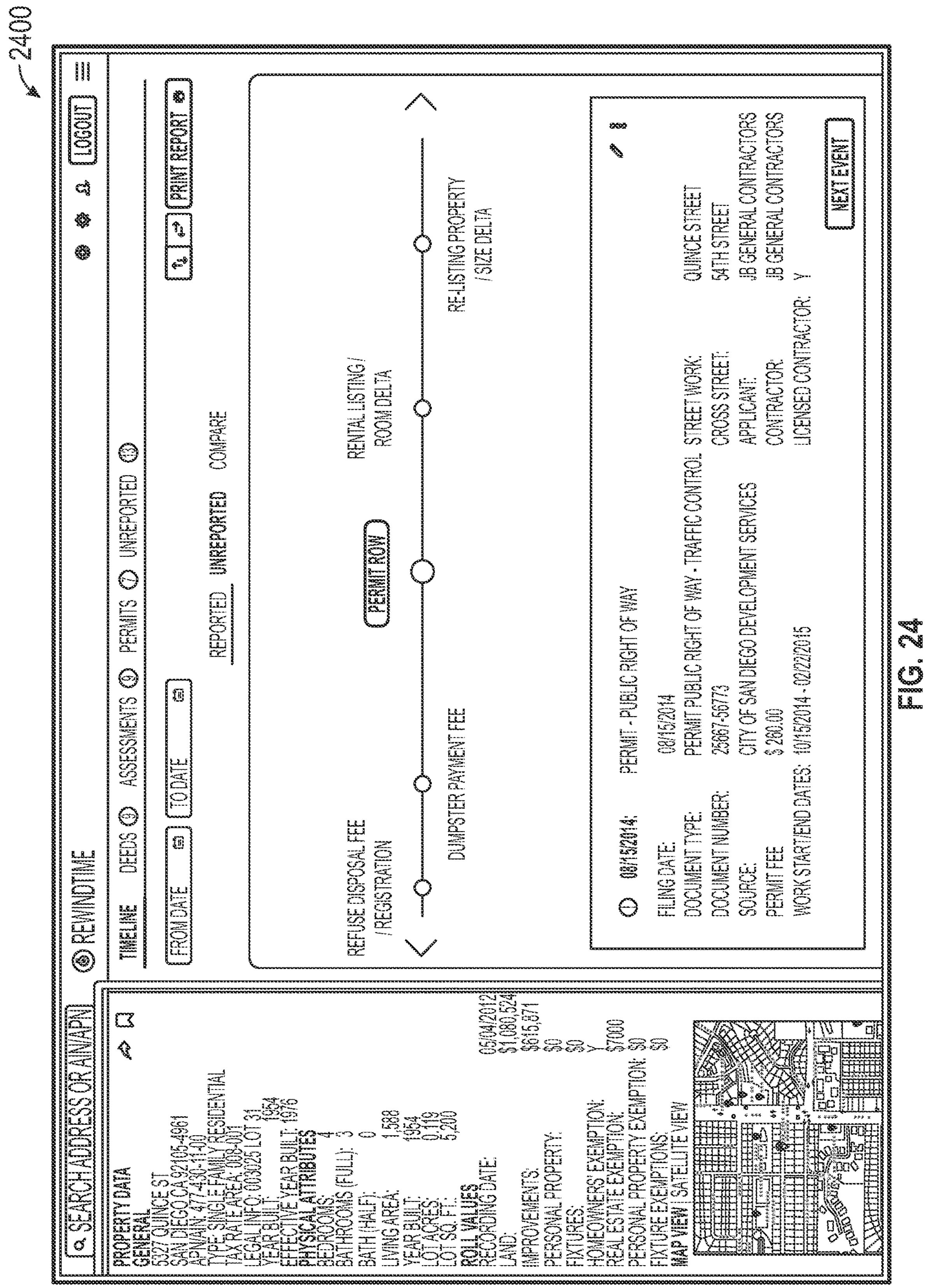
FIG. 24 is a non-limiting example of a graphic user interface; in this case, a module for toggling the timeline view.

FIG. 24 is a non-limiting example of a graphic user interface; in this case, a module for toggling the timeline view 2401. In some embodiments, the timeline can be presented in a horizontal view. In other embodiments, the timeline can be presented in a vertical view.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by 10%, 5%, or 1%, including increments therein.

As used herein, the term "natural language task process" refers to a computer process of configured to efficiently and accurately recognize contextual information from natural language data.

EXAMPLES

The following illustrative examples are representative of embodiments of the software applications, systems, and methods described herein and are not meant to be limiting in any way. While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein can be employed in practicing the disclosure.

Example 1—Detection of an Unpermitted Renovation by a Corporation

In a first example herein, a renovation detection module receives a list of known flipper corporations from the database comprising a list of known "flipper" corporations. When the renovation detection module receives an indication that the square footage of the building on 123 Main Street has increased by 250 square feet from an MLS external data source, and as no permit has been requested for that address, it identifies that 123 Main Street is an initial candidate property with a baseline unpermitted renovation probability of 50%. The renovation probability module determines that 123 Main Street was recently bought by Corporation A and increases the probability that the change in the square footage of 123 Main Street is due to an unpermitted renovation to 55%. Further, because Corporation A is a known "flipper" corporation, the unpermitted renovation probability is again increased to 60%. As the unpermitted renovation probability for 123 Main Street is above the threshold of 55%, the property is further screened.

Since it was determined that 123 Main Street is owned by Corporation A, the renovation probability module further determines that its corporate officers are Ben and Charlie and checks their social media for indicia of renovations. As both Ben and Charlie have posted construction pictures to social media the renovation probability is increased to 65%. Further, because Ben, as a corporate officer of Corporation A, has been previously associated with flipping houses, the renovation probability is additionally increased to 70%. By reviewing data from MLS and other sources the renovation probability module further confirms that renovations have or are occurring at 123 Main Street, and the renovation probability is additionally increased to 70%. With a final renovation probability of 70%, above the T2 threshold of 65%, an indication of a highly probable unpermitted renovation, the renovation probability module sends an instruction to the candidate validation module to inspect 123 Main Street.

City officials visit 123 Main Street to determine that renovations are being made and issue a warning or fine for the unpermitted renovations. The candidate validation module then sends an indication to the renovation probability module and the renovation detection module to validate the learning and processing parameters therein.

Example 2—Detection of an Unpermitted Renovation by an Owner

In a second example herein, a renovation detection module receives an indication that a social media image with the description "Brand New Carport!" was tagged at 123 Birch Lane, and as no permit has been requested for that address, it identifies that 123 Birch Lane is an initial candidate property with a baseline unpermitted renovation probability of 55%. The renovation probability module determines that 123 Birch Lane was recently bought by Jane and Jim, who have no previous history of house flipping or unpermitted renovations and maintains the unpermitted renovation probability of 55%. As the unpermitted renovation probability for 123 Birch Lane meets the threshold of 55%, the property is further screened.

Since it was determined that 123 Birch Lane is owned by Jane and Jim, the renovation probability module checks other social media sources for posts by Jane and Jim, determines that both have displayed renovation and/or construction related information and increases the renovation probability to 62.5%. With a renovation probability of 62.5%, an indication of a moderately probable unpermitted renovation, below the T2 threshold of 65%, the renovation probability module then determines that the renovation probability is greater than the T3 probability of 60% and searches for further evidence from social media, MLS, and other sources. As further research of the MLS listing shows that the property has been put up for sale, the unpermitted renovation probability is increased to 67.5% and above the T2 threshold of 65%. The renovation probability module then sends an instruction to the candidate validation module to inspect 123 Birch Lane Street.

City officials visit 123 Birch Lane Street to determine that renovations are being made and issue a warning or fine for the unpermitted renovations. The candidate validation module then sends an indication to the renovation probability module and the renovation detection module to validate the learning and processing parameters therein.

Example 3—Assignment of Inspectors to Properties

In a third example herein, the machine learning and filtering engine recommends that an inspector be sent to properties at 111 A Street and at 222 B Street. Current renovation indicia shows that 111 A Street and 222 B Street were sold within the last two months and the last two years, respectively, and that the owner of 111 A Street has recently flipped houses. Social media shows that the owner of 111 A Street posted images yesterday of a new refrigerator appliance. Further, as recent street view images of 111 A Street show a mostly complete extension not seen in the original MLS listing, the renovation on that property is estimated to conclude within one month. Social media images by the owners of 222 B Street with bags of concrete and waste bins and recent wood purchases indicate that the renovations at that address will conclude in at least 4 months. Inspector C, who lives closest to 111 A Street, is assigned to inspect that property immediately. Inspector W, who has a free schedule next month, is assigned to inspect 222 B Street within that period of time.

Example 4—Assignment of a Plurality of Inspectors to Properties

In a fourth example herein the city of Flipville has 5 inspectors, and they can typically visit 3 sites per day. 200 active, unpermitted, and uninspected renovations are determined from data mining techniques. The various data sources are further examined to estimate how close that property is to finishing the renovation, wherein a value F corresponding to the estimated days to completion is assigned to each property. The list is then sorted from smallest to largest F, whereby the first property is assigned to the first inspector. The inspector can be selected randomly, or based on where the inspector lives, closer to the property being better, assuming that they go directly to the property at the start of the working day, or other criteria. A formula, such as one maximizing 1/(F+D) is used to select another 4 properties for that inspector to visit that day, whereby grouping the properties geographically allows the inspector to visit more properties per day. The assigned properties are removed from the list and the process is repeated for the remaining inspectors, thus assigning 25 properties to be inspected. This process is repeated each day, with newly discovered properties being added to the list, inspected properties being removed and data from the inspection being incorporated into the learning algorithms, and the list being re-sorted and re-processed.

Example 5—Detecting an Improper Real Estate Transfer Event

In a fifth example herein brothers A, B, and C were each bequeathed a third of the property at 333 D Street, valued at 30 million dollars. The improper transfer detection module determines that 333D street is a potential candidate once the data ingestion interface receives a real estate transfer indicia related to the bequeathment through a sales trust, the value of the property, and a real estate transfer indicia comprising a sale by brother A of his portion of the real estate. The improper real estate transfer probability calculation module then determines that the initial candidate has a high probability of an improper real estate transfer, as the sale occurred through a sales trust, and as brother A sold his ⅓$^{rd}$ share, valued at 10 million dollars, to brother C for only 1 million dollars. An inspection of the highly probable initial candidate finds that the 30 million dollar valuation is accurate, and that as such, an improper real estate transfer by brother A has occurred.

Example 6—Detecting an Improper Real Estate Transfer Event Using Historical Data In a sixth example herein brothers D, E, and F were each bequeathed a third of the property at 444 G Street. The ingestion interfaces receive notice of the bequeathment and the proper taxes, fees, and forms filled out by each brother for their respective share of the property and store this information in the historical transfer database. One year later brother D sells his ⅓$^{rd}$ share to brother F, but because less than 50% of the ownership of the property has changed, this change of ownership is not reported and a re-appraisal is not performed. The sale by brother D is appended to the previously stored data regarding 444 G Street in the historical transfer database. Subsequently brother E also sells his ⅓$^{rd}$ share to brother F. Brother D did not report the change in ownership or request a re-appraisal during his sale. Once the data ingestion interfaces detect the sale by brother E of his ⅓$^{rd}$ share, the improper transfer detection module recalls the previous sale by brother D of his ⅓$^{rd}$ share (i.e., remembers the sequence of transfers), and determines that, as the change in ownership is now greater than 50%, an improper transfer has occurred.

Example 7—Determining when One or More Unpermitted Renovation Events has Taken Place In a seventh example herein 123 B Street is determined to be a candidate of an unpermitted renovation. The set of first data ingestion interfaces determines that as the last government documented assessment of 123 B Street on January 2012 does not include the unpermitted renovation, that the renovation must have occurred since then. The set of second data ingestion interfaces determines the unpermitted renovation timing indicia that a dumpster delivery request was made for two dumpsters to the address of the candidate location in February 2001 and that a manufacturer warrantee is documented as citing a refrigerator installation date in June 2013. The renovation timing estimation module then applies a machine learning algorithm to present a refined renovation time range of between March 2001 and June 2013 based on the detected initial time range and the detected unpermitted renovation timing indicia. An administrative user then employs a set of third data ingestion interfaces which determines that the owner of 123 B Street ordered a carpet installation in April 2002 and granite installation in March of 2013. The renovation timing estimation module then applies a machine learning algorithm to determine that, based on the unpermitted renovation timing indicia from the set third of third data ingestion interfaces two renovations took place from February 2001 and June 2013; a bedroom addition within a further refined renovation time range of March 2001 and April 2002 and a kitchen remodeling within a further refined renovation time range of February of 2013 and June 2013. The owners are then charged the appropriate back taxes for the difference in property value since March 2001.

Example 8—Detecting an Improper Residency Status

In an eighth example herein, Bob has a primary residence in Minnesota and a vacation home in California. Upon his retirement, Bob decides to move permanently to a warmer climate, but to keep his Minnesota residence for visiting his family. Bob continues to file interest deductions on his tax returns for his Minnesota property for the amount commensurate with a primary residence. The improper residency detection module that identifies Bob's Minnesota house as an initial candidate based on an improper residency indicia of a significant increase in his California utility bill and a significant decrease in his Minnesota utility bill. The residency probability calculation module then calculates a high probability of an improper residence status. After inspection and confirmation of the change of Bob's primary and vacation residence, the confirmation is feed back to the improper residency probability calculation module to improve its calculation over time.

Example 9—Determination of a Listed Address

In one example of the media, systems, and methods herein, a rental listing module receives a rental property listing that is a short-term listing from AirBnB for a rental property that is a cabin. The rental listing module further receives a rental property depiction of the rental property listing that is a rental image and a rental map area. Thereafter a first data ingestion interface connected to Craigslist determines a property record depiction that is an image and text a property record. The common property module then applies a first machine learning algorithm to the AirBnB rental image and a rental map area, and the Craigslist image and text to identify that the Craigslist listing is a common property record that refers to the rental property. A lexicographical data mining task process is then performed by a second data ingestion interface to the Craigslist text to determine that the street address specified in the Craigslist text is 123 Sesame Street.

Example 10—Image Processing to Determine an Address

In one example of the media, systems, and methods herein, a rental listing module receives a rental property listing that is a short-term listing from AirBnB for a rental property that is a cabin. The rental listing module further receives a rental property depiction of the rental property listing that is a rental image and a rental map area. Thereafter a first data ingestion interface connected to Craigslist determines a property record depiction that is an image and text a property record. The common property module then applies a first machine learning algorithm to the AirBnB rental image and a rental map area, and the Craigslist image and text to identify that the Craigslist listing is a common property record that refers to the rental property. A photographic data mining task process is then performed by a second data ingestion interface to the Craigslist image to determine that the image shows the street address as being 123 Sesame Street.

Example 11—Determination of an Address by Proximity

In a third example of the media, systems, and methods herein, a rental listing module receives a rental property listing that is a short-term listing from AirBnB for a rental property that is a cabin. The rental listing module further receives a rental property depiction of the rental property listing that is a rental image and a rental map area. Thereafter a first data ingestion interface connected to Craigslist determines a property record depiction that is an image and text a property record. The common property module then applies a first machine learning algorithm to the AirBnB rental image and a rental map area, and the Craigslist image and text to identify that the Craigslist listing is a common property record that refers to the rental property. A second machine learning algorithm is then performed by a property address module, to the AirBnB rental image and rental map area and the Craigslist image and text, to determine that as the Craigslist text mentions that, "the cabin is right across the street from the $4^{th}$ street ski shuttle stop," and as the AirBnB rental image shows that the cabin in on a street corner next to a ski shuttle stop, that the street address of the rental property is 123 Mammoth Lane.

Example 12—Determination of an Address by Proximity without a Listed Address In a fourth example of the media, systems, and methods herein, a rental listing module receives a rental property listing that is a short-term listing from AirBnB for a rental property that is a cabin. The rental listing module further receives a rental property depiction of the rental property listing that is a rental image and a rental map area. Thereafter a first data ingestion interface connected to Craigslist determines a property record depiction that is an image and text a property record. The common property module then applies a first machine learning algorithm to the AirBnB rental image and a rental map area, and the Craigslist image and text to identify that the Craigslist listing is a common property record that refers to the rental property. A lexicographical data mining task process is then performed by a second data ingestion interface to the Craigslist text but finds no listed address. A second machine learning algorithm is then performed by a property address module, to the AirBnB rental image and rental map area and the Craigslist image and text, to determine that as the Craigslist text mentions that, "the cabin is right across the street from the $4^{th}$ street ski shuttle stop," and as the AirBnB rental image shows that the cabin in on a street corner next to a ski shuttle stop, that the street address of the rental property is 123 Mammoth Lane.

Example 13—Determination of an Address by a Neighboring Street Address

In a fifth example of the media, systems, and methods herein, a rental listing module receives a rental property listing that is a short-term listing from AirBnB for a rental property that is a cabin. The rental listing module further receives a rental property depiction of the rental property listing that is a rental image and a rental map area. Thereafter a first data ingestion interface connected to VRBO determines a property record depiction that is an image and text a property record. The common property module then applies a first machine learning algorithm to the AirBnB rental image and a rental map area, and the VRBO image and text to identify that the VRBO listing is a common property record that refers to the rental property. A photographic data mining task process is then performed by a second data ingestion interface to the VRBO image to determine that, within the VRBO image a property immediately to the right of the rental property displays a sign reading "101 Main Street." Thereafter a property address module applies a second machine learning algorithm to map of Main Street and the VRBO image to determine that the street address of the rental property is 103 Main Street.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A non-transitory computer-readable storage media including an application comprising instructions executable by a processor to determine a street address of a rental property, the application comprising:

(a) a neural network for training a first machine learning algorithm, wherein training the first machine learning algorithm comprises:
   collecting a plurality of predetermined common property records;
   creating a first training set comprising the plurality of predetermined common property records and a plurality of predetermined non-common property records, wherein the plurality of predetermined non-common property records comprises two or more property records associated with different properties;
   training the neural network using the first training set;
   creating a second training set for second stage training comprising the first training set and the predetermined non-common property records, wherein the non-common property records were incorrectly detected as common property records; and
   training the neural network using the second training set;

(b) a rental listing module receiving a rental property listing for the rental property and at least one rental property depiction of the rental property listing, wherein the rental property listing does not list a street address of the rental property;

(c) a plurality of first data ingestion interfaces, each first data ingestion interface connecting to a unique external property data source, wherein each first data ingestion interface performs a data mining task process to its property data source to determine at least one property record depiction, each property record depiction associated with a property record;

(d) a common property module applying the first machine learning algorithm to the at least one rental property depiction and the at least one property record depiction from each data source to identify one or more common property records, wherein each common property record comprises a property record that refers to the rental property; and (e) a second data ingestion interface performing a data mining task process to the one or more common property records to determine the street address of the rental property.

2. The media of claim 1, wherein the rental property depiction comprises an image.

3. The media of claim 1 wherein the second data ingestion interface performing the data mining task process to the one or more common property records to determine the street address of the rental property comprises a photographic data mining task process to determine a street name, an address number, or both of the rental property.

4. The media of claim 2, wherein at least one of the predetermined common property records or the predetermined non-common property records is manually collected.

5. The media of claim 1, wherein the rental listing module receiving the at least one rental property depiction of the rental property comprises a third data ingestion interface performing a data mining task process to the rental property listing.

6. The media of claim 1, wherein the external property data source comprises a vacation rental listing site, a short-term rental listing site, a home swap rental listing site, a sale property listing site, a permit database, a county record database, a state record database, a federal record database, a streetview, a map, or any combination thereof.

7. The media of claim 1, wherein at least one of the property record and the common property record comprises a vacation rental listing, a short-term rental listing, a home swap rental listing, a sale property listing, a permit, a residency record, a county record, a state record, a federal record, a streetview, a map, or any combination thereof.

8. The media of claim 1, wherein the second data ingestion interface performing the data mining task process to the one or more common property records to determine the street address of the rental property comprises:

(a) a photographic data mining task process to determine a street name, an address number, or both of the rental property; and a lexicographical data mining task process to determine the street name, the address number, or both of the rental property.

9. The media of claim 1, wherein the application further comprises a property address module applying a second machine learning algorithm to the at least one rental property depiction, the at least one property record depiction, or both and the street name or the address number, to determine the street address of the rental property.

10. The media of claim 9, wherein the application further comprises a first validation module that accepts verified data regarding the common property records and feeds back the verified data to the common property module to improve its calculations over time.

11. The media of claim 10, wherein the application further comprises a second validation module that accepts verified data regarding the street address of the rental property and feeds back the verified data to the application to improve its calculations over time.

12. A computer-implemented method of determining a street address of a rental property, the method comprising:

collecting a plurality of predetermined common property records; creating a first training set comprising the plurality of predetermined common property records and a plurality of predetermined non-common property records, wherein the plurality of predetermined non-common property records comprises two or more property records associated with different properties;

training the neural network using the first training set; creating a second training set for second stage training comprising the first training set and the predetermined non-common property records, wherein the non-common property records were incorrectly detected as common property records;

training the neural network using the second training set receiving, by a rental listing module, a rental property listing for the rental property and at least one rental property depiction of the rental property listing, wherein the rental property listing does not list a street address of the rental property;

performing a data mining task process, by each of a plurality of first data ingestion interfaces to a unique external property data source, to determine at least one property record depiction, each property record depiction associated with a property record;

applying, by a common property module, a first machine learning algorithm to the at least one rental property depiction and the at least one property record depiction from each data source to identify one or more common property records, wherein each common property record comprises a property record that refers to the rental property; and performing a data mining task process, by a second data ingestion interface to the one or more common property records to determine the street address of the rental property.

* * * * *